US012601357B2

(12) United States Patent
Moore et al.

(10) Patent No.: US 12,601,357 B2
(45) Date of Patent: Apr. 14, 2026

(54) AIR MOVING DEVICES, AERODYNAMIC ROTOR, AND METHODS

(71) Applicant: Whisper Aero Inc., Crossville, TN (US)

(72) Inventors: Mark Douglass Moore, Crossville, TN (US); Ian Andreas Villa, Nashville, TN (US); Devon Jedamski, Nashville, TN (US); Xiaofan Fei, Bellevue, WA (US); Andrew George Terajewicz, Nashville, TN (US); Jonathan Jeffrey Paravano, Brentwood, TN (US); Andrew Michael Marschner, Nashville, TN (US); Matthew Alan Dempsey, Nashville, TN (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/891,746

(22) Filed: Sep. 20, 2024

(65) Prior Publication Data

US 2025/0092876 A1 Mar. 20, 2025

Related U.S. Application Data

(60) Provisional application No. 63/551,439, filed on Feb. 8, 2024, provisional application No. 63/539,536, filed on Sep. 20, 2023.

(51) Int. Cl.
*F04D 25/16* (2006.01)
*A01G 20/47* (2018.01)
(Continued)

(52) U.S. Cl.
CPC ............. *F04D 25/16* (2013.01); *A01G 20/47* (2018.02); *F04D 25/166* (2013.01); *F04D 27/007* (2013.01)

(58) Field of Classification Search
CPC ....... A01G 20/47; F04D 25/06; F04D 19/002; F04D 19/024; F04D 19/026;
(Continued)

(56) References Cited

U.S. PATENT DOCUMENTS

| 2,828,603 A | 4/1958 | Laucher |
| 3,173,604 A | 3/1965 | Sheets et al. |
(Continued)

FOREIGN PATENT DOCUMENTS

| AU | 2019101084 A4 | 10/2019 |
| CN | 107201734 A | 9/2017 |
(Continued)

OTHER PUBLICATIONS

Jan. 2, 2025—(WO) International Search Report and Written Opinion—App PCT/US2024/047796.
(Continued)

*Primary Examiner* — Eric J Zamora Alvarez
(74) *Attorney, Agent, or Firm* — Banner & Witcoff, Ltd.

(57) ABSTRACT

An air-moving device may include an aerodynamic rotor in the form of a bladed disk. The aerodynamic rotor may include a physical geometry that constrains a noise level of the air-moving device.

25 Claims, 37 Drawing Sheets

(51) Int. Cl.

| | |
|---|---|
| *F04D 19/00* | (2006.01) |
| *F04D 19/02* | (2006.01) |
| *F04D 25/08* | (2006.01) |
| *F04D 25/10* | (2006.01) |
| *F04D 27/00* | (2006.01) |
| *F04D 29/32* | (2006.01) |
| *F04D 29/38* | (2006.01) |
| *F04D 29/54* | (2006.01) |

(58) Field of Classification Search

CPC .... F04D 29/324; F04D 29/325; F04D 29/326; F04D 25/08; F04D 25/166; F04D 25/084; F04D 29/32; F04D 29/321; F04D 29/384; F04D 29/545; F04D 19/00; F04D 25/10; F04D 27/002; F04D 27/003; F04D 27/004; F04D 27/007; F05D 2220/327

See application file for complete search history.

(56) References Cited

U.S. PATENT DOCUMENTS

| | | | |
|---|---|---|---|
| 3,174,681 A | 3/1965 | Monroe | |
| 3,747,343 A | 7/1973 | Rosen | |
| 3,807,639 A | 4/1974 | Soligny et al. | |
| 4,813,607 A | 3/1989 | Hill et al. | |
| 4,844,698 A | 7/1989 | Gornstein et al. | |
| 5,038,559 A | 8/1991 | Blackmore | |
| 5,165,227 A | 11/1992 | Grieb | |
| 5,263,823 A | 11/1993 | Cabaret et al. | |
| 6,076,231 A | 6/2000 | Bucher | |
| 6,105,206 A * | 8/2000 | Tokumaru | F04D 19/002 |
| | | | 15/410 |
| 6,139,277 A | 10/2000 | Lopatinsky | |
| RE40,713 E | 5/2009 | Geis et al. | |
| 7,972,110 B2 | 7/2011 | Seki et al. | |
| 8,398,380 B2 | 3/2013 | Duke | |
| 10,227,988 B2 * | 3/2019 | Gao | F04D 29/545 |
| 10,724,472 B1 | 7/2020 | Chase | |
| 11,802,485 B2 | 10/2023 | Moore et al. | |
| 12,000,309 B2 | 6/2024 | Moore et al. | |
| 2003/0039541 A1 | 2/2003 | Wargo | |
| 2003/0049122 A1 | 3/2003 | Kim et al. | |
| 2003/0219132 A1 | 11/2003 | Sommerfeldt et al. | |
| 2007/0086889 A1 | 4/2007 | Matheny | |
| 2008/0016872 A1 | 1/2008 | Toffan et al. | |
| 2008/0245925 A1 | 10/2008 | Udall | |
| 2009/0317246 A1 | 12/2009 | Lutz et al. | |
| 2010/0111685 A1 | 5/2010 | Sjunnesson et al. | |
| 2010/0260616 A1 | 10/2010 | Osawa et al. | |
| 2013/0062455 A1 | 3/2013 | Lugg et al. | |
| 2014/0271207 A1 | 9/2014 | Drane | |
| 2014/0321968 A1 | 10/2014 | Kreitmair-Steck | |
| 2015/0237808 A1 | 8/2015 | Prager | |
| 2016/0195097 A1 | 7/2016 | Patrick | |
| 2016/0363050 A1 | 12/2016 | Joshi et al. | |
| 2017/0009656 A1 | 1/2017 | Vessot et al. | |
| 2018/0094393 A1 | 4/2018 | Takahashi et al. | |
| 2018/0223846 A1 * | 8/2018 | Staffend | F04C 23/003 |
| 2019/0162192 A1 | 5/2019 | Gao et al. | |
| 2019/0195169 A1 | 6/2019 | Montes et al. | |
| 2020/0047896 A1 | 2/2020 | Dierksmeier | |
| 2021/0107664 A1 | 4/2021 | Rabbi et al. | |

| | | | |
|---|---|---|---|
| 2021/0190083 A1 | 6/2021 | Kim et al. | |
| 2022/0163051 A1 | 5/2022 | Hsu et al. | |
| 2022/0341338 A1 | 10/2022 | Moore et al. | |
| 2024/0003317 A1 | 1/2024 | Suciu et al. | |
| 2024/0209867 A1 | 6/2024 | Tang et al. | |
| 2024/0295175 A1 | 9/2024 | Moore et al. | |
| 2025/0092877 A1 | 3/2025 | Moore et al. | |

FOREIGN PATENT DOCUMENTS

| | | |
|---|---|---|
| CN | 111237084 A | 6/2020 |
| EP | 2809881 B1 | 1/2018 |
| FR | 3087824 A1 | 5/2020 |
| GB | 2545414 A | 6/2017 |
| IT | 102019000001033 B1 | 1/2021 |
| IT | 102019000014151 B1 | 8/2021 |
| JP | S62203996 A | 9/1987 |
| JP | H084690 A | 1/1996 |
| JP | 2002257091 A | 9/2002 |
| JP | 2014029160 A | 2/2014 |
| JP | 2016075248 A | 5/2016 |
| WO | 9306008 A1 | 4/1993 |
| WO | 2020084221 A1 | 4/2020 |
| WO | 2020227837 A1 | 11/2020 |
| WO | 2021171789 A1 | 9/2021 |
| WO | 2022185164 A1 | 9/2022 |
| WO | 2023040651 A1 | 3/2023 |

OTHER PUBLICATIONS

Jan. 2, 2025—(WO) International Search Report and Written Opinion—App PCT/US2024/047718.

"Equal Loudness Contours" [https://www.sfu.ca/sonic-studio-webdav/handbook/Equal_Loudness_Contours.html] Last accessed: Sep. 16, 2024.

"How Weather Effects on Noise Measurements" [https://www.hbkworld.com/en/knowledge/resource-center/articles/noise-measurement-weather] Last accessed: Sep. 19, 2024.

Dittmar et al. "The Alternative Low Noise Fan." NASA/TM-2000-209916. Oct. 2000.

Mar. 26, 2024 (JP) Office Action—App. No. 2023-553955.

PCT International Search Report and Written Opinion, PCT Application No. PCT/IB2022/051659, May 26, 2022, nine paqes.

PCT International Search Report and Written Opinion, PCT Application No. PCT/IB2022/051653, May 26, 2022, seven pages.

PCT International Search Report and Written Opinion, PCT Application No. PCT/IB2022/051656, May 26, 2022, eight pages.

PCT International Search Report and Written Opinion, PCT Application No. PCT/IB2022/051653, May 26, 2022, 7 pages.

PCT International Search Report and Written Opinion, PCT Application No. PCT/IB2022/051656, May 26, 2022, 8 pages.

PCT International Search Report and Written Opinion, PCT Application No. PCT/IB2022/051659, May 26, 2022, 9 pages.

United States Office Action, U.S. Appl. No. 17/679,540, Mar. 1, 2023, 12 pages.

United States Office Action, U.S. Appl. No. 17/679,484, May 19, 2023, 33 pages.

United States Office Action, U.S. Appl. No. 17/679,484, Nov. 20, 2023, 22 pages.

United States Office Action, U.S. Appl. No. 17/679,502, Oct. 3, 2022, 18 pages.

* cited by examiner

200

204
206

DETAIL C
SCALE 4 : 1

204          204          206

C

SECTION B-B
SCALE 1 : 1

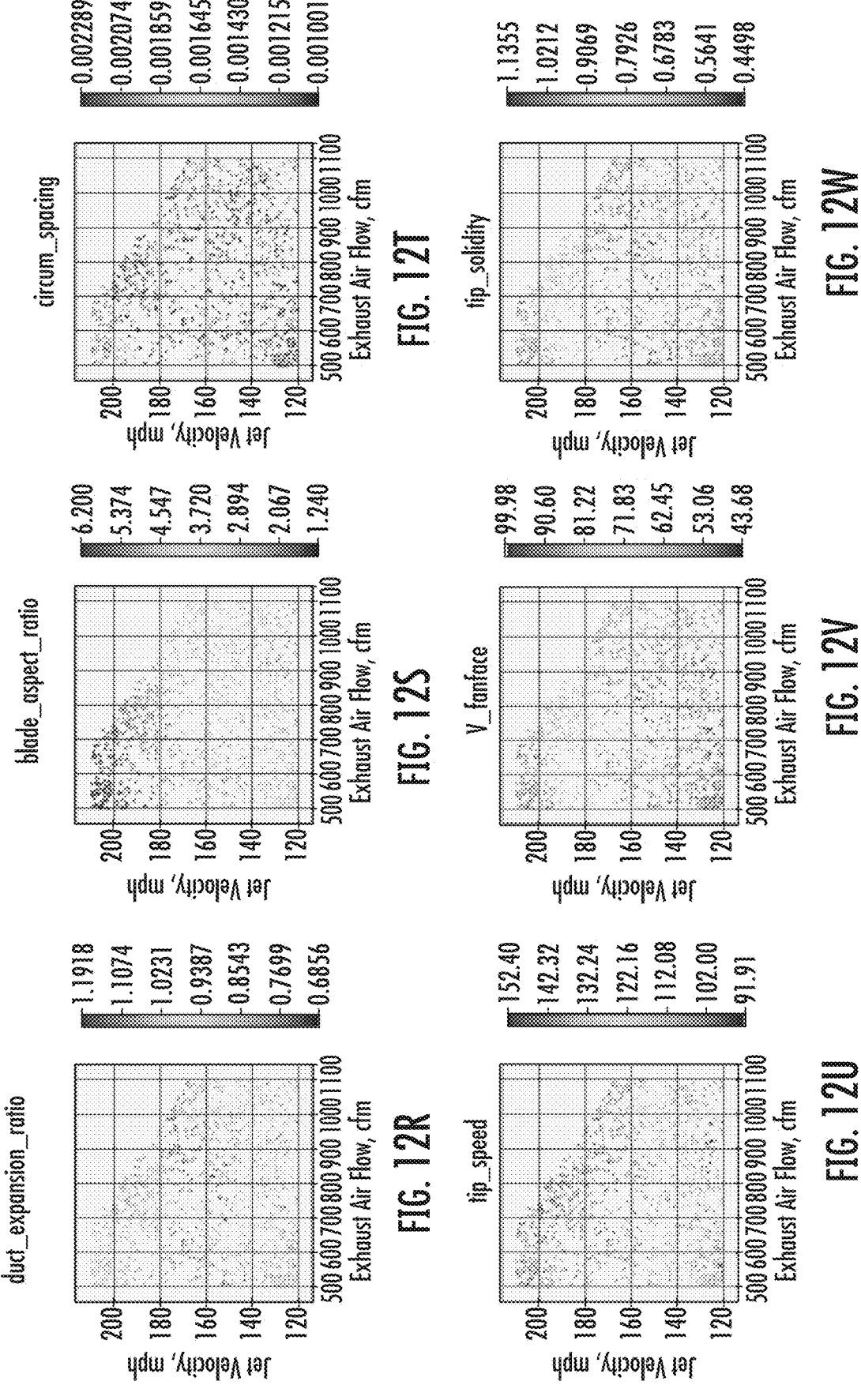

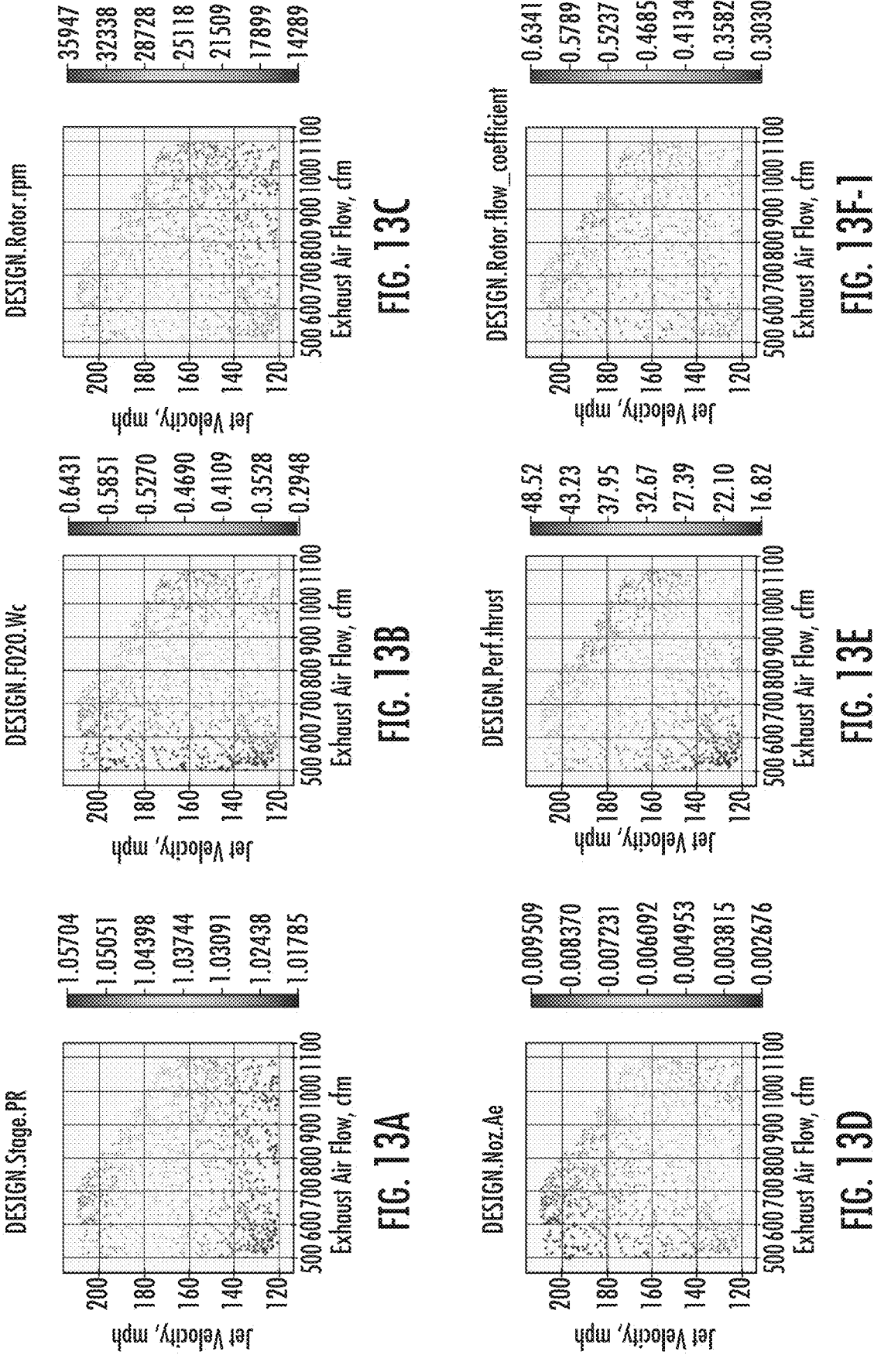

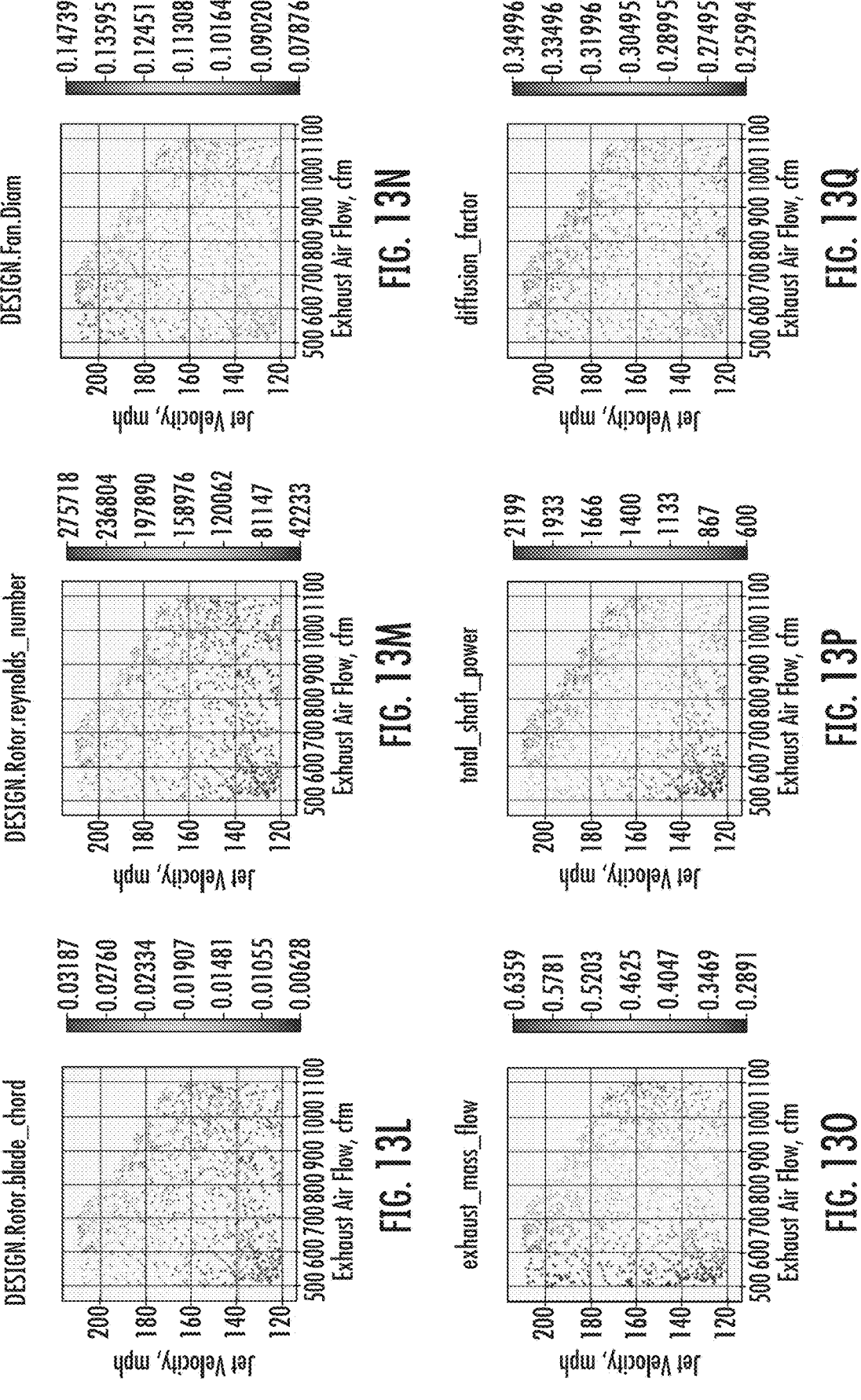

1500

1504

1502

1502

1514

1504

1506

1502

1514

1504

1506

1502

1514

1504

1506

1505

1505

1504

1506

1502

1600

AIR MOVING DEVICES, AERODYNAMIC ROTOR, AND METHODS

CROSS-REFERENCE TO RELATED APPLICATIONS

This application claims priority to U.S. Provisional Patent Application No. 63/551,439 titled "Leaf Blower with Single Part Blisk" filed on Feb. 8, 2024, which is incorporated by reference herein in its entirety for any and all non-limiting purposes.

This application also claims priority to U.S. Provisional Patent Application No. 63/539,536 titled "Leaf Blower Fan" filed on Sep. 20, 2023, which is incorporated by reference herein in its entirety for any and all non-limiting purposes.

FIELD

The present disclosure generally relates to aerodynamic rotors for air-moving devices, more particularly relates to aerodynamic rotors, and more specifically relates to aerodynamic rotors that may be in the form of single-part bladed disks having a homogenous, monolithic, and/or contiguous construction.

BACKGROUND

Air-moving devices are used in a variety of applications. Examples include drying, cooling, moving debris, providing ventilation, providing thrust, hovering, and the like. Air-moving devices, however, can be noisy and/or inefficient.

SUMMARY

The following summary present a general overview of various aspects of the present disclosures. This summary is not an extensive description of all aspects of the present disclosures and should not be understood to identify key or critical elements.

Air-moving devices having a reduced noise profile are described. An air-moving device, such as a leaf blower, may include features that constrain or otherwise limit its noise level during operation. The noise level of an air-moving device may be in the range of approximately 30-70 A-weighted decibels (dBA) when measured at a distance of approximately fifty (50) feet from the air-moving device. The noise level of the air-moving device may not exceed, for example, 30 dBA, 45 dBA, 55 dBA, or 65 dBA. Features of the air-moving device that may limit its noise level during operation may include the physical geometry of a rotor of the air-moving device. The physical geometry of the rotor that may limit the noise level of the air-moving device during operation may include a quantity of blades of the rotor, a circumferential spacing between the blades of the rotor, and a tip solidity of the rotor. A rotor may include, for example, a relatively high quantity of blades such as, for example, 12-100 blades. The blades may each have a blade aspect ratio between 1 and 10. The noise level of the air-moving device also may be limited by controlling rotation of the rotor at relatively low blade passage frequencies and relatively low tip speeds. The air-moving device may be operated, for example, to rotate the rotor at a tip speed in the range of about 200-500 feet per second with a blade passage frequency in the range of about 8-16 kilohertz (kHz). The relatively low tip speed and blade passage frequencies may reduce the power demands of the air-moving devices. Air-moving devices may be configured to operate at relatively low noise levels while still providing air flow sufficient for desired applications such as leaf blowing including, for example, fan pressure ratios in the range of about 1.005-1.2, air velocities in the range of about 90-290 miles per hour (mph), and volumetric air flows in the range of about 500-1,100 cubic feet per minute (cfm). The rotor may be a single-part rotor having a homogenous, monolithic, and/or contiguous construction formed via various manufacturing techniques such as, for example, injection molding. The construction of the rotor via such techniques may facilitate mass production of the rotor at relatively low costs thereby creating opportunities to provide improved air-moving devices that operate at lower noise profiles with better air-moving capabilities and reduced power requirements. These features and advantages, as well as others, are described in further detail below.

BRIEF DESCRIPTION OF THE DRAWINGS

The present disclosure is illustrated by way of example and not limited in the accompanying figures in which like reference numerals indicate similar elements and in which:

FIGS. 2B-1 and 2B-2 depict additional respective schematics for the example bladed disk of FIGS. 2A-1-2A-4;

FIG. 3 depicts a perspective view of another example of a bladed disk in accordance with aspects of the present disclosure;

FIG. 11A depicts a perspective cross-sectional view of an example of a hub of a bladed disk with a nose cone interface in accordance with aspects of the present disclosure;

FIG. 11B depicts a perspective view of an example of a bladed disk with a nose cone in accordance with aspects of the present disclosure;

FIGS. 15A-1, 15A-2, 15A-3, 15A-4, and 15A-5 depicts respective front, rear, top, bottom, and side views of an example of an air blower in accordance with aspects of the present disclosure;

FIG. 18B depicts a side cross-sectional view of the example leaf blower barrel of FIG. 18A with an example of a stator insert in accordance with aspects of the present disclosure;

DETAILED DESCRIPTION

Figure 1A:
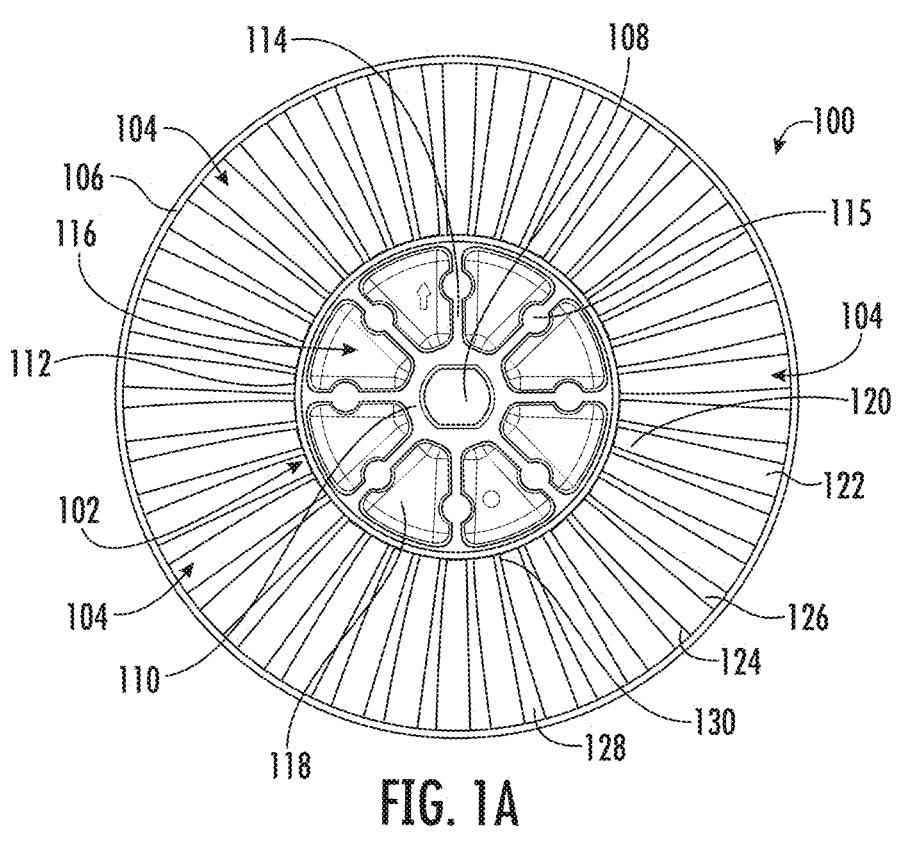
FIG. 1A depicts a front view of an example of a bladed disk in accordance with aspects of the present disclosure.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

As noted above, air-moving devices are used in a variety of applications but can be noisy, which may limit when and where those air-moving devices can be used. One example is an air vehicle, and another is a leaf blower. Due to the noise levels of conventional air vehicles, many jurisdictions limit the size of vehicles that may enter or leave an area due the large thrust needed on larger craft, others limit the quantity of vehicles over a time period, amongst other restrictions. Indeed, noise pollution has been shown to be a factor in declining mental and physical health as well as economic status. Similarly, for leaf blowers, many jurisdictions limit the times during the day conventional leaf blowers may be operated due to the noise pollution they create. Other examples such as blowers and dryers may likewise be undesirably noisy. In some examples, reducing the noise levels of air-moving devices such as aircraft (e.g., drones) may be desirable to limit their detectability (e.g., for stealth purposes). As such, reducing the noise levels of air-moving devices while maintaining a sufficient speed and/or flow of air for a desired application is desirable.

As described herein, noise levels of an air-moving device may be constrained within relatively low noise level ranges (e.g., 30-70 A-weighted decibels, dB (A) at 50 feet) due to the physical geometries of the components of the air-moving device. In some examples, noise levels may be kept below about 65 dB (A) at 50 feet, below about 45 dB (A) at 50 feet. In some examples, noise levels may be kept as low as about 30 dB (A) at 50 feet. One component of an air-moving device that impacts its noise level is the rotor. As described herein, the rotor of an air-moving device may take the form of a bladed disk. The design of the bladed disk thus influences the noise level of an air-moving device during operation. As disclosed herein, the overall physical geometry of the bladed disk, the physical geometries of its various components, and the physical arrangement of those components may be designed in a manner that reduces the noise level of an air-moving device that incorporates the bladed disk while still providing a sufficient air speed and volume of air movement for the desired air-moving application. The physical geometries of a bladed disk that may impact the noise level and air-moving capabilities may include, for example and among others, the quantity of blades, the length (span) of the blades, the blade chord, the spacing between the blades, the blade incidence angle, and various relationships between various physical dimensions of the bladed disk. The physical geometries of a bladed disk may also impact its aerodynamic performance and efficiency and, as a result, may improve air-moving capabilities relative to conventional air-moving devices. As also disclosed herein, the air-moving device may also control rotation of the bladed disk in a manner that reduces the noise level. The operational parameters of an air-moving device that may impact the noise level and air-moving capabilities may include, for example and among others, the blade passage frequency (BPF) and the blade tip speed. Blade passage frequency refers to the frequency at which any blade of a bladed disk traverses a single point during rotation. Blade tip speed refers to the velocity of the tips of the blades during rotation, such as in meters per second (m/s) or another relevant unit.

As disclosed herein, constraining the noise levels of air-moving devices while maintaining sufficient air-moving capabilities may be achieved by way of bladed disks having a relatively high blade count (e.g., 12-100 blades, 12-50 blades, 20-50 blades, and or any specific quantity between 12-50 blades), a relatively high BPF (e.g., about 6-14 kHz, 8-16 kHz, about 10-12 kHz, about 10-14 kHz, and/or any specific value within one or more of these ranges), and/or a relatively low tip speed (e.g., about 200-550 feet per second, ft/s). In certain embodiments, blisks may posses a blade count (e.g., 12-50 blades), and configured to be operated in a manner such as to provide a relatively high BPF (e.g., about 6-16 kHz), while achieving a low tip speed (e.g., about 200-550 ft/s). While ranges have been given as examples of certain embodiments, those skilled in the art will appreciate that the scope of this disclosure includes any value within the range of blade count (e.g., between 12-100 blades), with any value of BPF between about 6-16 kHz, and/or a tip speed of any value between about 200-550 ft/s. Those of ordinary skill in the art with the benefit of this disclosure will realize that these are merely exemplary ranges, and such disclosure is not intended to be limited.

These design and operational parameters, and/or other parameters disclosed herein, provide opportunities to employ energy-agnostic power drives. In this regard, electric, combustion, and/or hybrid motors/engines or configurations may be utilized with respect to one or more air-moving devices disclosed herein. The type of motor or engine used may depend on the intended application of the air-moving device. For example, if noise levels are a concern, then a relatively quieter electric motor or engine may be employed in favor of a relatively louder combustion engine or motor. If, however, noise levels are not a concern for a given application, aspects of the disclosures herein may be employed, for example, with a relatively louder motor or engine (e.g., a combustion motor/engine). These design and operational parameters also may provide opportunities to manufacture bladed disks using various manufacturing methods that may be suitable for consumer-grade or professional-grade air-moving devices (e.g., leaf blowers), aircraft (e.g., drones, planes, copters, gliders, and/or remote or manned craft), temperature regulating devices (e.g., air circulation as well as refrigeration, cooling, or heating). In some examples, air moving devices or portions thereof (e.g., blisks) may be completely manufactured using existing manufacturing tools and compositions. Yet other embodiments may utilize a novel combination of methods or components and compositions that have not been used to make traditional blisks or rotors. As disclosed herein, for example, injection molding may be used to manufacture the bladed disks. Other embodiments may be made, either in whole or part, via CNC, stamping, sintering, amongst several other processes. Using manufacturing techniques such as injection molding may reduce the overall costs of the bladed disk, reduce manufacturing time, and facilitate mass production of the bladed disks, which may be advantageous for consumer-grade and professional-grade applications.

Air-moving devices that incorporate the bladed disks as described herein may achieve one or more of preferred fan pressure ratios (e.g., any value at or within about 1.005-1.2 in one example and 1.01 to 1.1 in another), jet velocities (e.g., at or anywhere within about 90-290 miles per hour, or about 60-410 in another example), and noise levels (e.g., at any value at or within the range of about 30-70 dB (A) including ranges or values within this span such as for example, 30-35, 35-40, 40-45, 45-50, or 35-37, 37-40, amongst others). In some examples, blisks may be configured for use in one or more air-moving devices to provide preferred fan pressure ratio (e.g., about 1.005-1.2 or any specific ratio or range of ratios within this span, such as 1.005 or 1.005-1.1 for example), jet velocities (e.g., about 90-290 miles per hour, or 60-410 mph), and noise levels (e.g., about 30-70 dB (A) at 50 ft. Those skilled in the art with the benefit of this disclosure will appreciate that these are merely examples for specific implementations of the inventive blisks described herein. For example, a fan pressure ratio of about 1.005-1.2 with jet velocities at values between about 60-410 mph, and noise levels between about 30-70 dB (A) at 50 ft and many other examples. In one example, noise levels of air-moving devices may be obtained or confirmed when measuring a test article in an anechoic or hemi-anechoic environment in which background noise is at least 10 dB quieter in every one-third octave band than the test article itself. Such results may be obtained and confirmed with microphones having sensitivity from about 20 Hz to 20 kHz. In some examples, multiple microphones having substantially the same (e.g. about equal) sensitivity across a range of frequencies between 20 Hz to 20 kHz. Noise levels of air-moving devices may be evaluated by measuring sideline noise via an array of distributed microphones (e.g., an array of 33 foot azimuthally distributed microphones) taking into account a measured (or assumed) background noise level (e.g., 20-30 dB). In some examples, the sound test procedures for bystander noise set forth in Annex A of ANSI/OPEI B175.2-2012 may be employed to evaluate the noise levels of air-moving devices (e.g., leaf blowers) described herein. In certain examples, far-field acoustical data may be acquired in accordance with ARP1846 to evaluate the noise levels of air moving devices, (e.g., air vehicle propulsors). Those skilled in the art with the benefit of this disclosure will appreciate that these values are merely examples and other quantities of microphones, diverse types of noise capturing devices, and/ or accounting for background noise may be utilized.

As noted above, select aspects of the disclosure generally relate to examples of bladed disks (also referred to as "blisks" or "blisk") having a singular construction and thus may be referred to as "single-part" blisks. Single-part blisks may be differentiated from multi-part blisks formed as an assembly of parts that form a singular unit once assembled. Multi-part blisks may be constructed to be disassembled without destroying the integrity of the blisk or its constituent components, such as with removable fasteners or the like that allow the blisk to remain an integral structure under intended use conditions, such as those provided herein, whereas single-part blisks may be constructed to not be disassembled or deconstructed without destroying the structural integrity of the single-part blisk and/or its components (e.g., hub, blades, shroud). Aspects of the present disclosures may apply to both single-part blisks and multi-part blisks. Examples of single-part blisks include homogenous single-part blisks, monolithic single-part blisks, and contiguous single-part blisks. A homogenous single-part blisk as described herein will comprise a general uniform material(s) or composition(s) throughout-inclusive of the shroud, blades and hub (which may or not include a nose cone). A homogenous blisk may be formed entirely of a singular volume or a single layer of a single material, multiple layers of the same material, etc. . . . A monolithic single-part blisk as described herein, for example, may be integrally formed of a single continuous component comprising a material or a group of materials without seams or joints. For example, in one embodiment, a monolithic blisk may be created by employing computer numerical control (CNC) manufacturing methods on a composite, alloy, or material. A monolithic single-part blisk thus may be homogenous (if integrally formed of the same continuous material) or non-homogenous (if integrally formed of a group of materials). A monolithic single-part blisk may include, for example, layers of materials (e.g. the same material or different materials) deposited directly on an adjacent layer (e.g., via overmolding and/or additive manufacturing). A contiguous single-part blisk as described herein may include, for example, at least one layer (e.g., an inner core layer, an outer overmold layer) that transitions without interruption from one component of the single-part blisk (e.g., a blade) to another component of the single-part blisk (e.g., the hub, the shroud). A contiguous single-part blisk thus may homogenous (if integrally formed of the same material), non-homogenous (if integrally formed of different materials, for example, contiguous layers of different materials), monolithic (if integrally formed of one or more layers), or nonmonolithic (if constructed of separately constructed components such as individual blades or blade sectors, a stiffener for the hub, and/or a separate shroud that are collectively overmolded to yield a singular unit). For example, the blades, hub, and/or shroud of a single-part blisk may be constructed (e.g., individually or collectively) using one or more of the manufacturing methods described herein and the constructed components may be overmolded resulting in the singular unit. As described herein with respect to certain examples, a single-part blisk may be provided via manufacturing techniques such as, but not limited to: injection molding (including metal injection molding), compression molding, overmolding, casting, stamping, computer numerical control (CNC) machining, additive manufacturing (e.g., 3-D printing), electrochemical machining (ECM), electrical discharge machining (EDM), laser-cutting, forging, die-pressing, sintering, and combinations thereof. For example, a blisk can be injection molded and then CNC may be used to machine a feature to size. In some examples, one or more of these and/or other techniques may impart the singular, unitary nature of the single-part blisk and/or aspects of any other type of blisk discussed herein (e.g., multi-part blisks). In some examples, the blisk may be A-B injection molded including the integral shroud to provide structural feasibility while permitting the blades to be adequately supported. As the rotating component in an air-moving device (or configured to be such), a blisk may also be referred to as an aerodynamic rotor or simply a rotor. Aspects of example embodiments and implementations are discussed in greater detail throughout this disclosure, including the accompanying drawings.

Figure 1B:
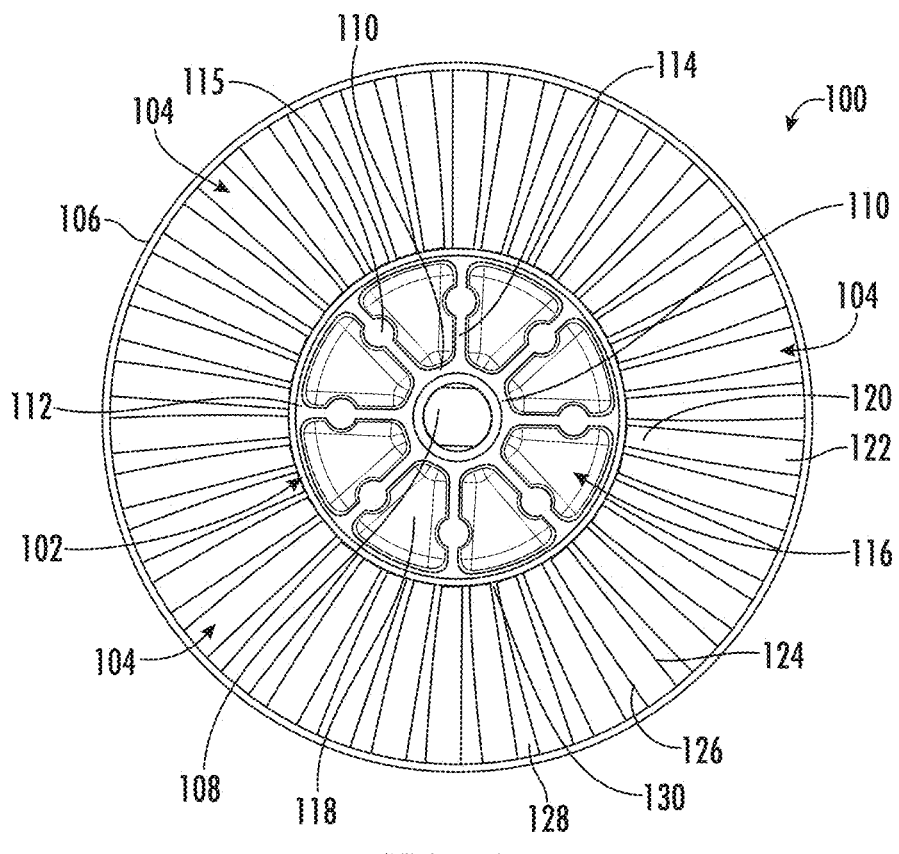
FIG. 1B depicts a rear view of the example bladed disk of FIG. 1A.
Figure 1C:
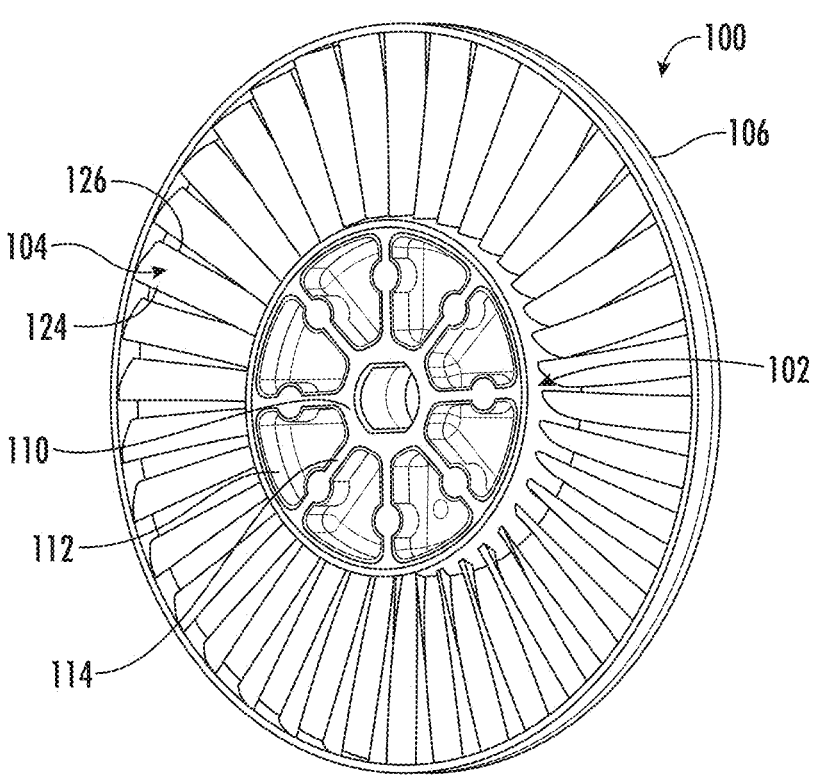
FIG. 1C depicts a front perspective view of the example bladed disk of FIG. 1A.
Figure 1D:
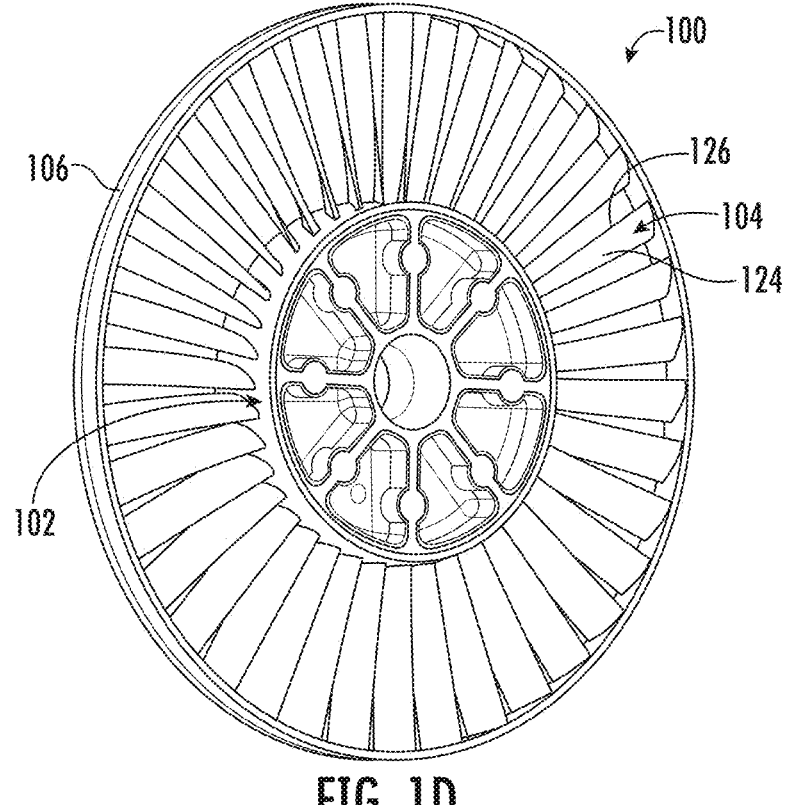
FIG. 1D depicts a rear perspective view of the example bladed disk of FIG. 1A.
Figure 1E:
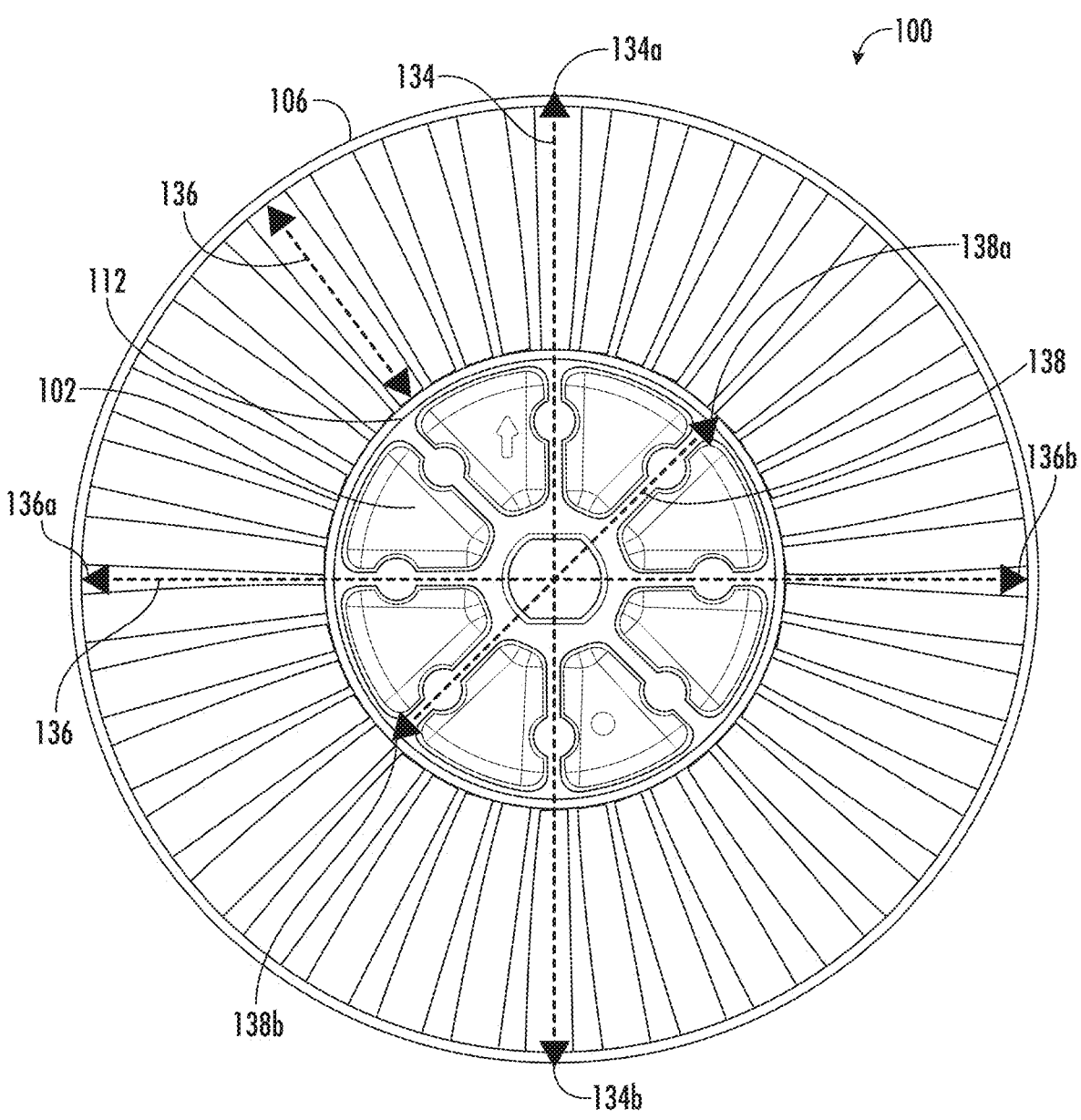
FIG. 1E depicts a front view of the example bladed disk of FIG. 1A with example dimensions of the example bladed disk.
Figure 1F:
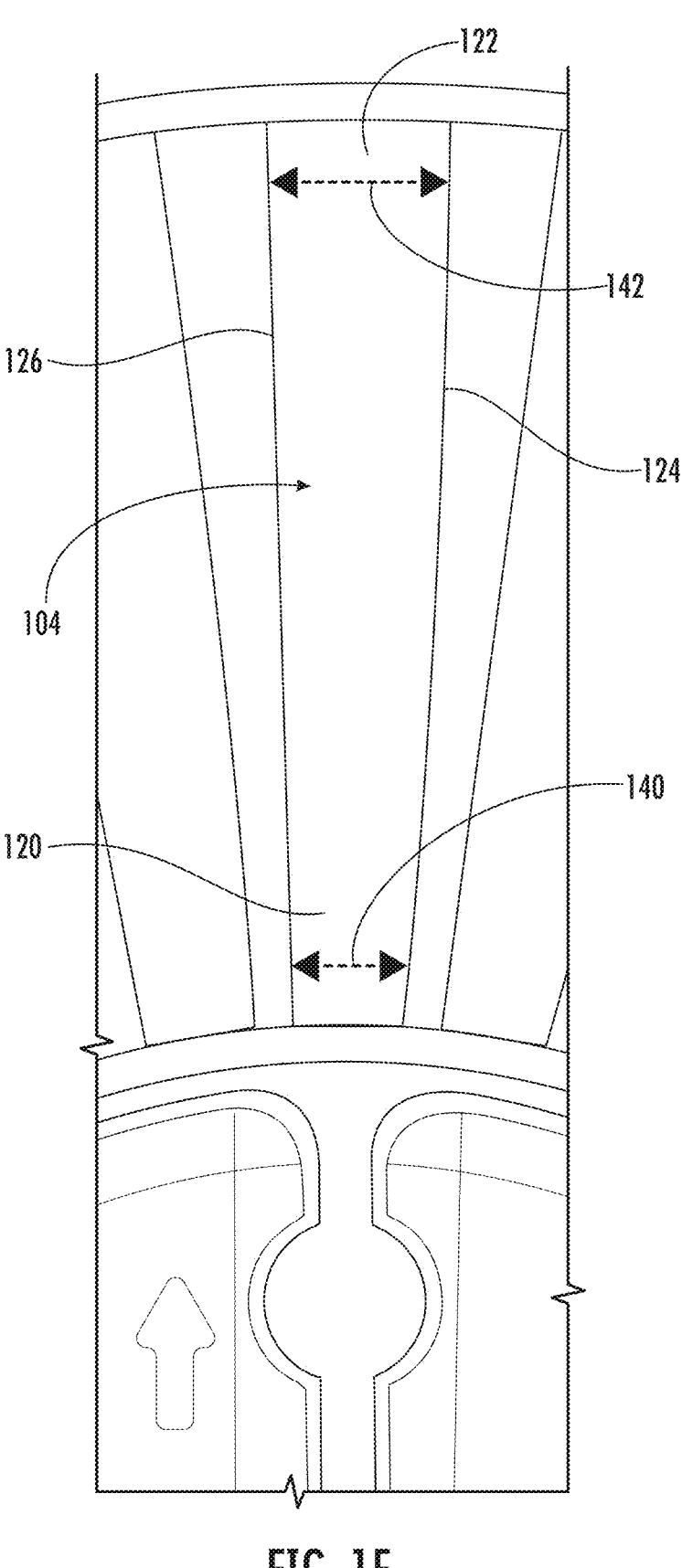
FIG. 1F depicts an enlarged front view of the example bladed disk of FIG. 1A with example dimensions of a blade of the example bladed disk.

To introduce various concepts directed to the blisks, including single-part blisks, described herein and the devices and methods using them, reference is first made to FIGS. 1A-F. FIG. 1A and FIG. 1B depict a front view and a rear view, respectively, of an example of a blisk 100 in accordance with aspects of the present disclosure. FIG. 1C and FIG. 1D depict front and rear perspective views, respectively, of the example blisk 100. FIG. 1E and FIG. 1F depict example dimensions of the example blisk 100 in accordance with one embodiment.

The blisk 100, in this example, includes components that may be contiguously formed such that the blisk is a singular, unitary part. In yet another example, a first portion (e.g., a first "half" such as a half depicted by FIG. 1A) may be independently molded or created and then joined with a second portion (e.g., a second "half," such as a back portion shown in FIG. 1B). In some examples, the final blisk may be homogenous upon joining the two halves. Those skilled in the art with the benefit of this disclosure will appreciate that more than two homogenous and/or monolithic components may be joined together to form a homogenous structure. The blisk 100 in this example includes a hub 102 (which may be referred to as a rotor disk), multiple blades 104, and a shroud 106. For ease of reference, not every blade 104 is labeled in FIGS. 1A-F. The blades 104 are coextend radially between the hub 102 and the shroud 106. Each blade 104, in this example, is contiguous with the hub 102 and the shroud 106. As such, rotation of the hub results in rotation of the blades and shroud.

For example, the surface of the hub 102 is contiguous with the surface of each blade 104, and the surface of the shroud 106 such that the entire surface across the blisk 100 is one contiguous surface.

The hub 102 includes a central aperture 108 that provides a motor interface for the blisk 100. For example, the central aperture 108 of the hub 102 may be sized and shaped to receive a shaft of a motor that drives rotation of the blisk 100. A hub of a single-part blisk may otherwise be solid across the face of the blisk but for the central aperture that receives the drive mechanism, such as a drive shaft of the motor, (i.e., may have a contiguous, unbroken construction from the central aperture 108 to the blades 104). In some examples, a hub of a blisk (e.g., a single-part blisk) may not be solid across the face of the blisk and include, for example, one or more apertures across the face of the blisk in addition to the central aperture that receives the drive mechanism (i.e., may have a contiguous, apertured construction from a central aperture to the blades). For example, in some examples, a blisk (e.g., a single-part blisk) may include an integrated spinner or nose cone and include one or more apertures across the face of the blisk in additional to the central aperture. In some examples, a hub may be or otherwise include a stiffener such as, for example, an overmolded stiffener. A stiffener may be, for example, constructed of a metallic material, a composite material, or a polymer material. Those skilled in the art will appreciate that outrunner motors are within the scope of this disclosure and that reference to an example drive shaft is not to exclude other types of known motors, engines, etc. A hub may also include features that impart strength to the single-part blisk and resist deformation during rotation. For example, as seen in FIG. 1C and FIG. 1D, the hub 102 of the blisk 100 has an axial (front-to-back) width that is greater than a maximum width of the blades 104. The hub 102, in this example, also includes an inner ring 110, an outer ring 112, and multiple spokes 114 (bridges, beams) extending radially between the inner ring and the outer ring. Again for ease of reference, not every spoke 114 is labeled in FIGS. 1A-F. Each spoke 114, in this example, includes a rounded (e.g., cylindrical) boss 115. One or more of the bosses 115 may facilitate weight balancing of the single-part blisk 100. One or more of the bosses 115 may provide locations for ejector pins when the single-part blisk is manufactured using an injection molding process. As also seen in FIG. 1C and FIG. 1D, both the inner ring 110 and the outer ring 112 have an axial (front-to-back) width that is greater than a maximum width of the blades 104. The hub 102, in this example, also includes recesses 116 (pockets) between adjacent spokes 114 with solid paneling 118 (unbroken webbing) forming the bottom of each recess. As described above, in some examples, a hub may include non-solid paneling (broken webbing). As seen in FIG. 1C and FIG. 1D, the axial width of the hub 102 at the recesses 116, therefore, may be less than the axial width of the hub at the inner ring 110 and outer ring 112. As also seen in FIG. 1C and FIG. 1D, the axial width of the hub at the spokes 114 may match the axial width of the hub at the inner ring 110 and outer ring 112. The inner ring 110, outer ring 112, spokes 114, and paneling 118 may individually or collectively impart strength to the blisk 100 and facilitate its resistance to deformation when rotating.

Each blade 104, in this example, extends between the hub 102 and the shroud 106. Each blade 104, therefore, may include a first end 120 contiguously connected to the hub 102 at an outer surface of the hub, which may be referred to as the blade root or root of the blade, and a second end 122 contiguously connected to the shroud 106 at an inner surface of the shroud, which may be referred to as the blade tip or the tip of the blade. As seen in FIG. 1C and FIG. 1D, each of the blades 104 may include a twist as it extends from the hub 102 to the shroud 106. As such, the root 120 of a blade 104 and the tip 122 of the blade may be oriented at different angles relative the axis of rotation. In other words, the root 120 of a blade 104 may be contiguously connected to the hub 102 at a first angle relative to the axis of rotation, and the tip 122 of the blade may be contiguously connected to the shroud at a second angle relative to the axis of rotation that is different than the first angle. The twisting of a blade 104 is also seen in the example schematic diagram depicted in FIG. 2B. Each blade 104 also includes a leading edge 124 and a trailing edge 126. The leading edge of a blade refers to the edge of the blade that first meets an airflow flowing through the blisk. As seen in FIGS. 1A-D, the trailing edge of a blade is opposite its leading edge. The distance between the leading edge and the trailing edge of a blade may be referred to as the blade chord. In some examples, the blade chord may be different across the length of the blade. For example, the blade chord at the root of a blade may be different than the blade chord at the tip of the blade (e.g., the blade chord at the blade root may be narrower than the blade chord at the blade tip). As seen in FIG. 1C and FIG. 1D, in this example, the outer ring 112 of the hub 102 axially extends beyond the root 120 of each blade 104, and the shroud 106 axially extends beyond the tip 122 of each blade. In some examples, a leading edge of a blade may overlap with a trailing edge of an adjacent blade and, similarly, a trailing edge of a blade may overlap with a leading edge of an adjacent blade. In some examples, the edges of adjacent blades may not overlap. In some examples, the thickness of a blade may be different at the trailing edge. For example, the thickness of the blade at the trailing edge may be smaller than the maximum thickness of the blade. In other words, the trailing edge of the blade may be thicker than other portions of the blade (e.g., the leading edge). In some examples, the maximum thickness of a blade may be at least 0.8-0.9 mm (e.g., 0.85 mm) and the thickness of the trailing edge of the blade may be at least about 0.3 mm. It will be appreciated that the thickness of the blades (or portions thereof) may depend on the geometry of the blade and/or the capabilities of the manufacturer. Ranges for the maximum thickness of a blade and the thickness of the trailing edge of the blade may depend on the manufacturing method employed and may be higher or lower than those explicitly identified herein. Such ranges, however, are intended to be within the scope of the present disclosures.

The distance between the edges of adjacent blades may be referred to as circumferential blade spacing. Circumferential blade spacing may be positive or negative. Positive circumferential blade spacing results in visible gaps between the blades when viewing a blisk directly from the front or back; in other words, there is no overlap between the edges adjacent blades with positive circumferential blade spacing. Negative circumferential blade spacing results in no visible gaps between the blades when viewing a blisk directly from the front or back; in other words, there is some amount of overlap between the edges of adjacent blades with negative circumferential blade spacing. In some examples, circumferential blade spacing may be uniform across the blades of a blisk (e.g., the circumferential blade spacing may be entirely positive or entirely negative for all blades of a blisk). In some examples, circumferential blade spacing may be nonuniform across the blades of a blisk (e.g., the circumferential blade spacing may be positive for some adjacent blades of a blisk and negative for other adjacent blades of the blisk, may be higher for some adjacent blades of a blisk and negative for other adjacent blades of the blisk, may be higher at one end of adjacent blades and lower at the opposite end of the adjacent blades). As seen in FIG. 1A and FIG. 1B, the circumferential blade spacing of the blades 104 in the example blisk 100 is positive (i.e., there is no overlap between the edges of adjacent blades). As also seen in FIG. 1A and FIG. 1B, the circumferential blade spacing 128 of the blades 104 in the example blisk 100 is higher near the blade tips 122, and the circumferential blade spacing 130 of the blades is lower near the blade roots 120. As such, the circumferential blade spacing may increase or decrease between the hub and shroud of a blisk. As described below with reference to FIGS. 4A-B and to FIGS. 5A-B, the blade roots and/or the blade tips may be filleted to impart strength to a blisk. In some examples, the circumferential blade spacing may depend on the particular method used to manufacture a single-part blisk given the tolerances achievable with a given manufacturing method. For example, negative circumferential blade spacing may be possible when manufacturing single-part blisks. In some examples, the circumferential blade spacing may depend on other aspects of the blisk design. Certain aspects of this disclosure relate to designing blisks with desired circumferential spacing. For example, single-part blisks having relatively longer blade chords and/or relatively steeper stagger angles may reduce the axial space (real estate) that is available between the blades. As such, single-part blisks having relatively longer blade cords and/or relatively steeper stagger angles may have relatively smaller circumferential blade spacing.

The shroud 106 surrounds (circumscribes) the blades 104 of the blisk. As such, the shroud also may be referred to as a ring or annulus and/or may be described as having a ring-like or annular shape. As seen in FIG. 1C and FIG. 1D, the axial width of the shroud 106, in this example, is less than the axial width of the hub 108. In some examples, the axial width of the shroud may be the same as or greater than the axial width of the hub. As also seen in FIG. 1C and FIG. 1D, the axial width of the shroud 106 extends beyond the blade tip.

Figure 1G:
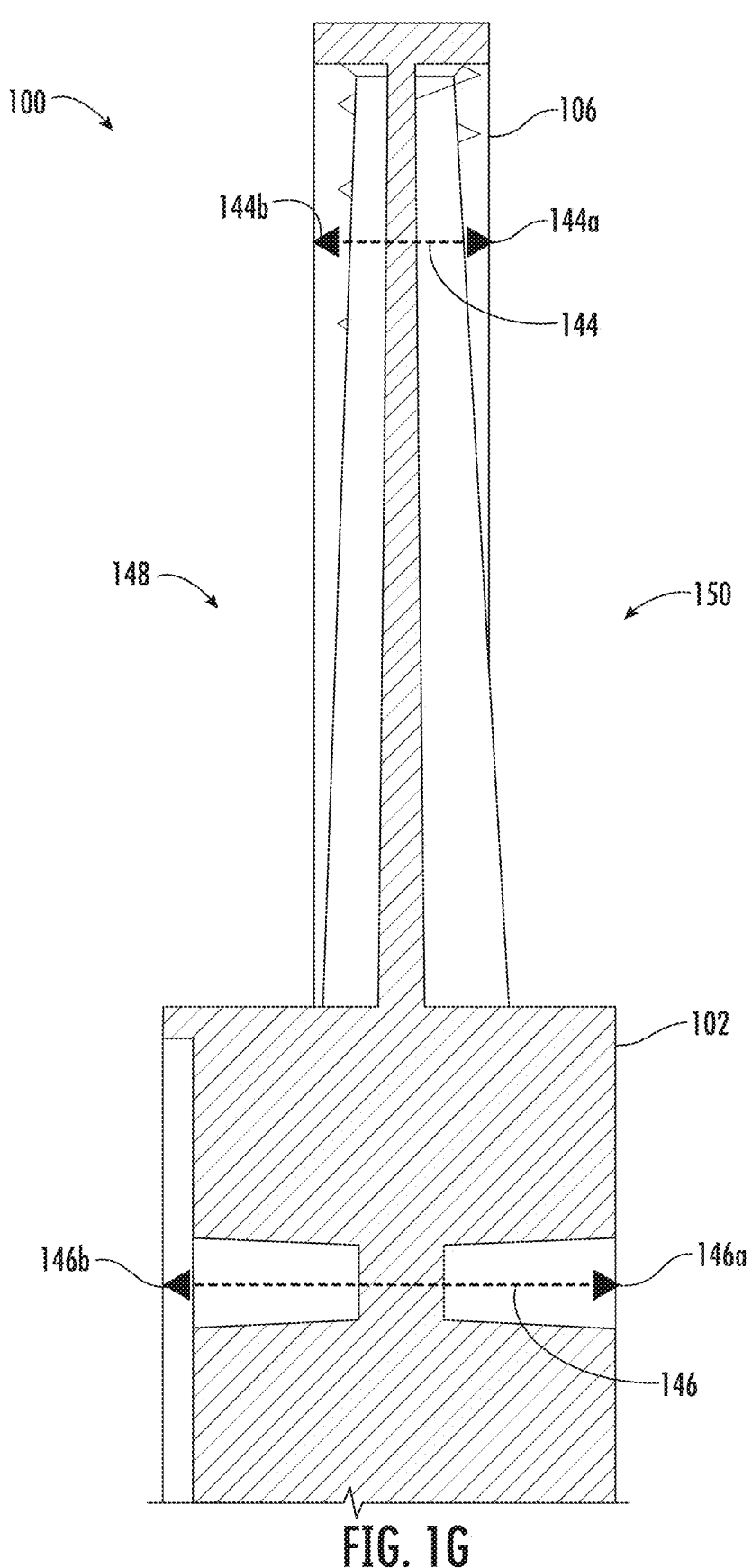
FIG. 1G depicts an enlarged cross-sectional side view of the example bladed disk of FIG. 1A with example dimensions of the hub and the shroud of the example bladed disk.

A single-part blisk also may define various dimensions. As seen in FIG. 1E, the single-part blisk 100, in this example, defines a blisk diameter 132, a blade tip-to-tip diameter 134, a blade length 136 (also referred to as a blade span), and a hub diameter 138. The blisk diameter 132 may be measured between diametrically opposed points 132a and 132b at the outer diameter (OD) of the shroud 106. The blade tip-to-tip diameter 134 may be measured between diametrically opposed points 134a and 134b at the inner diameter (ID) of the shroud 106. The difference between the blisk diameter 132 and the blade tip-to-tip diameter 134, therefore, may correspond to (e.g., equal) the radial thickness of the shroud 106. The blade length 136 may be measured, in general, from the root of the blade to the tip of the blade such as, for example, from the outer surface of the hub 102 (e.g., from the outer surface of the outer ring 112) to the inner surface of the shroud 106. The hub diameter 138 may be measured between diametrically opposed points 138a and 138b on the outer surface of the hub 102 (e.g., on the outer surface of the outer ring 112). As seen in FIG. 1F, the single-part blisk 100, in this example, also defines a blade root chord 140 and a blade tip chord 142. The blade root chord may be measured from the leading edge 124 to the trailing edge 126 of the blade 104 at the blade root 120. The blade tip chord 142 may be measured from the leading edge 124 to the trailing edge 126 of the blade at the blade tip 122. As seen in FIG. 1G, the single-part blisk 100, in this example, further defines an axial shroud width 144 and an axial hub width 146. The axial shroud width 144 may be measured between opposing points 144a and 144b on the shroud 106 at a first side 148 (e.g., a front side) and a second side 150 (e.g., a rear side) of the single-part blisk 100. The axial hub width 146 may be measured between opposing points 146a and 146b on the hub 102 at the first side 148 (e.g., the front side) and the second side 150 (e.g., the rear side) of the single-part blisk. The dimensions of a single-part blisk and the ratios between the dimensions of the single part blisk may impact the operational output of an air-moving device that includes the single-part blisk. As described in further detail below, the dimensions of a single-part blisk and the ratios between them may impact, for example, the exit jet velocity of the air-moving device, the fan pressure ratio of the air moving device, and the acoustics (noise levels) of the air-moving device.

Figures 1, 2, 2A, 3, 4:
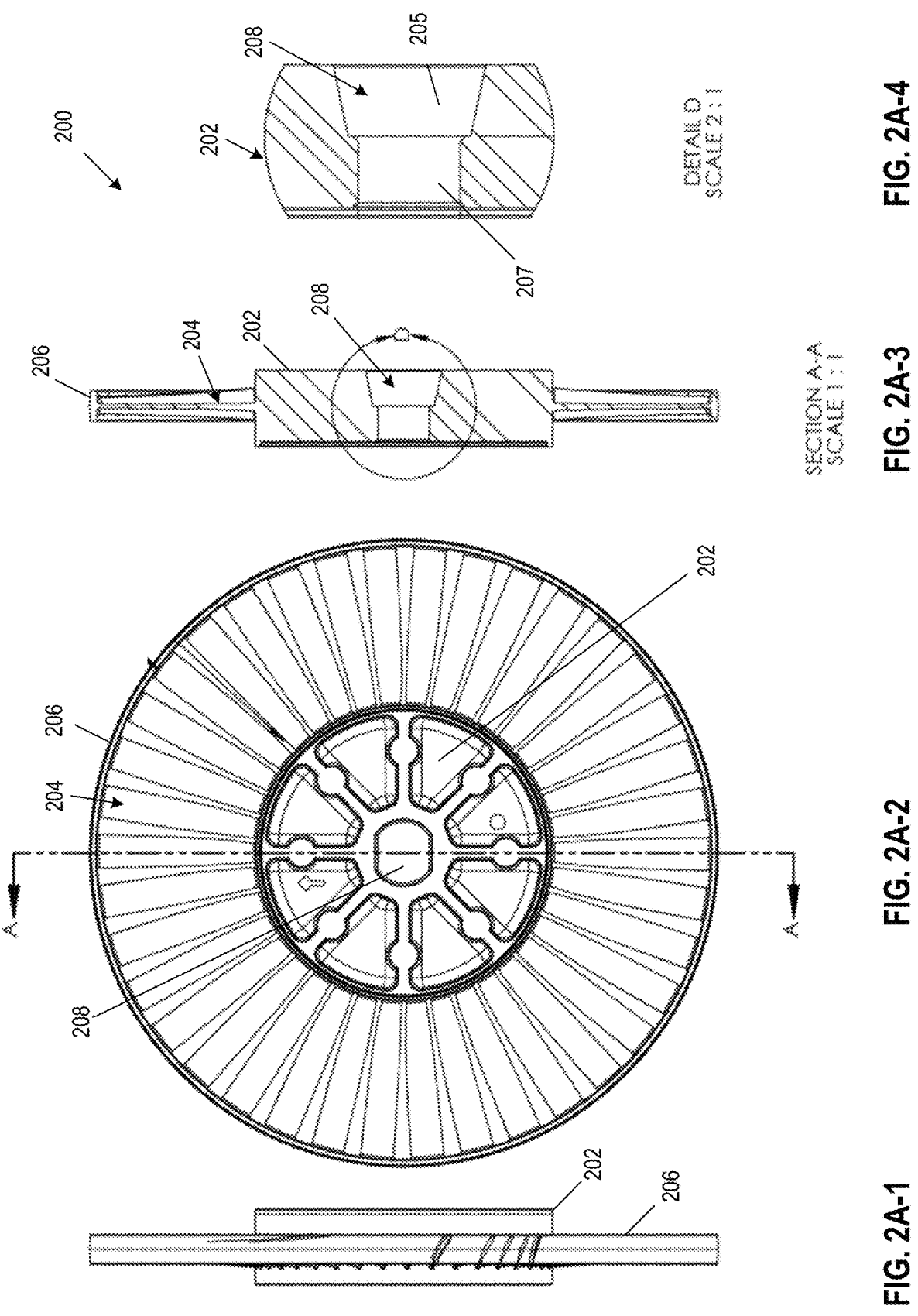
FIGS. 2A-1, 2A-2, 2A-3, and 2A-4 depict respective schematics for an example of a bladed disk in accordance with aspects of the present disclosure.
Figures 1, 2, 2B:
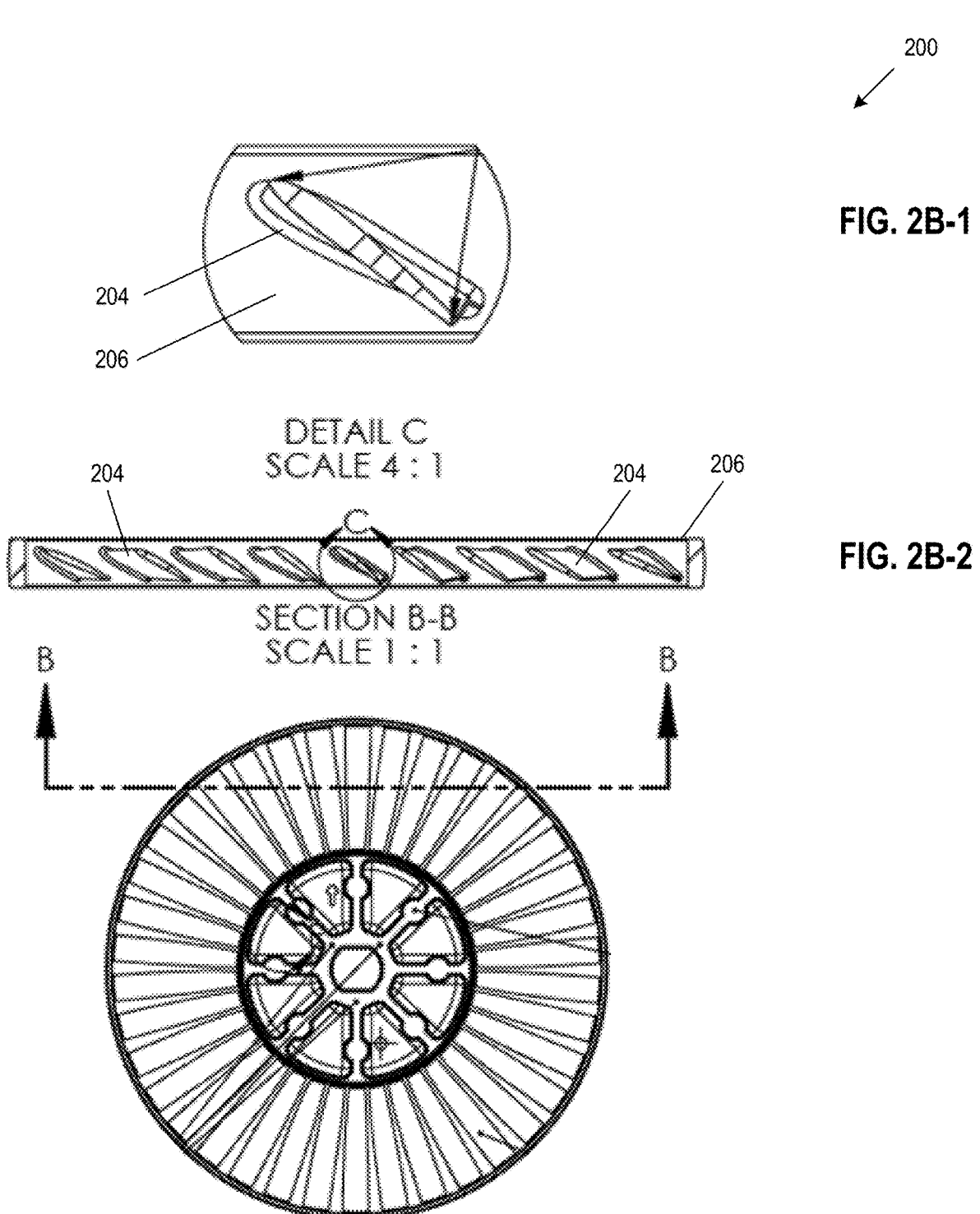
Figure 3:
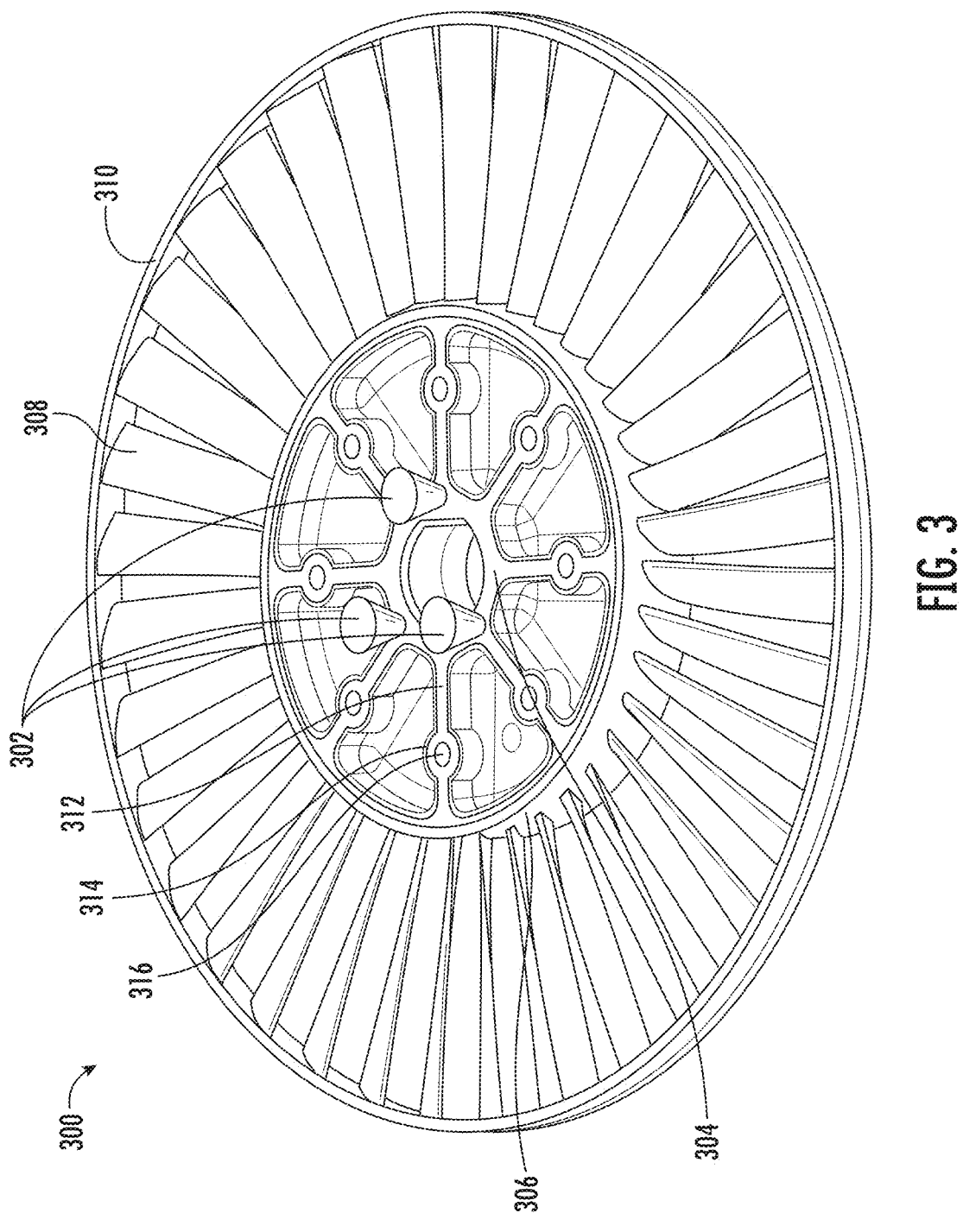

FIGS. 2A-1-2A-4 and FIGS. 2B-1-2B-3 respectively depict schematics for an example of a blisk 200 in accordance with aspects of the present disclosure. FIGS. 2A-1 and 2A-2, for example, respectively depict a side view and a front view of an example of a blisk 200. FIGS. 2A-3 and 2A-4 also respectively depict cross-sectional side views of the blisk 200 and a hub 202 of the example blisk. As seen in FIGS. 2A-3 and 2A-4, the central aperture 208 of the hub 202 of the single-part blisk 200, in this example, includes a tapered region 205 and a cylindrical region 207. In the tapered region 205 of the central aperture 208, an inner surface of the hub 202 may extend from an outer surface of the hub toward a center of the hub at an oblique angle (e.g., 24°) relative to the axis of rotation. The tapered region 205 may receive device (e.g., sleeve, collar, collet) used to fasten the a drive mechanism, such as a drive shaft of the motor, to the single-part blisk. FIGS. 2B-1-2B-2 respectively depict a cross-sectional view of a single blade 204 of the example blisk 200 and a cross-sectional view of a sequence of blades 204 across a shroud 206 of the example blisk. Single-part blisks as described herein may be manufactured using a variety of manufacturing techniques. As noted above, example techniques that may be suitable for manufacturing the single-part blisks described herein may include injection molding (e.g., A-B injection molding), compression molding, overmolding, casting, stamping, CNC machining, and the like. Example materials that may be suitable for manufacturing the single-part blisks described herein may include various types of plastics and polymers such as thermoplastics and thermosets (e.g., polyamide, PA; polybutylene terephthalate, PBT; liquid crystal polymer, LCP; polycarbonate, PC; polyphenylene sulfide, PPS; polysulfone, PSU; poly ether ketone, PEEK; polyamideimide, PAI; glass-filled nylon, GF; carbon fiber-filled nylon, CF; and the like), ABS (acrylonitrile butadiene styrene); ABS/PC (acrylonitrile butadiene styrene polycarbonate); PPSU (polyphenylsulfone); PESU (polyethersulfone); PEI (polyetherimide); PAI (polyamideimide); PAEK (polyaryletherketone); PEKK (polyetheretherketone); as well as compounds of one or more of these, such as ABS/PC as one non-limiting example, and other and/or cyanate esters, SMCs, polyimides, epoxies, etc.); various types of metallic materials (e.g., aluminum, titanium; and the like), and other types of materials such as carbon fiber, extruded carbon, and the like. For injection molded single-part blisks, A-B injection molding may be used whereby two molds having respective cavities that each define the contours of one of the sides of the single-part blisk (e.g., an "A" mold having a cavity defining a front side of the single-part blisk and a "B" mold having a cavity defining a rear side of the single-part blisk) are joined together such that their respective cavities define the volume of the single-part blisk, which may be filled with the injection molding material via one or more injection locations. Certain types of mold-based manufacturing techniques may result in ridges where the respective molds meet. For example, in FIG. 1C and FIG. 1D, a ridge line can be seen around the shroud 106 and the inner surface of the central aperture 108 of the single-part blisk 100. Despite any such ridges or ridge lines, the single-part blisk should still be understood as having a contiguous construction.

FIG. 3 depicts an example of a single-part blisk 300 that may be formed via injection molding. The single-part blisk 300 may include components and features as described herein, e.g., with respect to the hub, blades, and shroud discussed above with references to FIGS. 1A-G. The single-part blisk 300, in this example, thus include multiple injection points 302. As seen in FIG. 3, the injection points 302 are located on the inner ring 304 of the hub 306 of the single-part blisk 300. As also seen in FIG. 3, the single-part blisk 300 may be relatively thicker at the hub 306 (e.g., at the inner ring 304) relative to other locations. Positioning the injection points at this relatively thicker region of the single-part blisk 300 may facilitate a smooth flow of the material through the mold cavity into the relatively thinner regions (e.g., the blades 308, the shroud 310) during the injection molding process. Positioning the injection points radially around the center of the single-part blisk may facilitate an evenly distributed flow of the injection molding material through the mold toward its outer perimeter. Similar to the single-part blisk 100 described above with reference to FIGS. 1A-F, each spoke 312 of the single-part blisk 300, in this example, includes a rounded (e.g., cylindrical) boss 314. Each boss 314, in this example, includes a cavity 316 (e.g., a hole, a bore). One or more of the cavities 316 may function as a pocket (well) that may be used for weight balancing the single-part blisk 300 (e.g., by filling the cavities with epoxy or other weighted material to tune the weight balancing). One or more of the bosses 314 also may provide locations for ejector pins of the injection molding procedure as described herein.

Figures 4A, 4B, 5A, 5B:
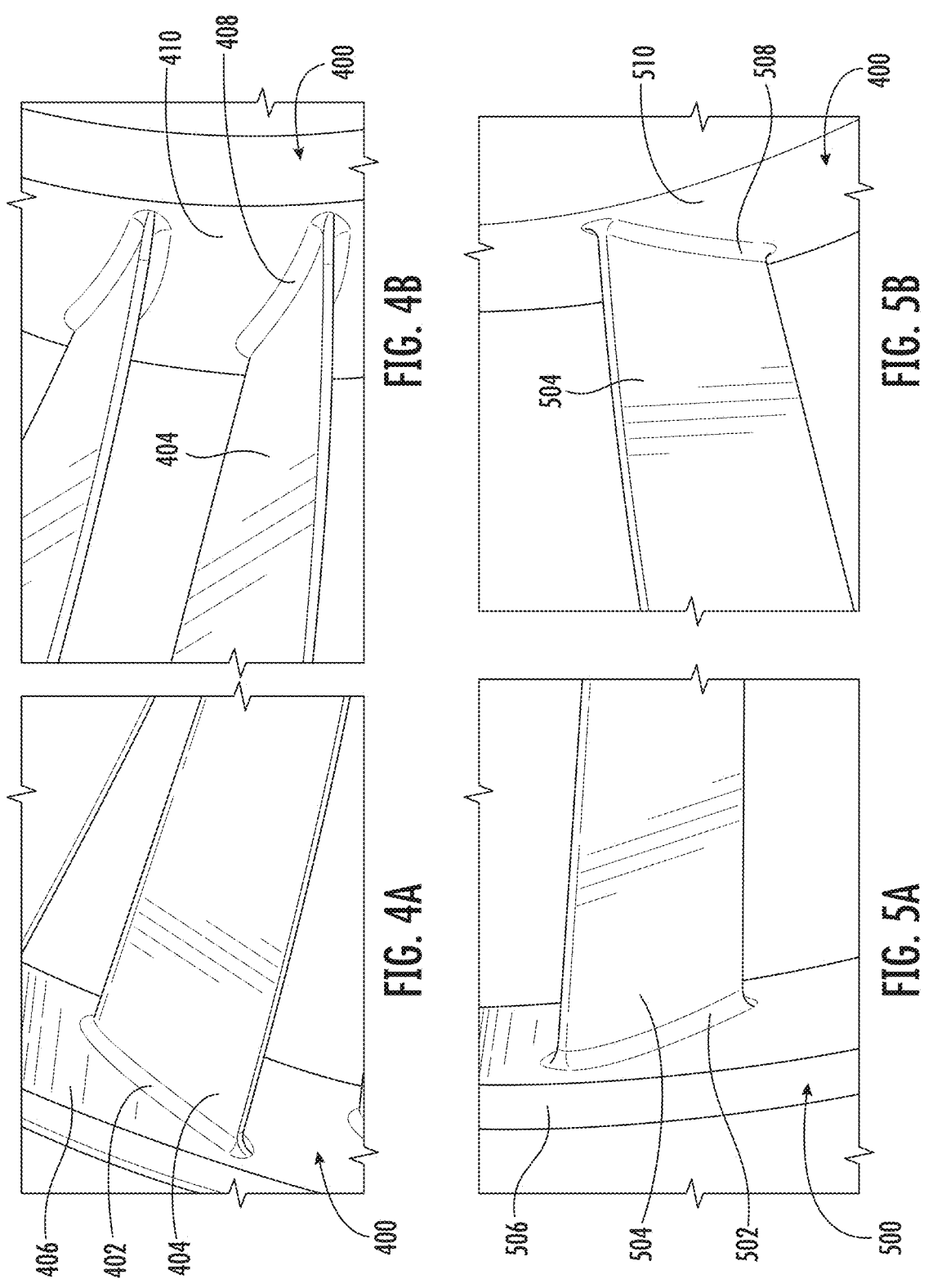
FIG. 4A depicts an example of a filleted tip of a blade of a bladed disk in accordance with aspects of the present disclosure.
FIG. 4B depicts an example of a filleted root of the blade of the bladed disk of FIG. 4A.
FIG. 5A depicts another example of a filleted tip of a blade of a bladed disk in accordance with aspects of the present disclosure.
FIG. 5B depicts an example of a filleted root of the blade of the bladed disk of FIG. 5B.

As described above, FIGS. 4A-B and FIGS. 5A-B depict a filleted region of a single-part blisk where a blade meets the shroud and the hub of the single-part blisk. FIG. 4A, for example, depicts a single-part blisk 400 having a first type of tip fillet 402 where the blade 404 meets the shroud 406.

FIG. 4B similarly depicts a first type of root fillet 408 where the blade 404 meets the hub 410 of the single-part blisk 400. FIG. 5A depicts a single-part blisk 500 having a second type of tip fillet 502 where the blade 504 meets the shroud 506. FIG. 5B similarly depicts a second type of root fillet 508 where the blade 504 meets the hub 510 of the single-part blisk 500.

Figures 6A, 6B, 6C:
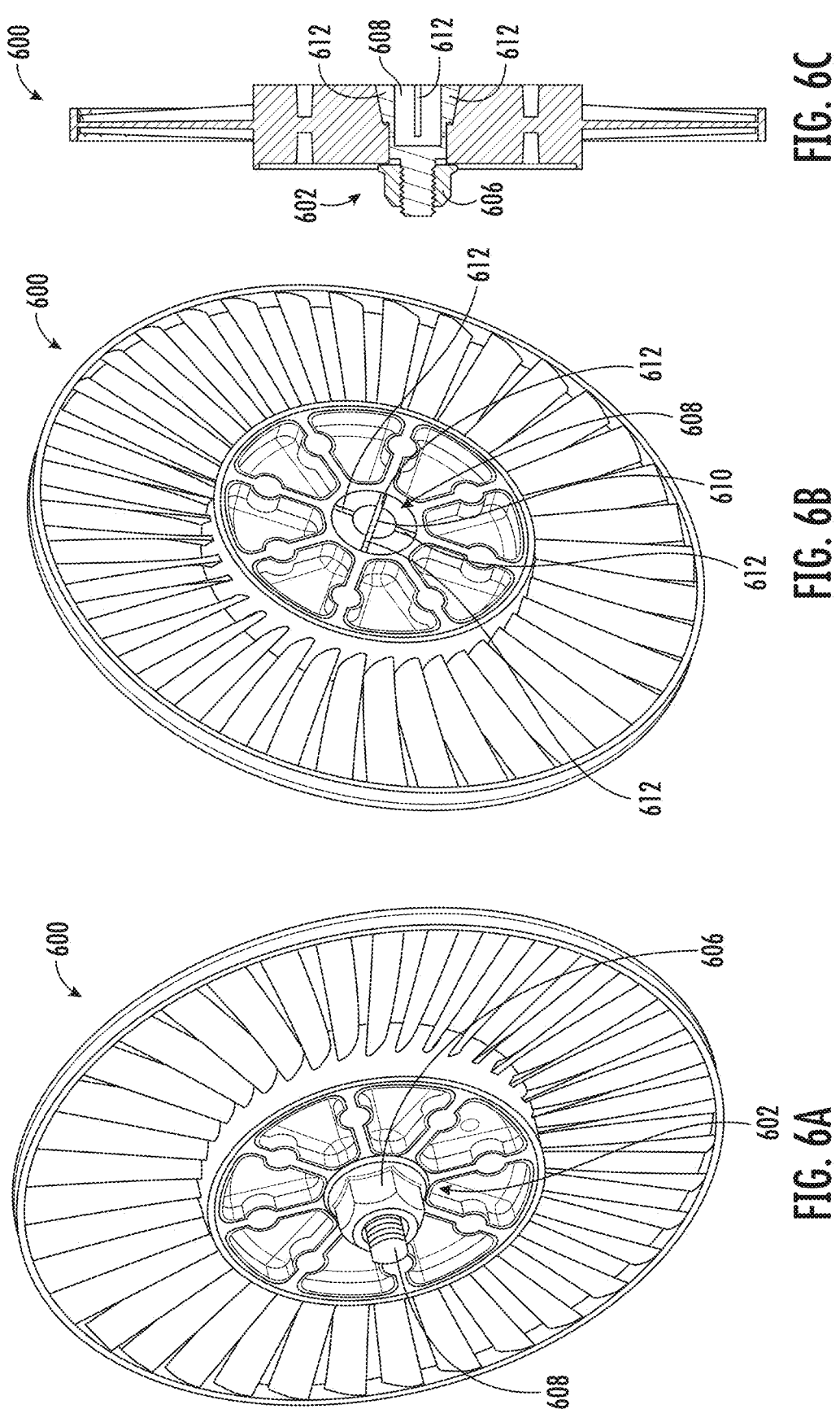
FIG. 6A depicts a front perspective view of an example of a bladed disk with an example of a motor interface fastener in accordance with aspects of the present disclosure.
FIG. 6B depicts a rear perspective view of the example bladed disk of FIG. 6A.
FIG. 6C depicts a side cross-sectional view of the example bladed disk of FIG. 6A.
Figure 7:
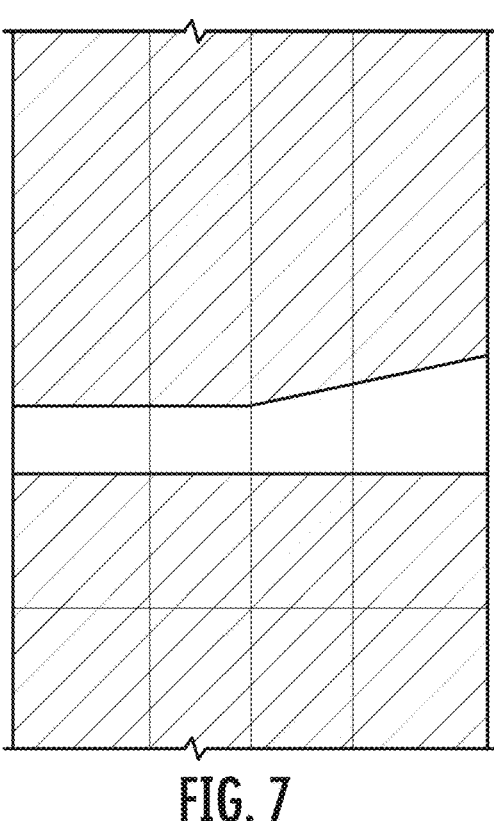
FIG. 7 depicts a side cross-sectional view of an example drive shaft mating feature of an example hub of a bladed disk in accordance with aspects of the present disclosure.
Figure 8:
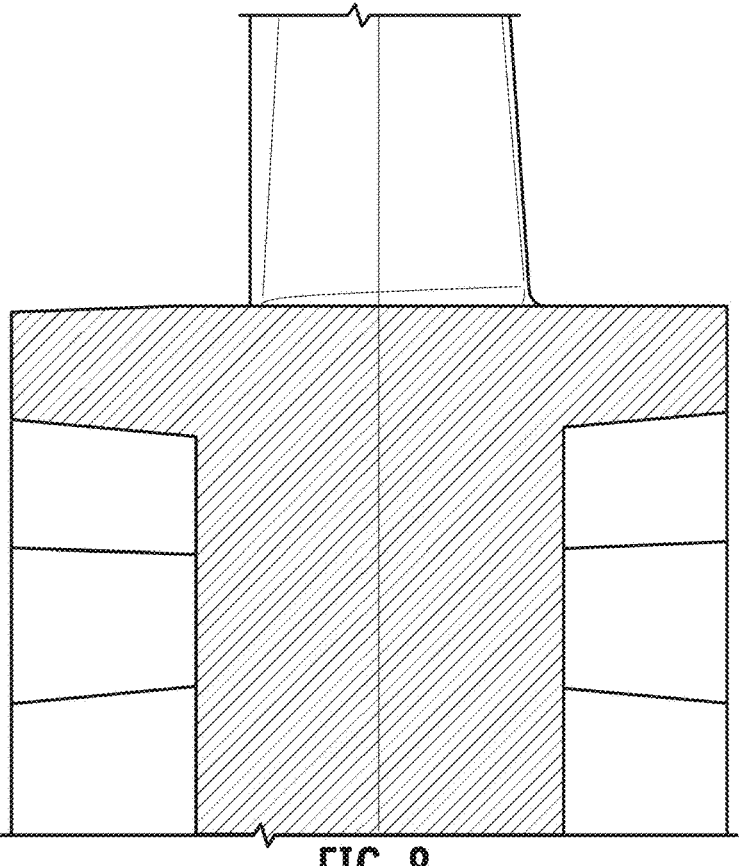
FIG. 8 depicts a side cross-sectional view of another example of a hub of a bladed disk in accordance with aspects of the present disclosure.
Figure 9B:
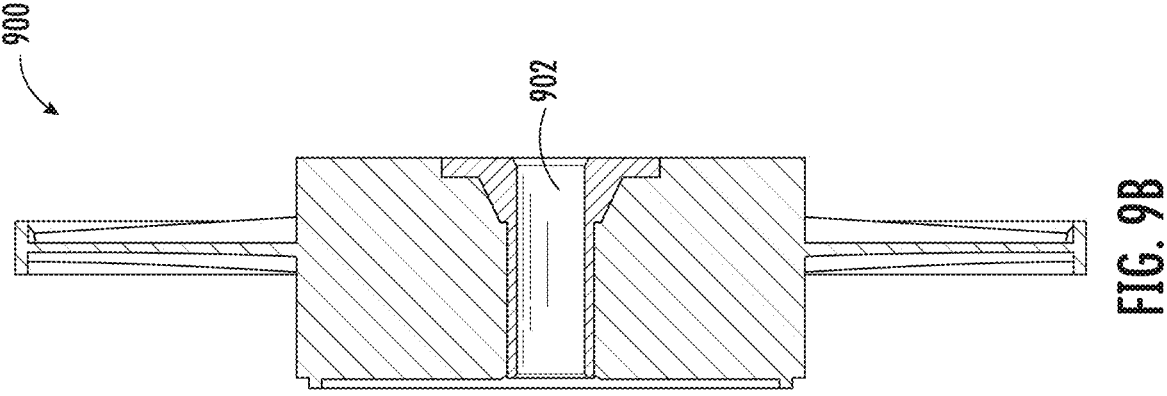
FIG. 9B depicts a side cross-sectional view of the example bladed disk of FIG. 9A.
Figure 9A:
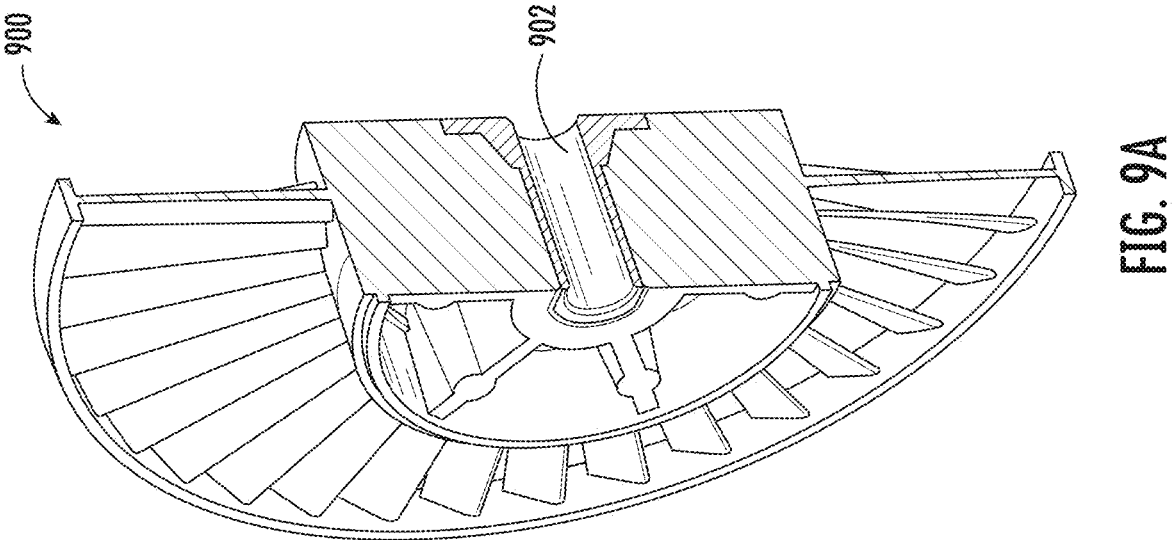
FIG. 9A depicts a perspective cross-sectional view of an example of a bladed disk with another example of a motor interface in accordance with aspects of the present disclosure.

FIGS. 6A-C depict respective front, perspective, and cross-sectional side views of an example single-part blisk 600 with an example motor interface fastener 602. As seen in FIG. 6A and FIG. 6B, the motor interface fastener 602, in this example, includes a nut 606 that attaches to a threaded collet 608 received within the central aperture 610 of the single-part blisk 600. As also seen in FIG. 6B, the collet 608 includes multiple grooves 612 (channels) that are sized and shaped to receive flanges of a drive mechanism, such as a drive shaft of the motor. As seen in FIG. 6C, the collet 608 may be tapered to match the tapered contour of the central aperture of the single-part blisk 600. Other fastening mechanisms may be used to couple a single-part blisk to a motor drive mechanism (e.g., drive shaft), such as for example, a press-fit collet, a heat-set insert, a set screw, amongst others). FIG. 7 depicts a cross-section of a drive shaft mating feature at a center of an example of a hub. FIG. 8 depicts a cross-section at an outer ring (e.g., outer ring 112 in FIG. 1) of an example hub. FIGS. 9A-B depict respective perspective and side cross-sectional views of an example of a single-part blisk 900 with a press-fit collet 902 used with the motor interface.

Figures 10A, 10B, 10C:
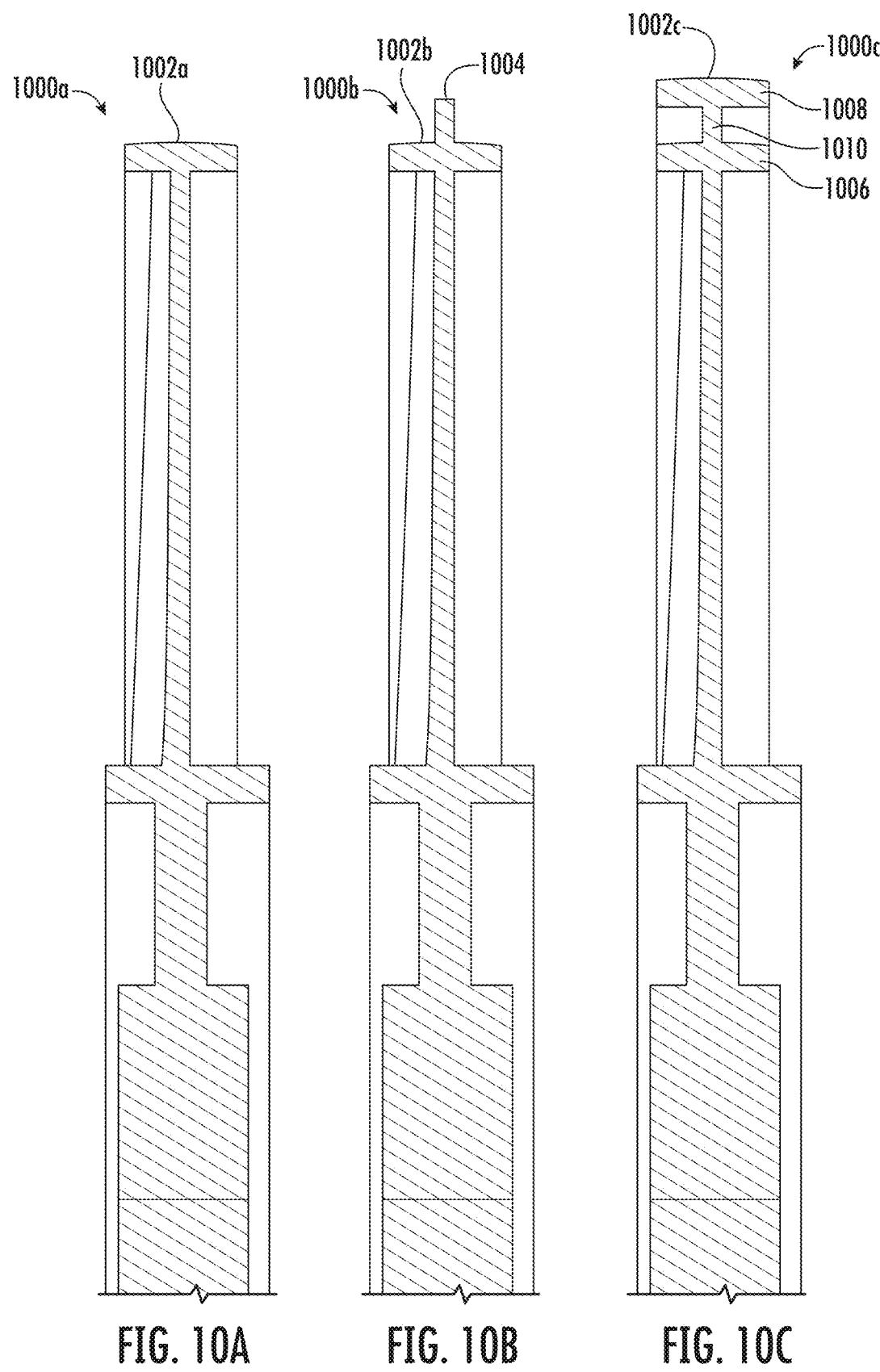
FIG. 10A depicts a cross-sectional view of an example of a bladed disk with an example of a tip seal in accordance with aspects of the present disclosure.
FIG. 10B depicts a cross-sectional view of an example of a bladed disk with another example of a tip seal in accordance with aspects of the present disclosure.
FIG. 10C depicts a cross-sectional view of an example of a bladed disk with a further example of a tip seal in accordance with aspects of the present disclosure.

A single-part blisk may also include features that facilitate sealing of an outer perimeter of the blisk when installed in an air-moving device. FIGS. 10A-C depict respective examples of single-part blisks 1000a-c having different tip sealing features. In FIG. 10A, for example, the single-part blisk 1000a includes a shroud 1002a having a slightly curved outer surface that may facilitate sealing by, for example, abutting an inner surface of a duct (or other material such as a radial foam) that surrounds the single-part blisk when installed in an air-moving device. In FIG. 10B, the shroud 1002b of the single-part blisk 1000b includes a radial wall 1004 extending substantially perpendicularly away from the shroud. The shroud 1002b may similarly facilitate sealing by the radial wall 1004 abutting an inner surface of a duct (or other material such as a radial foam) that surrounds the single-part blisk 1000b when installed in an air-moving device. In FIG. 10C, the shroud 1002c includes multiple shroud layers, for example, an inner shroud layer 1006 and an outer shroud layer 1008 with a radial wall 1010 extending substantially perpendicularly between the inner and outer shroud layers. The shroud 1002c may similarly facilitate sealing by way of the radial wall 1010 and the outer shroud layer 1008 abutting an inner surface of a duct (or other material such as a radial foam) that surrounds the single-part blisk 1000c. In some examples, a single-part blisk also may include a mid-span shroud between an inner shroud layer (e.g., inner shroud layer 1006) and an outer shroud layer (e.g., outer shroud layer 1008). For example, a mid-span shroud may be located about halfway between and inner shroud and outer shroud layer, closer to the inner shroud layer, or closer to the outer shroud layer. A mid-span shroud may have dimensions (e.g., thickness, length, etc.) that are substantially the same as or similar to an inner shroud layer and/or an outer shroud layer.

Figure 10D:
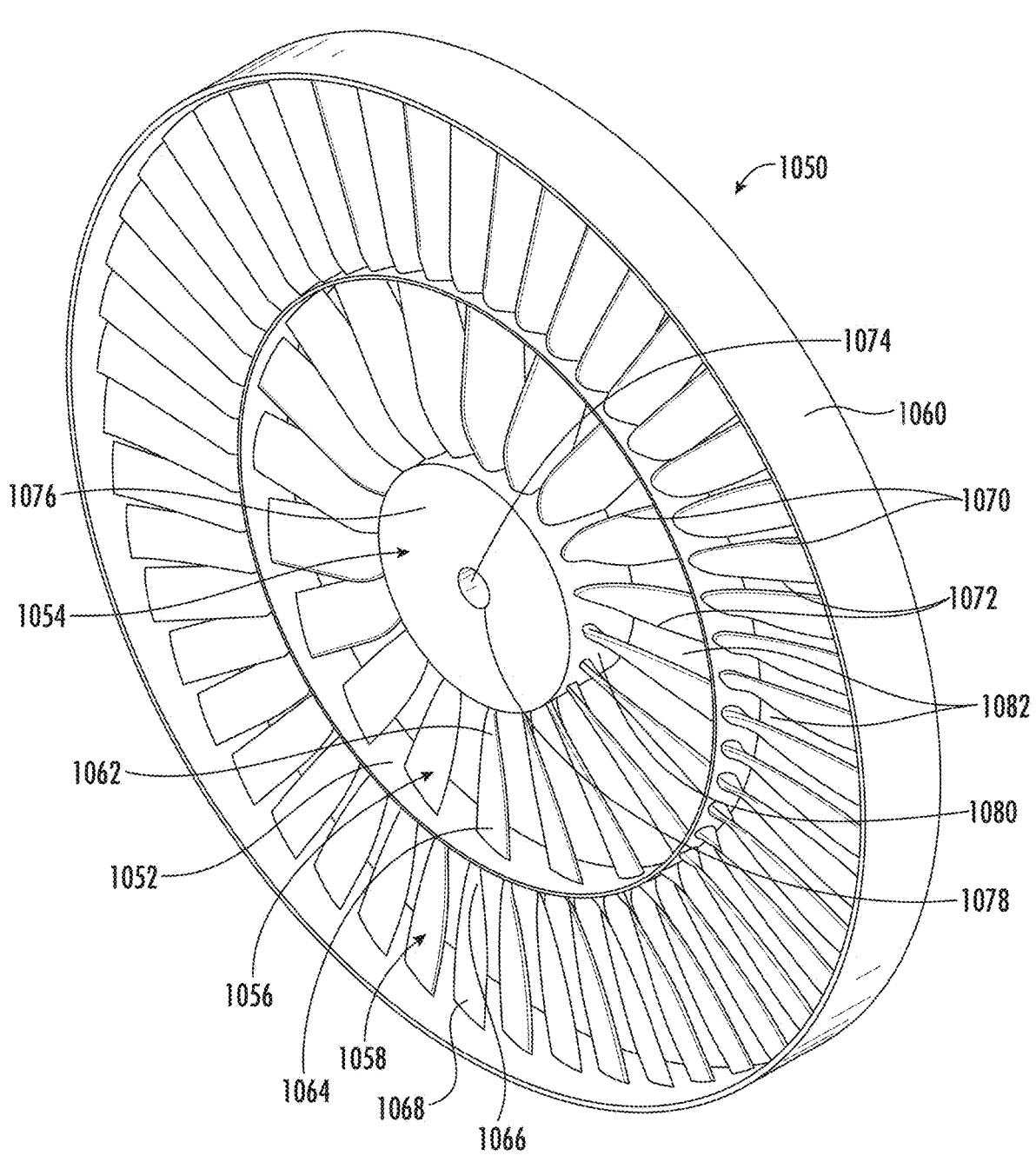
FIG. 10D depicts an example of a bladed disk having a mid-span shroud in accordance with aspects of the present disclosure.

FIG. 10D depicts an example of a single-part blisk 1050 having a mid-span shroud 1052. A mid-span shroud (e.g., mid-span shroud 1052) also may be referred to as an inner shroud or an intermediate shroud. The single-part blisk 1050 may be incorporated in any of the air-moving devices disclosed herein. The single-part blisk 1050, in this example, may include a hub 1054, multiple inner blades 1056, a mid-span shroud 1052, multiple outer blades 1058, and a tip/outer shroud 1060. For ease of reference, not every inner blade 1056 and outer blade 1058 are labeled in FIG. 18. Inner blades 1056 coextend radially between an outer surface of the hub 1054 and an inner surface of the mid-span shroud 1052. Outer blades 1058 may also coextend radially between an outer surface of the mid-span shroud 1052 and an inner surface of the tip/outer shroud 1060. Each inner blade 1056, in this example, may be contiguous with the hub 1054 and the mid-span shroud 1052. Similarly, each outer blade 1058 may be contiguous with the mid-span shroud 1052 and the tip/outer shroud 1060. For example, the surface of the hub 1054 is contiguous with the surface of each inner blade 1056 and the surface of the mid-span shroud 1052, and the surface of the mid-span shroud 1052 is contiguous with the surface of each outer blade 1058 and the surface of the tip/outer shroud 1060 such that the entire surface across the single-part blisk 1050 is one contiguous surface as described herein. The construction of a single-part blisk with a mid-span shroud also may be in accordance with the disclosures provided herein.

As seen in FIG. 10D, each of the inner blades 1056 and the outer blades 1058 may include a twist as it extends from the hub 1054 to the mid-span shroud 1052, and from the intermediate shroud to the tip/outer shroud 1060, respectively. As described above, the root 1062 of an inner blade 1056 and the tip 1064 of the inner blade, and the root 1066 of an outer blade 1058 and the tip 1068 of the outer blade 1058 may be oriented at different angles relative the axis of rotation. Each blade 1056 and 1058 also includes a leading edge 1070 and a trailing edge 1072. As described above, the leading edge of a blade refers to the edge of the blade that first meets an airflow flowing through the aerodynamic rotor. The angle between the chord line of inner blade 1056 and outer blade 1058 and the relative wind is defined as the angle of attack. In some examples, the orientation of inner blades 1056 to outer blades 1058 may be different. In still other examples, the orientation of inner blades 1056 to outer blades 1058 may be the same. It will be appreciated that the inner blades 1056 and the outer blades 1058 may include the same features and dimensions as blades 104 discussed herein.

The hub 1054 may also include a central aperture 1074 that provides a motor interface for the single-part blisk 1050. For example, the central aperture 1074 of the hub 1054 may be sized and shaped to receive a shaft or other drive mechanism of a motor that drives rotation of the single-part blisk 1050. As discussed herein, those skilled in the art will appreciate that outrunner motors are within the scope of this disclosure and that reference to an example drive shaft or drive mechanism is not to exclude other types of known motors, engines, etc. The hub 1054 of the single-part blisk 1050 may otherwise be solid across the face of the rotor but for the central aperture that receives the drive mechanism. The hub 1054 may also include a forward face 1076 (i.e., facing the airstream), an inner ring 1078, an outer ring 1080. One of skill in the art will appreciate that, in some examples, the hub 1054 may also include additional features as previously discussed in the present disclosure.

A blisk with a mid-span shroud (e.g., the single-part blisk 1050) may include inner blades having a reduced blade count when compared to a blade count of the outer blades. In other examples, a blisk with a mid-span shroud may include inner blades having a greater blade count when compared to a blade count of the outer blades. In yet another example, a blisk having a mid-span shroud may include inner blades having a blade count that is the same as a blade count of the outer blades. A blisk having a mid-span shroud (e.g., the single-part blisk 1050) may include blades that are configured (e.g., optimized) for cooling (e.g., to cool an electric motor), that are configured (e.g., optimized) for producing thrust, and/or that are configured (e.g., optimized) to minimize noise. In some examples, the inner blades may be optimized for cooling. In some examples, the outer blades may be optimized for producing thrust and/or to minimize noise. The inner blades 1056 of the single-part blisk 1050, in this example, are configured for cooling. As also seen in FIG. 10D, the respective circumferential blade spacings 1082 between the inner blades 1056 and the outer blades 1058 of the single-part blisk 1050, in this example, is relatively higher near the respective tips 1064 and 1068 of the inner blades 1056 and outer blades 1058 and relatively lower near the respective roots 1062 and 1066 of the inner blades and the outer blades. The circumferential inner blade spacing may change between the hub and mid-span shroud. Similarly, the circumferential outer blade spacing may change between the mid-span shroud and the tip/outer shroud.

Figures 11A, 11B:
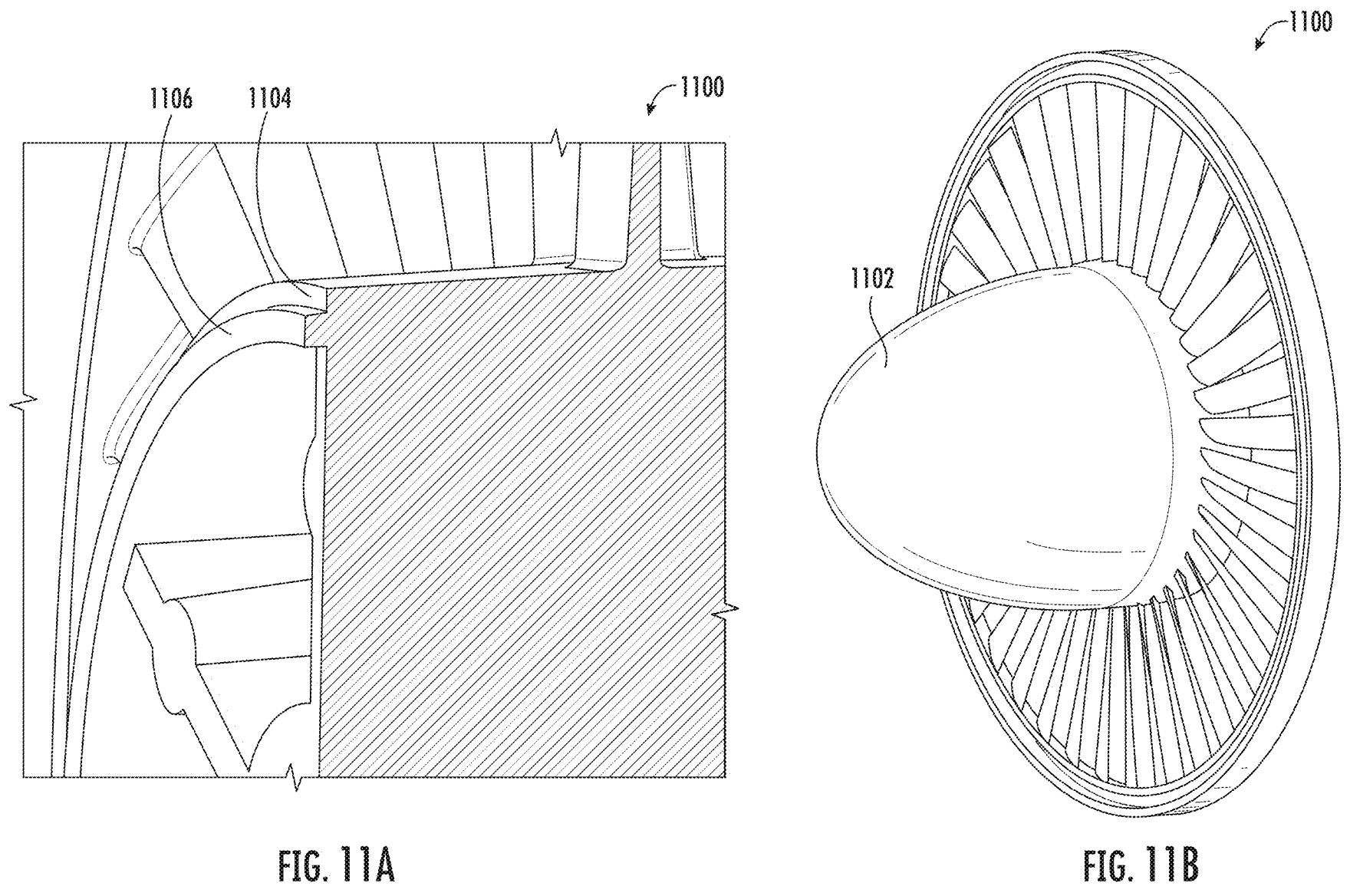
Figures 1, 12A, 12B, 12C, 12D, 12E, 12F:
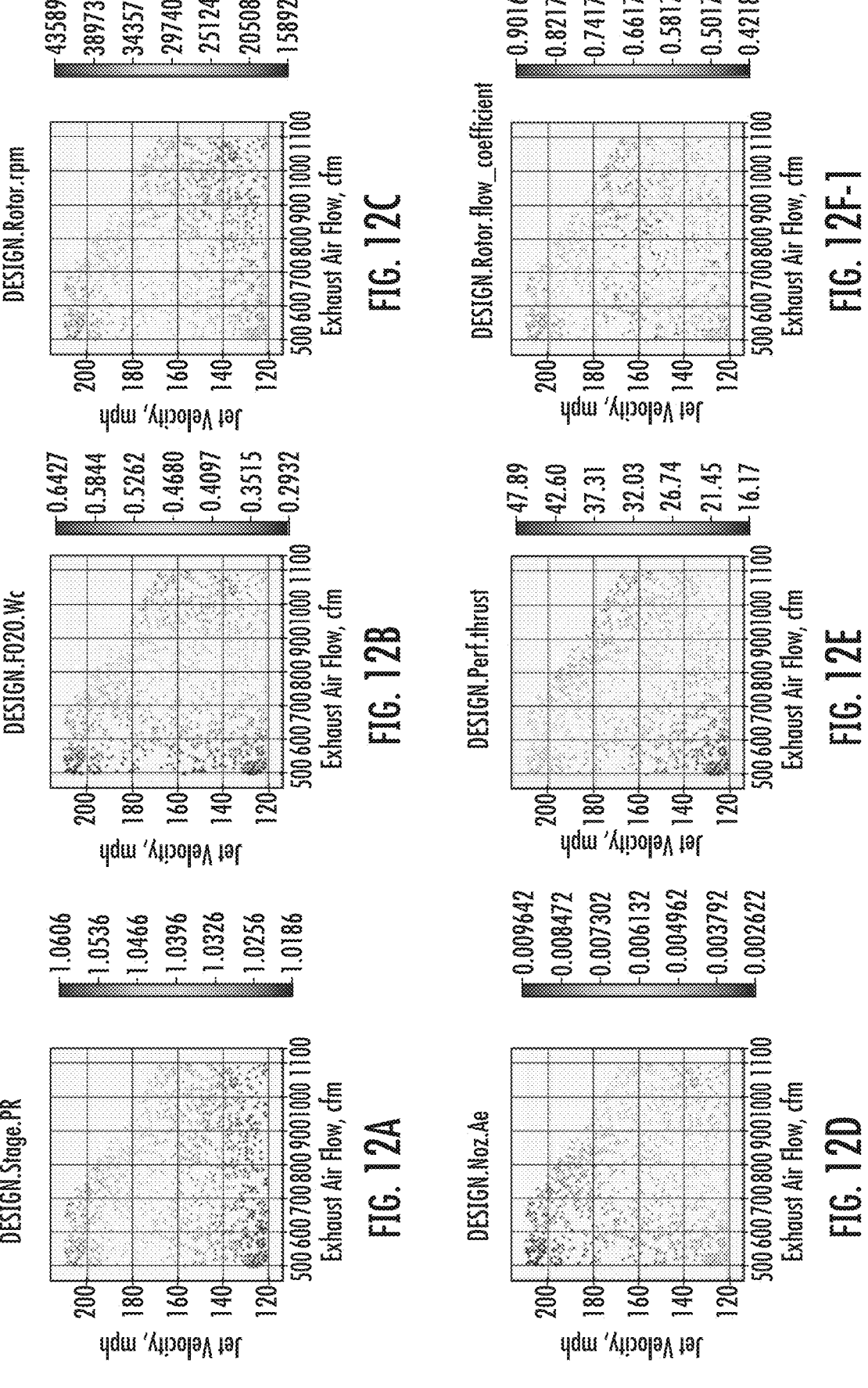
FIGS. 12A-Z depict respective plots of various design parameters and operational parameters for an example air blower design.
Figures 2, 12F, 12G, 12H, 12I, 12J, 12K:
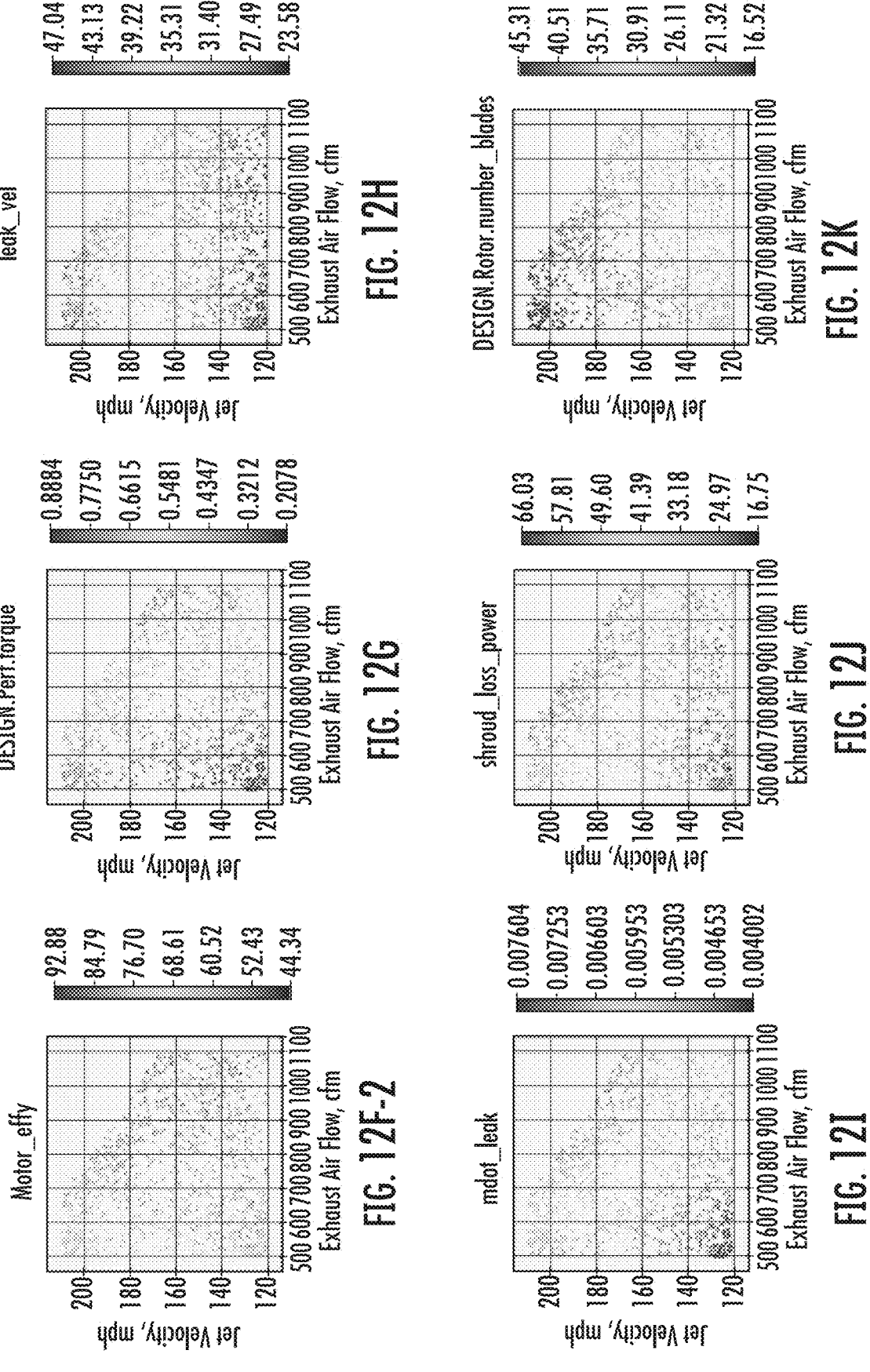
Figures 12L, 12M, 12N, 12O, 12P, 12Q:
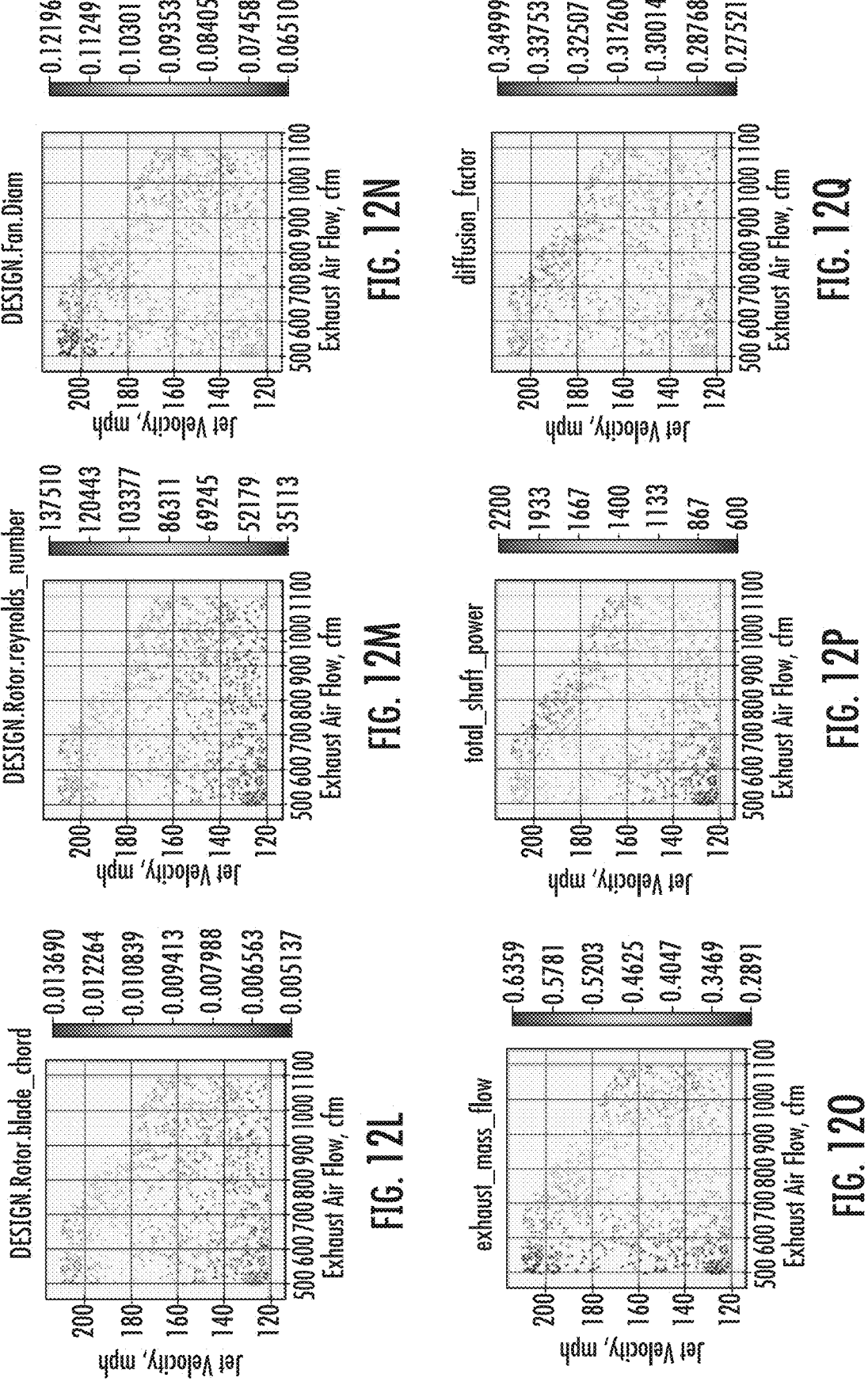
Figures 12X, 12Y, 12Z:
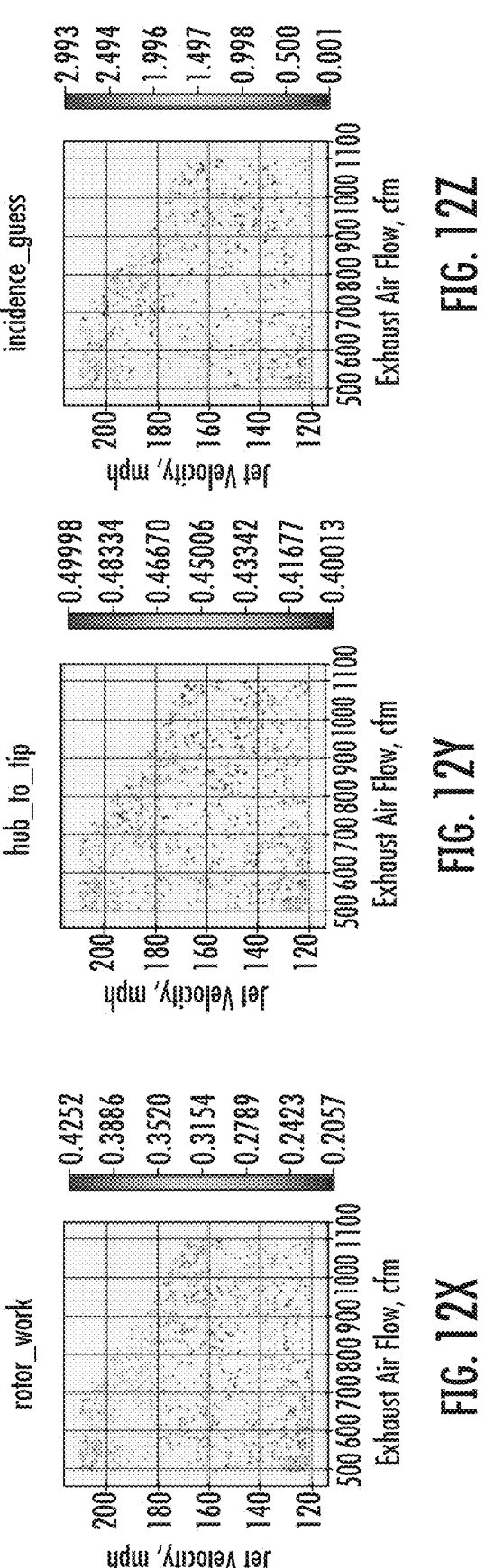

FIGS. 11A-B depict respective cross-sectional perspective and perspective views of an example single-part blisk 1100 that is configured with a nose cone 1102. In some examples, a nose cone may be integrally formed and contiguous with a blisk such that the blisk and nose cone constitute a singular, unitary part. For example, a single-part blisk with nose cone may be manufactured via injection molding (or other techniques) as described herein. In some examples a nose cone may be coupled (attached, fixed) to a single-part blisk after manufacturing the single-part blisk. A single-part blisk may include features that facilitate coupling of a nose cone to the single-part blisk. As seen in FIG. 11A, for example, the hub 1104 of the single-part blisk 1100 volume of air movement in the range of 500-1,100 cubic feet per minute (cfm) (i.e., 14.1584-31.14853 cubic meters per minute, cmm). In FIGS. 12A-Z, therefore, exit jet velocity is plotted along the y-axis, volume of air movement is plotted along the x-axis, and the single-point parameter (metric) is plotted as a gradient along the color axis with minimum/maximum bounds and intermediary values indicated along the gradient. The modeling, in this example, was also subject to a circumferential blade spacing constraint of >1 mm and a tip speed of <500 feet per second (ft/s) (i.e., 152.4 m/s). The plots in FIGS. 12A-Z thus provide anticipated (expected, potential) values of a particular blisk geometry, operational parameter, or operational output at the specified exit jet velocity and volume of air movement. The values indicated in these example plots, therefore, may be selected and or combined to inform a particular design of a single-part blisk that is expected to achieve the specified exit jet velocity and volume of air movement when included in an air moving device. For example, as shown in Table 1 below, design parameters such as nozzle exhaust area, quantity of blades, blade chord, blisk diameter, circumferential blade spacing, blade aspect ratio (ratio of blade length to blade chord), and tip solidity (quantity of blades times blade tip chord divided by circumference of the blisk at the blade tips) may be selected as design parameters to inform the potential design space for a single-part blisk with the manufacturing constraints noted above (e.g., circumferential blade spacing and tip speed). Given that the blade chord may change along the length of the blade (e.g., increase from the blade root to the blade tip), the blade aspect ratio, additionally or alternatively, be defined based on the square of the blade length divided by the plan form area of the blade (e.g., the two-dimensional surface corresponding to a face of the blade). A single-part blisk thus may be manufactured as described herein with geometries that fall within the design space defined by the bounds of the selected design parameters.

TABLE 1

Bounds for Selected Blisk Design Parameters with Manufacturing and Operational Constraints.

| Parameter | Min | Max | Unit |
|---|---|---|---|
| DESIGN.Noz.Ae (exhaust area) | 0.002622048186582669 | 0.0096420629070340088 | m^2 |
| DESIGN.Rotor.number_blades | 16.517871221668408 | 45.30635111164659 | # |
| DESIGN.Rotor.blade_chord | 0.005137223663898165 | 0.013689744568875112 | m |
| DESIGN.Fan.Diam | 0.06510085819584334 | 0.12196187214446734 | m |
| circum_spacing | 0.0010005270572008272 | 0.002288919315390137 | m |
| blade_aspect_ratio | 1.2402938721884063 | 6.2001762644850285 | |
| tip_solidity | 0.4497670149803066 | 1.1355076795719112 | | includes a rim 1106 (ledge) configured for coupling to the nose cone 1102 (e.g., received within a corresponding cavity of the nose cone, threaded for threading onto the nose cone, etc.).

FIGS. 12A-Z depict example plots of modeled single-point blisk geometries, operational parameters, and operational output for an example air-moving device that includes a single-part blisk as described herein over a specified range of exit air velocities (the air velocity exiting the air-moving device) and volume of air movement (the volume of air exiting the air-moving device). The exit air velocity also may be referred to as the exit jet velocity, and the volume of air movement also may be referred to as the exhaust air flow. For the plots in FIGS. 12A-Z, the modeling was performed for an exit jet velocity in the range of 120-210 miles per hour (mph) (i.e., 53.645-93.878 meters per second, m/s) and a Using the selected design parameters in Table 1 as a guide, examples of single-part blisks may include single-part blisks having a quantity of blades in the range of about 16-45 blades, a blade chord in the range of about 5-15 mm, a blisk diameter of about 65-122 mm, a circumferential blade spacing in the range of about 1-2 mm, a blade aspect ratio in the range of about 1.24-6.20, and a blade tip solidity in the range of about 0.45-1.14. In addition, the nozzle of an example air-moving device that incorporates a single-part blisk with these design parameters may have an exhaust area in the range of about 2,600-9,600 square millimeters (mm2). Based on the modeling performed, the air-moving device, in this example, may be expected to provide an exit jet velocity in the range of about 120-210 mph with a volume of air movement in the range of about 500-1,100 cfm.

FIGS. 12A-F-1, in this example, includes plots for stage pressure ratio indicating the ratio of total pressure after the fan stage to the total pressure before the fan stage ("Stage.PR"), corrected mass flow indicating the measurement of air is moving through the fan per unit of time, which may be for example kg/s ("F020.Wc"), blisk rotations per minute (rpm) ("Rotor.rpm"), nozzle exhaust area expressed in square meters ("Noz.Ae"), thrust performance expressed in Newtons (N) ("Perf.thrust"), and blisk flow coefficient ("Rotor.flow_coefficient"). FIGS. 12F-2-K, in this example, includes plots for motor efficiency ("Motor_effy"), torque performance ("Perf.torque"), leak velocity expressed in spacing that included both negative and positive circumferential blade spacings (e.g., in the range of about-17 mm to about 1 mm) whereas the constrained modeling yielded only positive circumferential blade spacings (e.g., in the range of about 1 mm to about 2 mm). Additional examples will be appreciated upon comparing the minimum and maximum bounds for the selected parameters in Table 1 and Table 2 as well as comparing the plots in FIGS. 12A-Z to the plots in FIGS. 13A-Z.

TABLE 2

| Bounds for Selected Blisk Design Parameters without Manufacturing or Operational Constraints. | | | |
|---|---|---|---|
| Parameter | Min | Max | Unit |
| DESIGN.Noz.Ae (exhaust area) | 0.0026757322451973937 | 0.00950901233084607 | m^2 |
| DESIGN.Rotor.number_blades | 20.029301286702026 | 50.38676984658995 | # |
| DESIGN.Rotor.blade_chord | 0.0062805135106639735 | 0.03186878922098101 | m |
| DESIGN.Fan.Diam | 0.07875986943400469 | 0.14739143383299533 | m |
| circum_spacing | −0.017471141090270575 | 0.0011145946829084297 | m |
| blade_aspect_ratio | 0.7467272670331806 | 5.291497665568852 | |
| tip_solidity | 0.6531840657798944 | 2.548472208544709 | | meters per second ("leak_vel"), mass flow of leakage around an outer shroud of a blisk expressed in kilograms per second (kg/s) ("mdot_leak"), shroud power loss expressed in Watts (W) ("shroud_loss_power"), and quantity of blades ("Rotor. number_blades"). FIGS. 12L-Q, in this example, includes plots for blade chord expressed in meters ("Rotor. blade_chord"), blade Reynolds number ("Rotor.reynolds_number"), blisk diameter expressed in meters indicating the diameter of the blade tips at the inner surface of the outer shroud ("Fan.Diam"), exhaust mass flow expressed in kg/s ("exhaust_mass_flow"), drive shaft power expressed in Watts ("total_shaft_power"), and diffusion factor ("diffusion_factor"). FIGS. 12R-W, in this example, includes plots for duct expansion ratio ("duct_expansion_ratio"), blade aspect ratio ("blade_aspect_ratio"), circumferential blade spacing expressed in meters ("circum_spacing"), blade tip speed expressed in m/s ("tip_speed"), blisk face (fan face) velocity expressed in m/s indicating an average velocity of air passing through the blisk ("V_fanface"), and blade tip solidity ("tip_solidity"). FIGS. 12X-Z, in this example, includes plots for a work coefficient of the rotor ("rotor_work"), hub-to-tip ratio (ratio of hub diameter to blisk diameter) ("hub_to_tip"), and blade incidence angle expressed in degrees ("incidence guess").

Figures 2, 13F, 13G, 13H, 13I, 13J, 13K:
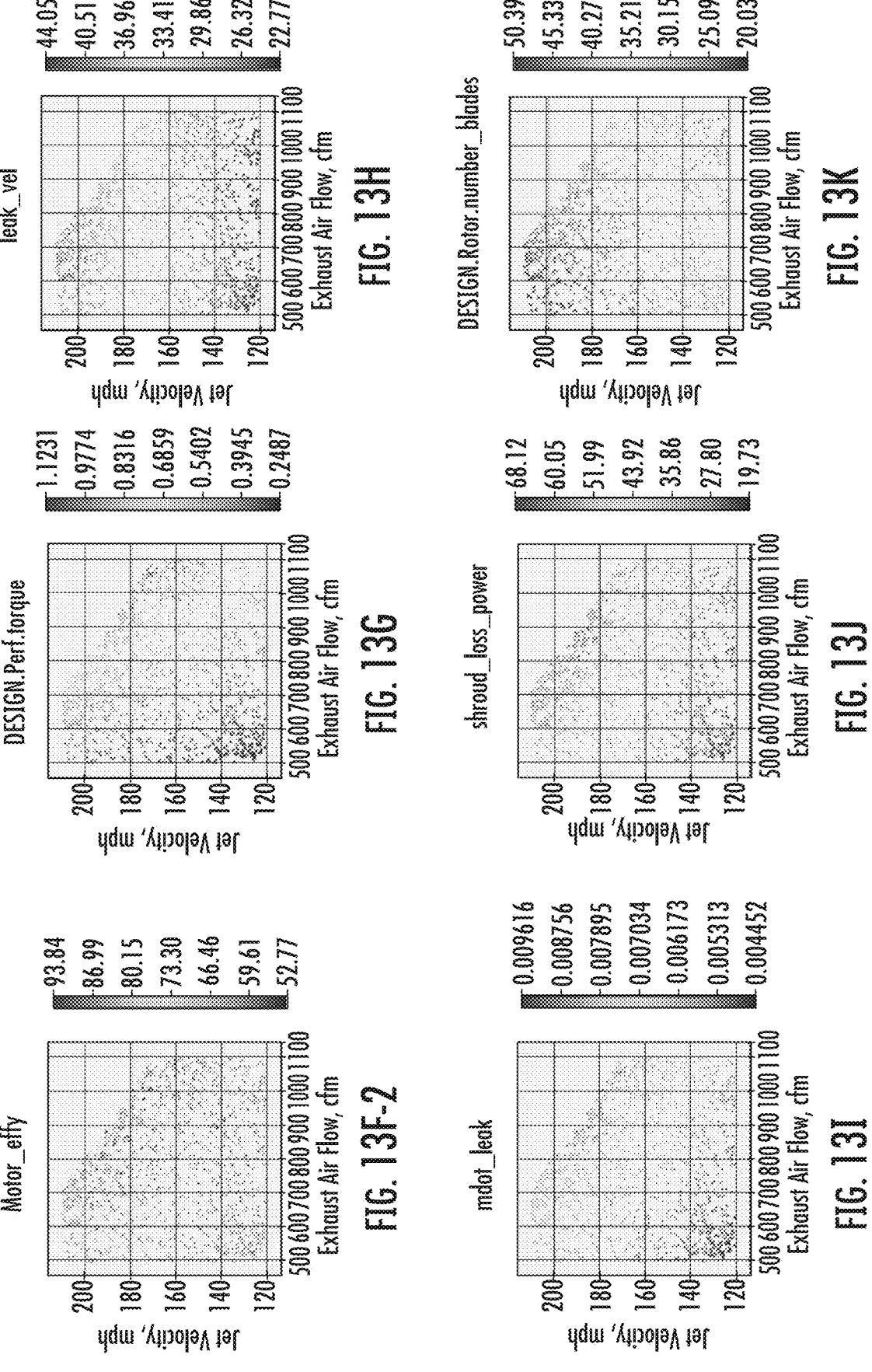
Figures 13R, 13S, 13T, 13U, 13V, 13W:
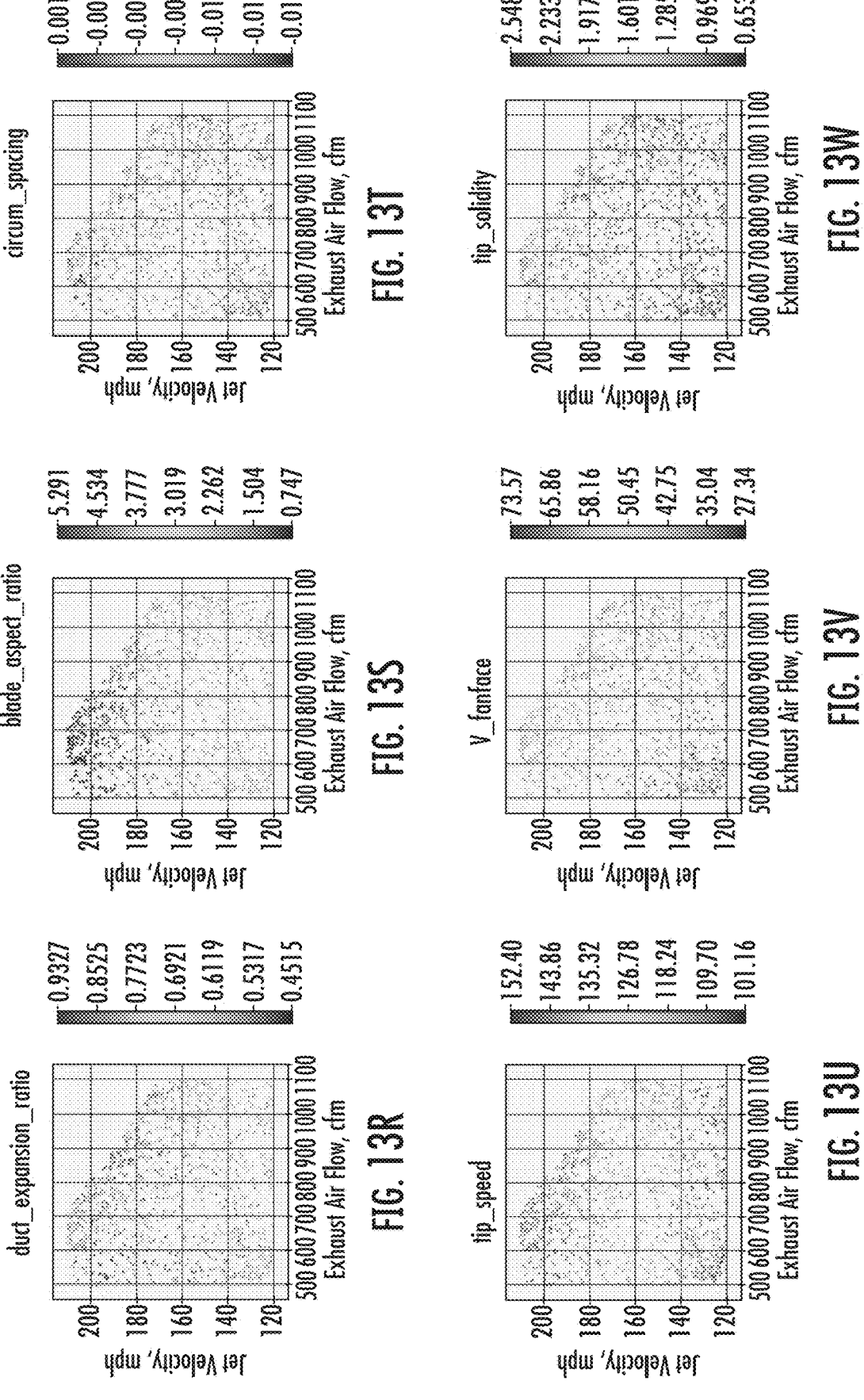
FIGS. 13A-Z depict respective plots of various design parameters and operational parameters for another example air blower design.
Figures 13X, 13Y, 13Z:
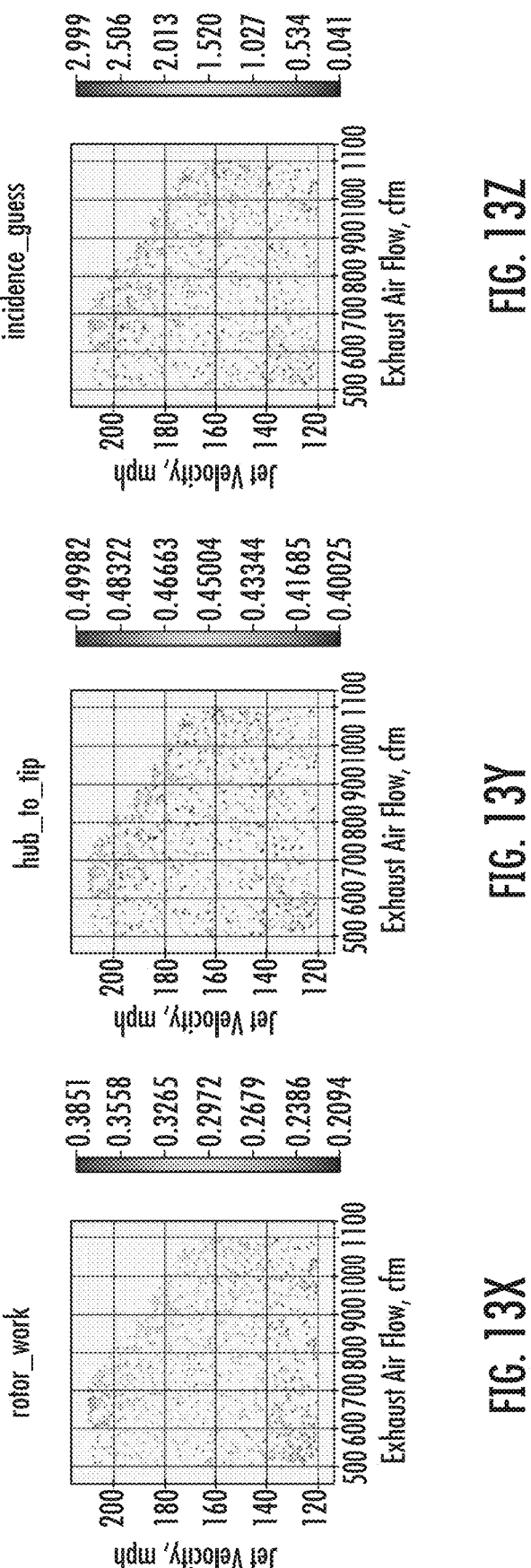

FIGS. 13A-Z illustrate similar types of plots as the examples in FIGS. 12A-Z, but for modeling without any manufacturing constraints (e.g., without constraining the circumferential blade spacing in one example). Other constraints may be introduced and/or omitted. For example, an upper bound to the blade tip speed, such as 400, 450, 500 or 550 ft/s as non-limiting examples, or any other value desired may be provided. To illustrate one example, Table 2 below includes the same selected design parameters (nozzle exhaust area, quantity of blades, blade chord, blisk diameter, circumferential blade spacing, blade aspect ratio, and tip solidity) as Table 1 but with different minimum and maximum bounds for the selected parameters given the unconstrained nature of the modeling. As one example, the unconstrained modeling yielded a quantity of blades in the range of about 20 blades to about 50 blades whereas the constrained modeling yielded a quantity of blades in the range of about 16 blades to about 45 blades. As another example, the unconstrained modeling yielded a circumferential blade Similar to Table 1 above, using the selected design parameters in Table 2 as a guide, examples of single-part blisks may include single-part blisks having a quantity of blades in the range of about 20-50 blades, a blade chord in the range of about 6-32 mm, a blisk diameter of about 78-150 mm, a circumferential blade spacing in the range of about-17-1 mm, a blade aspect ratio in the range of about 0.75-5.3, and a blade tip solidity in the range of about 0.65-2.5. In addition, the nozzle of an example air-moving device that incorporates a single-part blisk with these design parameters may have an exhaust area in the range of about 2.7-9.6 m2. Based on the modeling performed, the air-moving device, in this example, again may be expected to provide an exit jet velocity in the range of about 90-290 mph with a volume of air movement in the range of about 500-1,100 cfm.

It will be appreciated with the benefit of this disclosure that additional modeling may be performed to define additional and alternative design spaces for other operational outputs (e.g., other ranges for exit jet velocity and/or volume of air movement). Such modeling may be based on desired performance characteristics of the air-moving devices (e.g., leaf blowers) that include the single-part blisks as described herein. As an example, to define design spaces for relatively lower or higher performance air moving devices, modeling may be performed for relatively lower ranges of air velocities (e.g., in the range of 50-100 mph or 60-90 mph, 80 mph, and the like) or for relatively higher ranges of air velocities (e.g., in the range of 250-500 mph or 300-400 mph, 275 mph, and the like) and/or may be performed for relatively lower volumes of air movement (e.g., 200-400 cfm or 250-350 cfm, 300 cfm, and the like) or for relatively higher volumes of air movement (e.g., 1,200-2,000 cfm or 1,500-1,800 cfm, 1,750 cfm and the like).

Constraining circumferential blade spacing during modeling may result in relatively lower stagger angles, whereby blades of the blisk are more aligned with the axial direction of the blisk, as well as relatively shorter blade chords. As seen from the plots of FIGS. 12A-E and FIGS. 13A-E, constraining design and operational parameters may result in relatively higher fan face velocity, relatively smaller blisk diameters, relatively higher RPMs, relatively fewer blades, and relatively lower efficiencies as compared to unconstrained blisk designs. In constrained blisk designs, for example, relatively shorter chords may dominate higher blisk speeds, which may result in relatively lower Reynolds numbers and relatively higher Reynolds number losses as compared to unconstrained blisk designs. In some examples, hub-to-tip ratio may be determined based on the motor or center body design rather than any metrics obtained via modeling as described herein. In some examples, hub-to-tip ratio may be based on metrics obtained via modeling as described herein, for example, where a duct expansion ratio exceeds about 1.25. In some examples, the blade incidence angle may be in the range of about −4-4°. Relatively smaller incidence angles may provide wider margins for off-design performance at relatively smaller exhaust areas whereas relatively larger incidence angles may be more efficient and provide wider margins for off-design performance at relatively larger exhaust areas.

Tables 3-6 below provide examples of dimensions, material properties, operational parameters, and operational output that may be relevant to the design and operation of blisks described herein, including single-part blisks. Table 3 includes examples of dimensions of various aspects of blisks as described herein as well as examples of certain ratios between the dimensions for certain special-use examples. Table 4 include examples of various material properties of single-part blisks as described herein. Table 5 includes examples of various operational parameters of single-part blisks as described herein. Table 6 includes examples of various operational output of air-moving devices that include single-part blisks as described herein. Those skilled in the art with the benefit of this disclosure will appreciate that example ranges may encompass smaller ranges or individual values within such ranges or others explicitly or inherently described via the teachings of this disclosure.

TABLE 3

Example Dimensions of Aspects of Single-Part Blisks.

| Description | Dimensions |
|---|---|
| Blade Quantity | in the range of about 12-50 or |
| | in the range of about 20-50 or |
| | in the range of about 16-45 or |
| | in the range of about 20-24 |
| Blade Chord | in the range of about 5-32 mm or |
| | in the range of about 10-20 mm or |
| | in the range of about 15-25 mm |
| | (e.g., 6.28-31.87 mm or 5.14-13.69 mm) |
| Blade Length | in the range of about 19-45 mm or |
| | in the range of about 16-37 mm |
| | (e.g., 19.69-44.22 mm or 16.28-36.59 mm) |
| Blade Thickness | 0.25-0.35 mm |
| | 0.5-0.7 mm |
| | 0.75-2.5 mm |
| Hub Diameter | in the range of about 31-74 mm or |
| | in the range of about 26-61 mm |
| | (e.g., 31.5-73.7 mm or 26.04-60.98 mm) |
| Hub Axial Width | in the range of about 7.5-40 mm |
| Shroud Axial Width | in the range of about 4-25 mm |
| Blisk Diameter | in the range of about 65-122 mm or |
| | in the range of about 78-148 mm |
| | (e.g., 65.1-121.96 mm or 78.76-147.39 mm) |
| Circumferential Blade Spacing | in the range of about −17-5 mm or |
| | in the range of about −17-3 mm or |
| | in the range of about −17-2 mm or |
| | in the range of about 1-5 mm |
| | (e.g., −17.4-1.11 mm or 1-2.29 mm) |
| Blade Aspect Ratio | in the range of about 1-10 |
| (Ratio of Blade Length to | in the range about 2-10 |
| Blade Chord) | in the range about 3-10 |
| | in the range of about 0.7-6.2 or |
| | in the range of about 0.7-5.3 or |
| | in the range of about 1.2-6.2 or |
| | (e.g., 1.24-6.2 or 0.747-5.291) |
| Tip Solidity | in the range of about 0.4-3 or |
| $\left( \dfrac{\text{Blade Quantity} \times \text{Blade Tip Chord}}{\text{Blisk Circumference at Blade Tip}} \right)$ | in the range of about 0.4-1.2 or |
| | in the range of about 0.6-2.6 or |
| | (e.g., 0.4498-1.1355 or 0.45-1.4 or |
| | 0.653-2.548 or 0.65-2.5) |
| Hub-to-Tip Ratio | in the range of about 0.4-0.65 or |
| (Ratio of Hub Diameter to | in the range of about 0.4-0.47 or |
| Blisk Diameter) | in the range of about 0.4-0.45 |
| | (e.g., 0.40013-0.49998 or 0.40025-0.49982) |
| Hub-to-Blade Ratio | in the range of about 1.3-3.8 or |
| (Ratio of Hub Diameter to | in the range of about 0.6-1.7 or |
| Blade Length) | in the range of about 1.6-3.9 or |
| | (e.g., 0.6888-1.6315 or 1.644-3.8947 or 0.7027-1.625 |
| | or 1.6486-3.8125) |
| Blade Incidence Angle | in the range of about −4-4° or |
| | in the range of about 0-2° or |
| | in the range of about 0-1° |

TABLE 4

Example Material Properties of Single-Part Blisks.

| Description | Parameters |
|---|---|
| Young's Modulus | in the range of about 4-20 Gpa or in the range of about 4-17 Gpa or in the range of about 10-17 Gpa |
| Strength | in the range of about 50-170 Mpa or in the range of about 75-150 Mpa or in the range of about 100-124 Mpa |
| Fiber Thickness (Fiber Length) | in the range of about 1-5 mm or in the range of about 3-5 mm or less than 5 mm (plus fiber thickness in other manufacturing methods that permit fiber thicknesses limited by only the area of the blade) |
| Fiber Loading | in the range of about 10-30% or in the range of about 15-30% or in the range of about 15-25% |

TABLE 5

Example Operational Parameters for Single-Part Blisks.

| Description | Parameters |
|---|---|
| Blade Passage Frequency | in the range of about 8,000-16,000 Hz or in the range of about 8,000-13,000 Hz or in the range of about 8,000-10,000 Hz or in the range of about 10,000-12,000 Hz or in the range of about 10,000-13,000 Hz (e.g., about 8 kHz, about 10 kHz, about 12 kHz, about 13 kHz) |
| Tip Speed | in the range of about 200-550 ft/sec (60.96-167.64 m/s) or in the range of about 200-500 ft/s (60.96-152.4 m/s) or in the range of about 200-400 ft/s (60.96-121.92 m/s) or in the range of about 300-450 ft/s (91.44-121.92 m/s) or in the range of about 350-450 ft/sec (106.68-137.16 m/s) or in the range of about 200-350 ft/s (60.96-106.68 m/s) |

TABLE 6

Example Operational Output for Air-Moving Devices Having Blisks.

| Description | Output |
|---|---|
| Volumetric Air Flow | in the range of about 500-1,100 cfm or in the range of about 800-1,000 cfm |
| Exit Jet Velocity | in the range of about 90-290 mph (40.2336-129.642 m/s) or in the range of about 100-210 mph (44.704-93.878 m/s) or in the range of about 120-200 mph (53.645-89.408 m/s) or in the range of about 150-175 mph (67.056-78.232 m/s) |
| Fan Pressure Ratio (Ratio of Total Pressure at Stator Exit to Total Pressure at Blisk Entrance) | in the range of about 1.005-1.2 or in the range of about 1.01-1.2 or in the range of about 1.01-1.1 |
| Acoustics (at a distance of about 50 ft or 15.24 m) | in the range of 30-40 dB(A) or in the range of 30-45 dB(A) or in the range of 30-50 dB(A) or in the range of 30-60 dB(A) or in the range of 35-70 dB(A) or in the range of 35-55 dB(A) or in the range of 35-60 dB(A) or below about 70 dB(A) or below about 65 dB(A) or below about 55 dB(A) or below 50 dB(A) or below bout 45 dB(A) or below about 40 dB(A) or below about 35 dB(A) or about 30 dB(A) |

Figure 14:
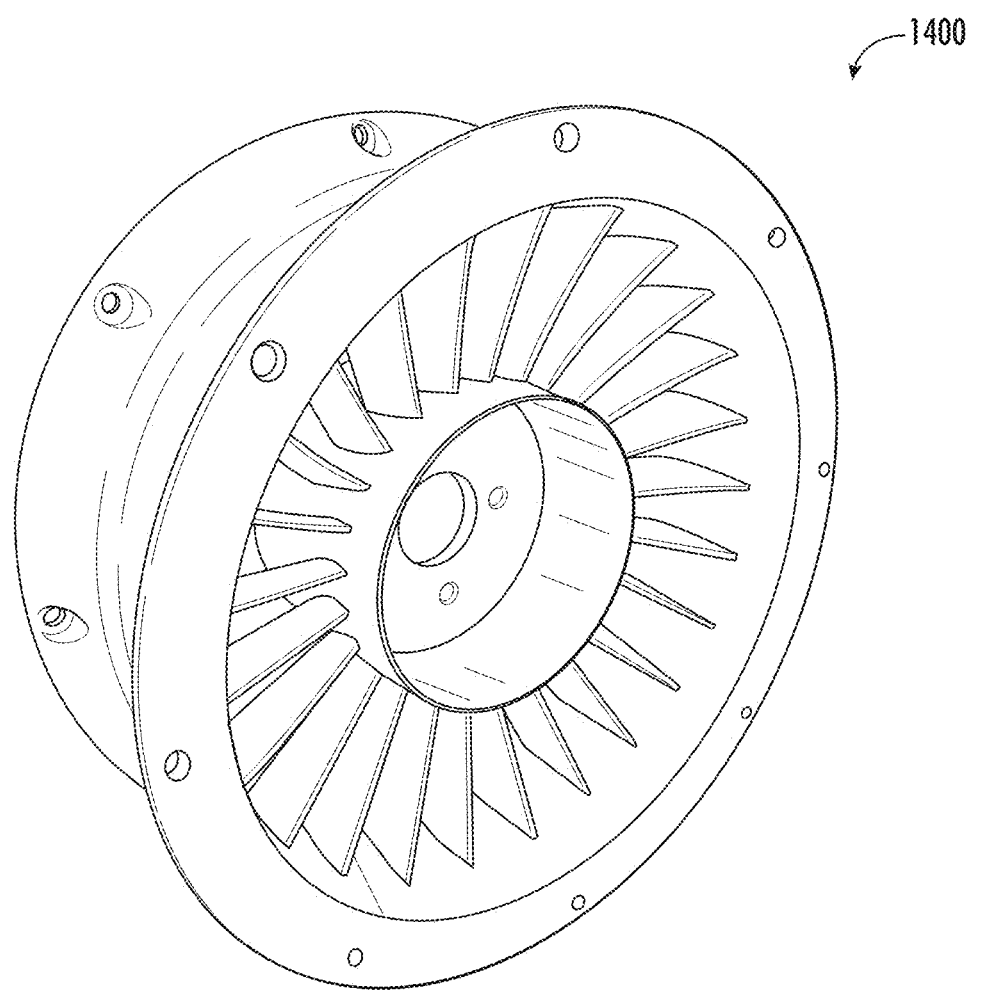
FIG. 14 depicts a perspective view of an example stator in accordance with aspects of the present disclosure.

FIG. 14 depicts a perspective view of an example stator 1400. Like the single-part bladed disk described herein, the stator 1400 similarly may be a single-part stator having a, in some examples, a homogenous, monolithic, and/or contiguous construction as described herein. The single-part stator 1400 may be manufactured using any of the manufacturing methods described here such as, for example, injection molding. Those skilled in the art with the benefit of this disclosure will appreciate that stator 1400 and/or other stators described herein are not required to be singular, unitary, monolithic, contiguous, and/or homogenous.

Figures 1, 2, 3, 4, 5, 15A:
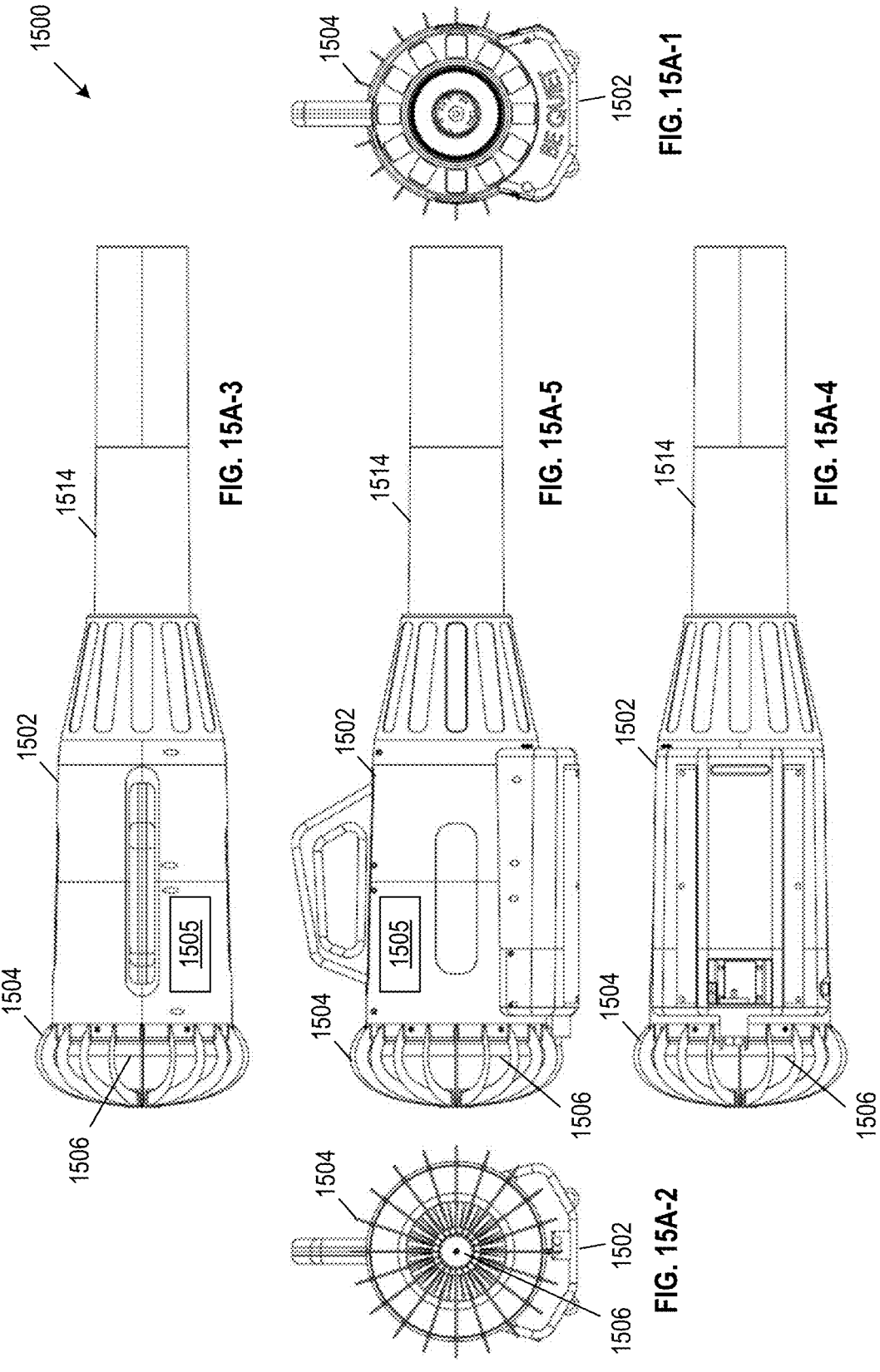
Figure 15B:
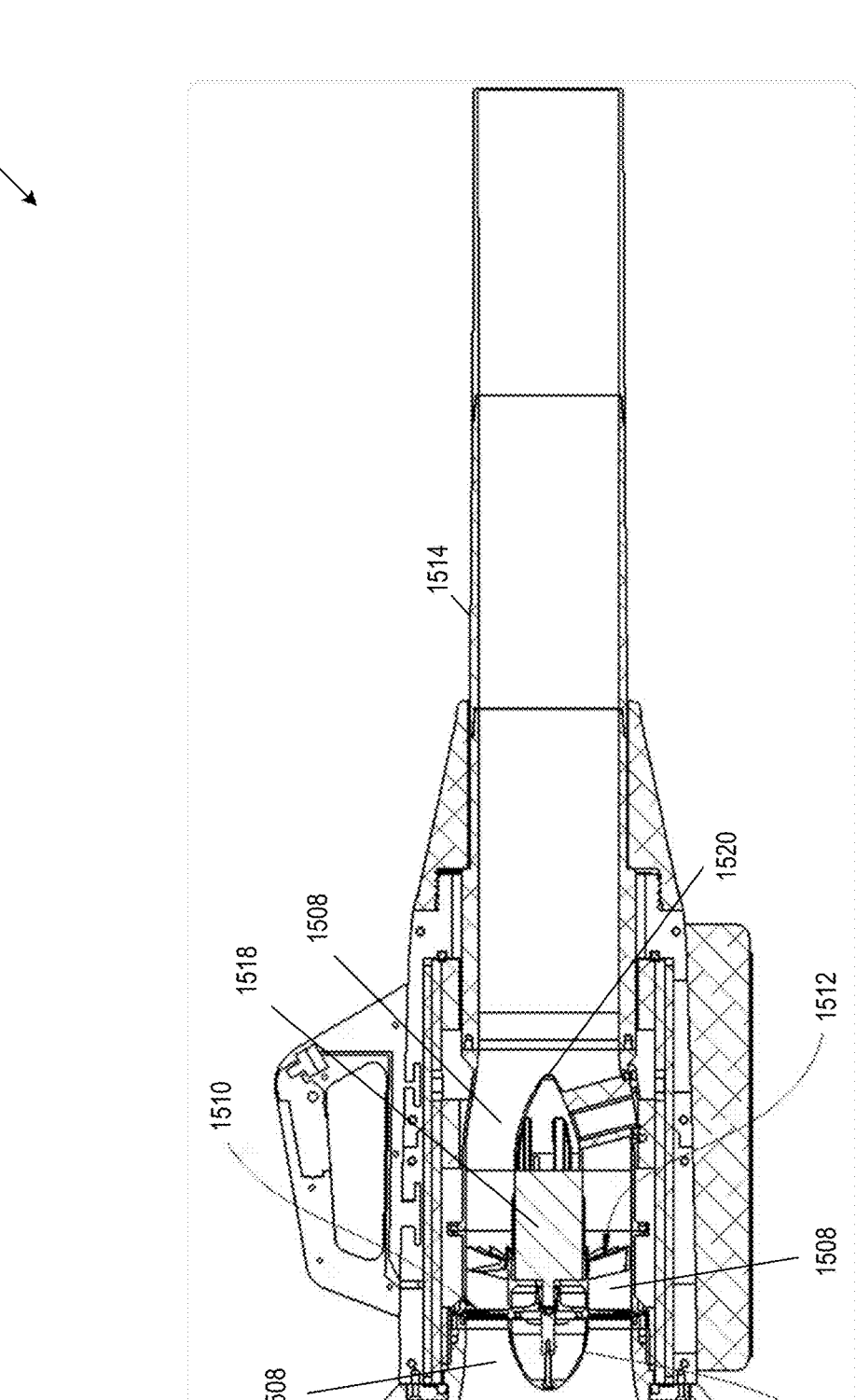
FIG. 15B depicts a side cross-sectional view of the example air blower of FIGS. 15A-1-15A-5.
Figure 15C:
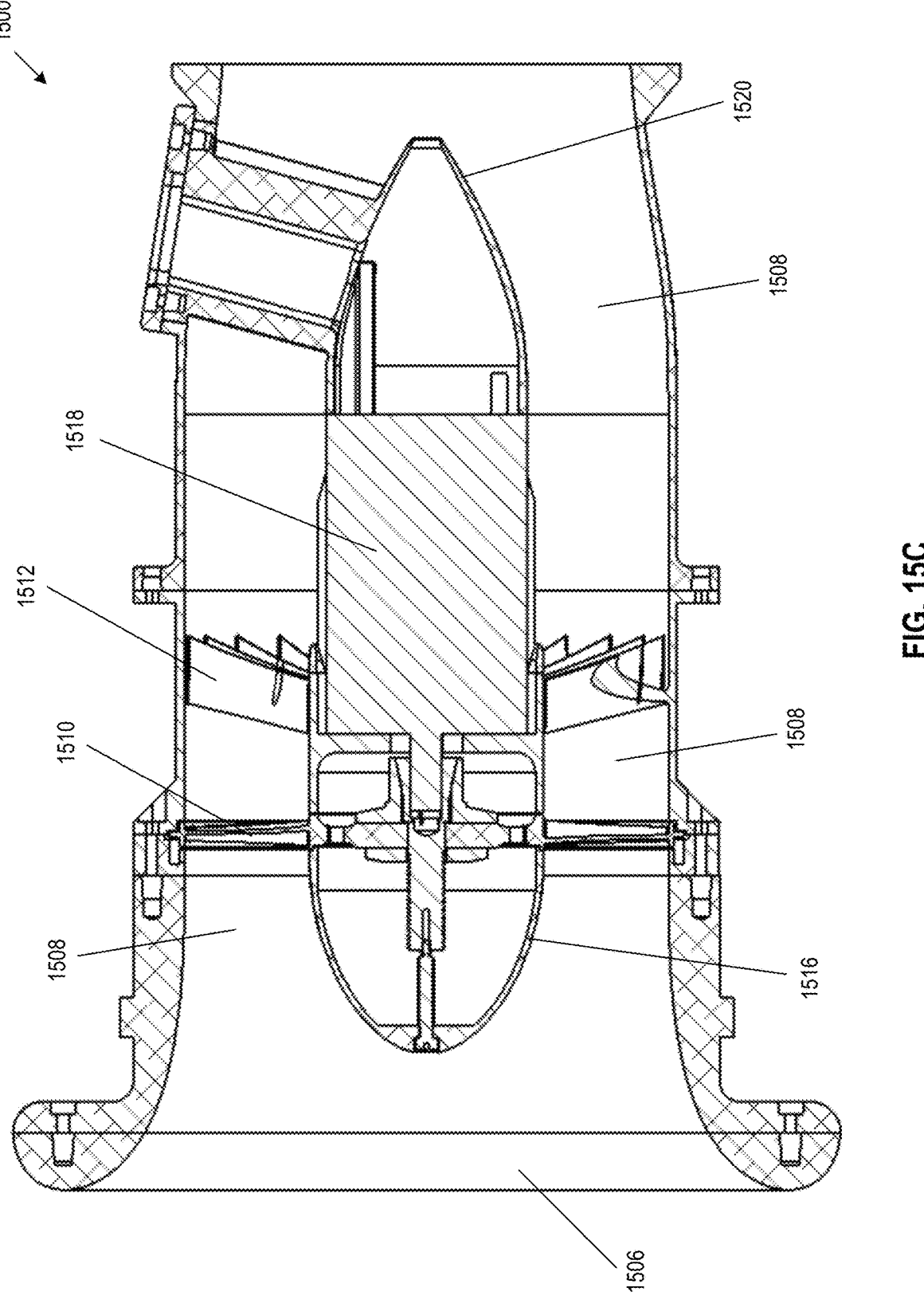
FIG. 15C depicts a side cross-sectional view of a housing of the example air blower of FIG. 15A-1-15A-5.
Figure 15D:
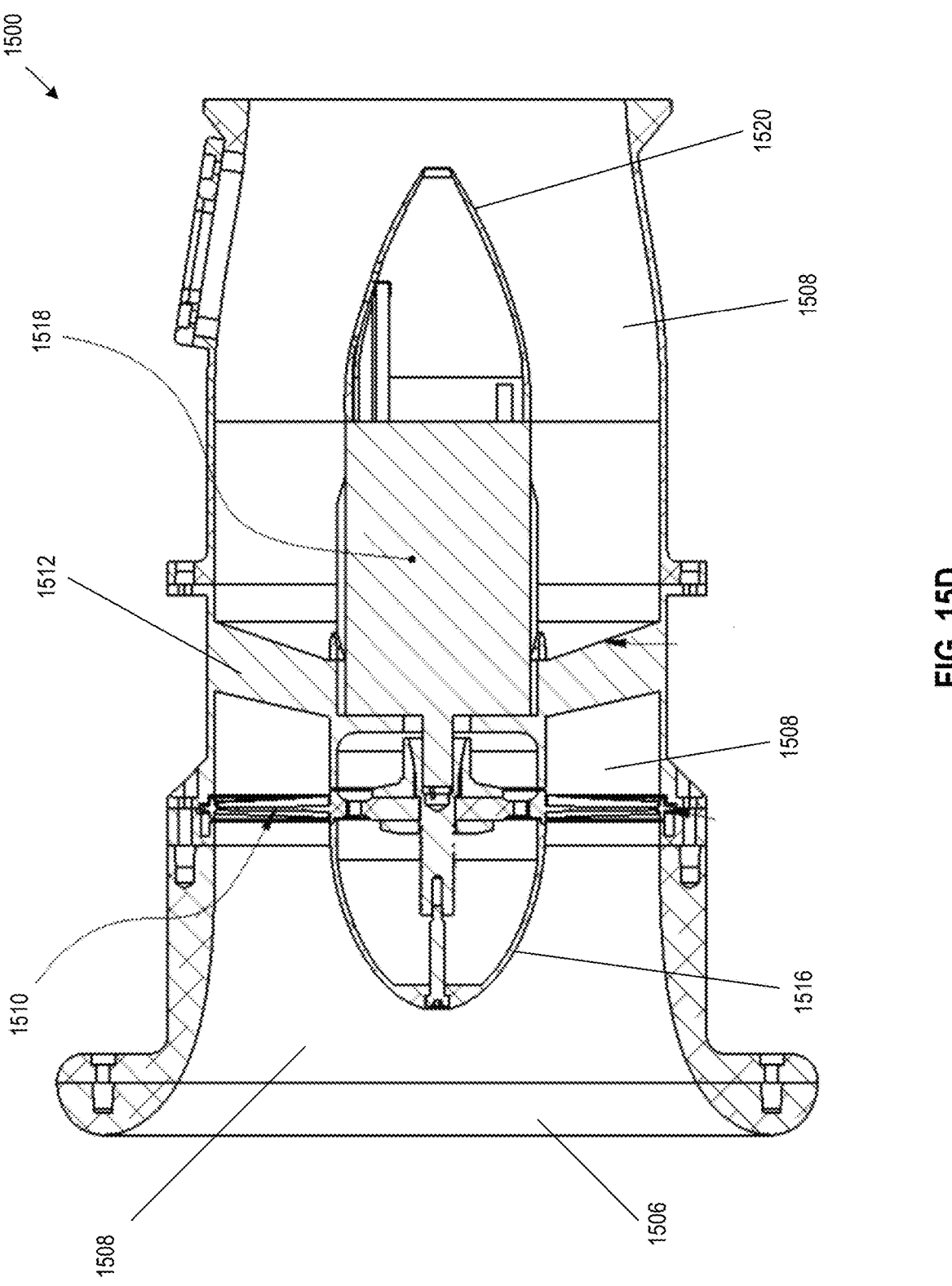
FIG. 15D depicts another side cross-sectional view of the housing of the example air blower of FIG. 15A-1-15A-5.
Figures 16A, 16B, 16C, 16D, 16E:
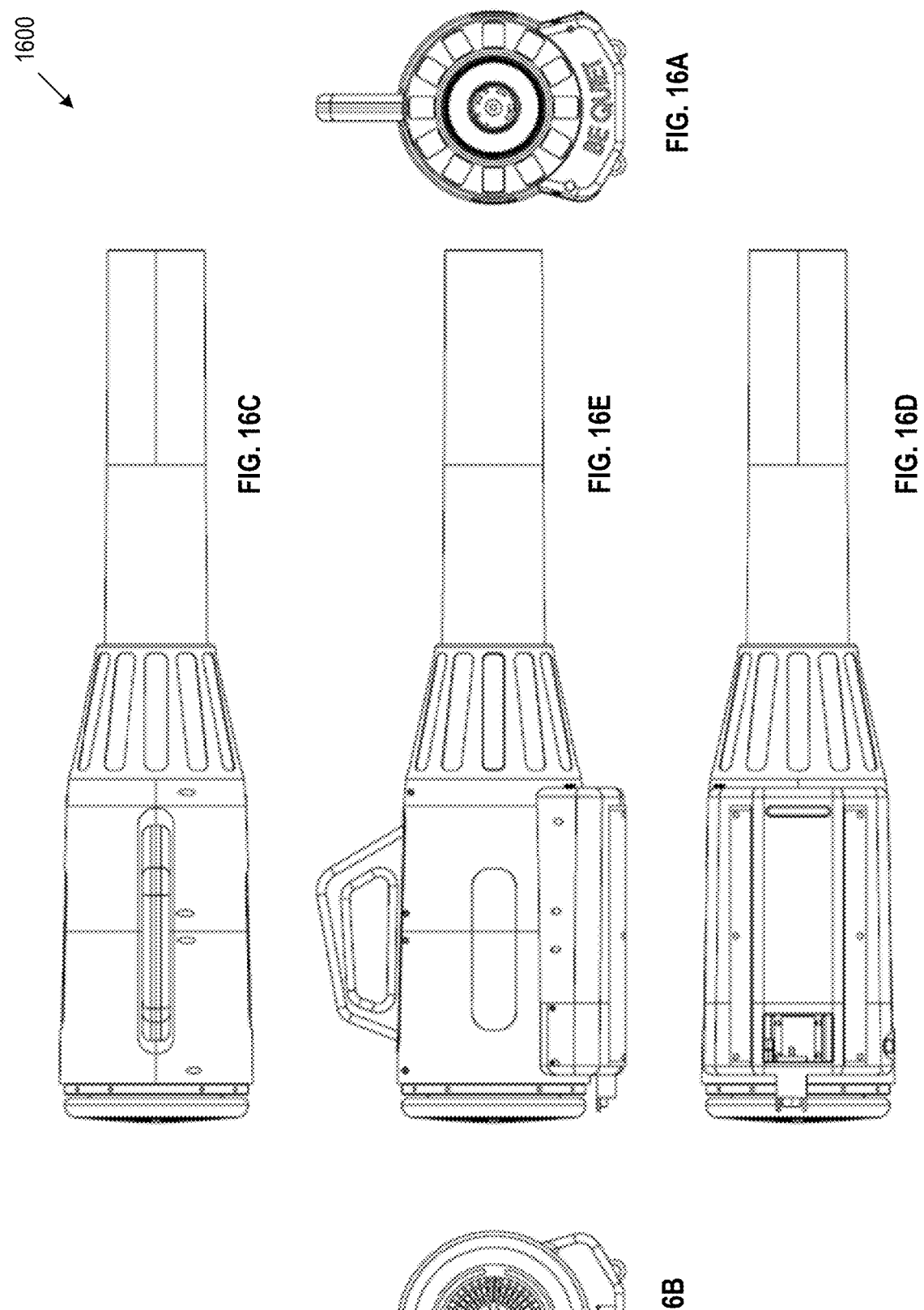
FIGS. 16A-E depicts respective front, rear, top, bottom, and side views of another example of an air blower in accordance with aspects of the present disclosure.

As described herein, example air-moving applications include leaf blowers. FIGS. 15A-1-A-5 and FIGS. 15B-D, for example, depict respective front, rear, top, bottom, and side views of an example of a leaf blower 1500 that may incorporate a single-part blisk as described herein as well as side cross-sectional views of a housing 1502 of the leaf blower. The housing 1502 also may be referred to as a "fan stage." Due to the single-part blisk and other physical properties of the leaf blower 1500, the leaf blower may provide better airflow and reduced noise levels relative to conventional leaf blowers. The physical properties of the leaf blower that may contribute to the improved airflow and reduced noise levels include its "wetted geometry," which may include the geometries that touch the path of the air flow through the leaf blower. The wetted geometries may include, for example, the respective geometries of the inlet guard 1504, inlet 1506, internal ducts 1508, blades (e.g., rotor blades 1510, stator blades 1512), nozzle 1514, nose cone 1516, motor 1518, tail cone 1520, and any other geometry of the leaf blower that touches air being moved by the leaf blower. A leaf blower also may include a user interface for controlling operation of the leaf blower (e.g., controlling a speed the rotor and/or a direction or angle of the airflow output). As seen in FIGS. 15A-3 and 15A-5, the leaf blower 1500 includes a user interface 1505. The user interface may be, for example, a joystick, switch, knob, slider, touchscreen, sensor (e.g., tilt sensor), or any other input mechanism suitable for controlling operation of the air-moving device. The user interface may receive user input from a user of the air-moving device (e.g., a leaf blower) during operation. Based on receiving the user input, the user interface may, for example, cause a drive shaft of the air-moving device to rotate the aerodynamic rotor of the air-moving device. In some examples, the user input received at the user interface may cause a processor of a control computer of the air-moving device to transmit a signal that causes the motor to provide power to the drive shaft that causes rotation of the rotor thereby controlling operation of the air-moving device (controlling, e.g., the speed of the rotor, the air velocity resulting from rotation of the rotor, the volume of air moved, a noise level) as disclosed herein. FIGS. 16A-E depict respective front, rear, top, bottom, and side views of another example of a leaf blower 1600 that may incorporate a single-part blisk as described herein.

Figure 17:
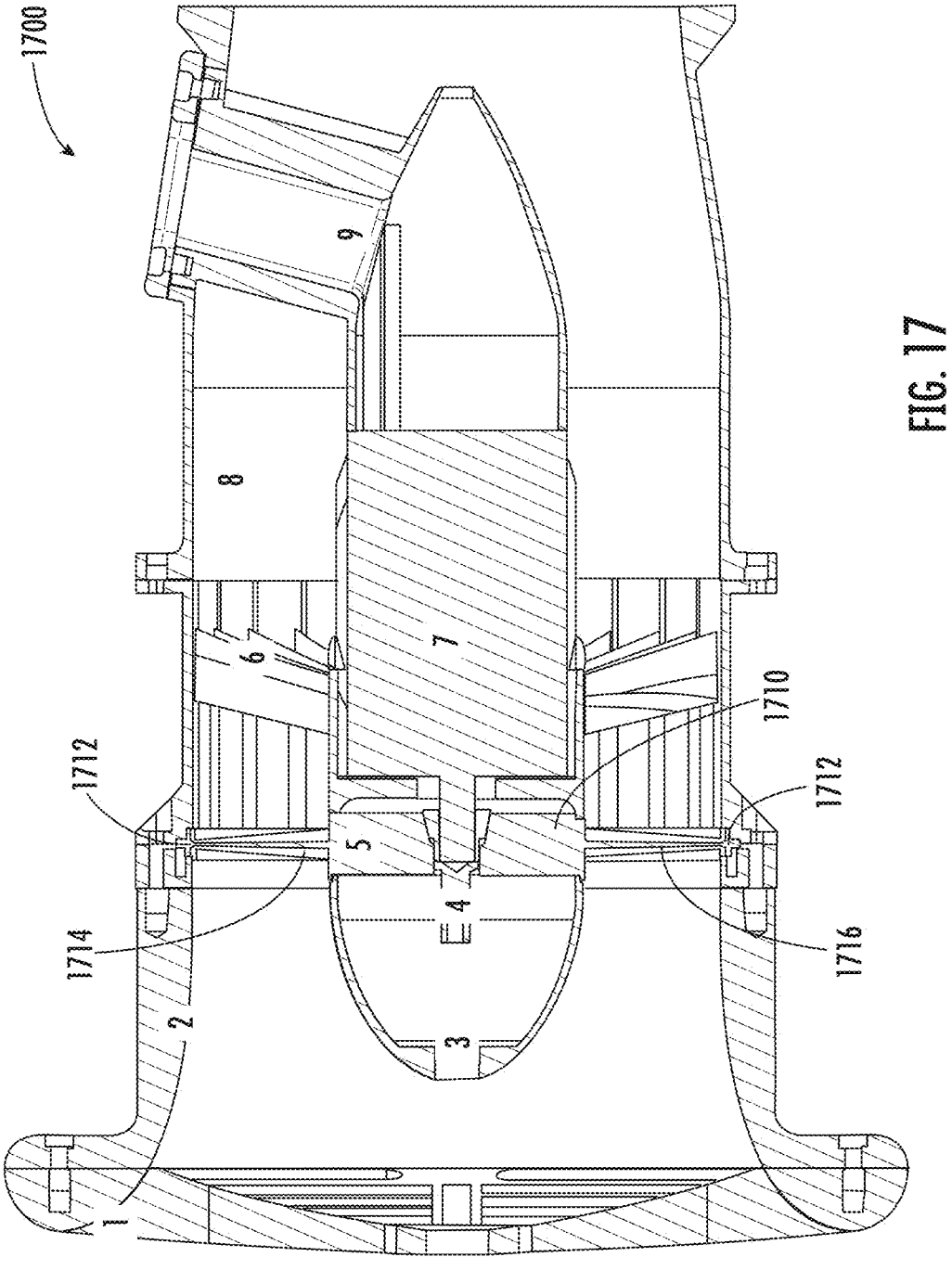
FIG. 17 depicts a side cross-sectional view of an example of a sub-assembly of an air moving device in accordance with aspects of the present disclosure.

FIG. 17 depicts a side cross-sectional view of an example of a sub-assembly 1700 of an air-moving device in accordance with aspects of this disclosure. Aspects of the sub-assembly 1700 may be incorporated into any air-moving device, such as those described herein for example, to improve air movement, improve efficiency, and reduce noise levels relative to conventional air-moving devices. The housing 1700, in this example, includes an inlet guard (1701), an inlet duct (1702), a nose cone (1703), a collet (1704), a rotor or blisk (1705), a stator (1706), a motor (1707), an aft duct (1708), and a tail cone (1709). The inlet guard (1701), inlet duct (17022), nose cone (1703), rotor (1705), stator (1706), aft duct (1708), and tail cone (1709) may belong to the wetted geometry of the sub-assembly 1700 and, as a result, their respective designs may impact the aerodynamics and acoustics of the sub-assembly 1700. The respective designs of these components, therefore, may be configured (e.g., optimized) to minimize losses and minimize noise generated by the movement of air past and through these components. The rotor (5) may be implemented as a single-part blisk as described herein. The nose cone (3) may be integrally formed with the rotor (5) as described herein such that the nose cone (3) and rotor (5) form a single part (e.g., a monolithic, contiguous, and/or homogenous unit). The collet (4) may be used to connect the nose cone (3), rotor (5), and motor (7). The collect may be designed to permit quick swapping of the rotor (5) (e.g., for installation, removal, repair). The stator (6) also may be a single part (e.g., have a monolithic, contiguous, and/or homogenous construction). The motor (7) may be an electric motor. The tail cone (9) may be combined with (e.g., connected to, integrated with) the housing of the motor (7) and contain any connections (e.g., wires) that may result in unwanted noise or negatively impact performance if positioned in the flow of the air path.

As noted in several embodiments, including but not limited to FIGS. 1A, 2B, 3 and 17, a blisk may comprise of a plurality of blades extending between a central hub and a shroud (see, e.g., hub 102 and shroud 106 shown in FIG. 1A with blades extended between them). As such, rotation of the blisk or rotor hub 102 results in the rotation of shroud 106. Aspects of this disclosure relate to ducted fans in which a distal end of the blades (i.e., the end that terminates at the shroud) is co-planar with the ducting or housing of the primary air flow path. For example, as seen in FIG. 17, blisk 1705 includes a hub portion 1710 and an outer shroud 1712 with a plurality of blades extending between them (see, e.g., blades 1714 and 1716 amongst the plurality of blades). As such, the hub portion 1710, blades 1714/1716 and shroud

1710 rotate as a single component. As seen in FIG. 17, the outermost tips of blades 1714 and 1716 are aligned with, and terminate at, the wetted surface of inlet duct 1702.

The blisks described herein may be used for a variety of air-moving applications. A variety of air-moving devices, therefore, may include, for example, a fan that employs a single-part blisk—as described herein. In one example, a single-part blisk as described herein may be incorporated into a leaf blower as shown in FIGS. 15A-1-15A-5, FIGS. 15B-D, FIGS. 16A-E, and FIG. 17. Other types of air-moving devices that may include one or more single-part blisks as described herein may include, for example, stovetop fans, bathroom fans, computer fans (e.g., server fans, laptop fans, desktop fans), cooling fans, ventilation fans, HVAC fans, blower fans (e.g., carpet dryers, race track dryers, car wash dryers), hair dryers, air purifiers, humidifiers, ice-making devices, snow-making devices, snow blowers, aircraft propulsors (e.g., drone propulsors), aircraft fans (e.g., drone fans), and other types of air-moving devices configured to move air using an axial, radial, or other fan.

Irrespective of a bladed fan being used for aviation, air circulation, cooling, clearing debris or other uses, noise emanating from the blades during operation of the device represents wasted acoustic energy. This wasted acoustic energy (often referred to as noise) creates noise pollution. Novel fans disclosed herein create a more energy efficient apparatus. Novel devices reduce noise pollution. Aspects of this disclosure relate to air moving devices that are characterized by having a low acoustic (noise) power as a portion of the overall input power. Certain novel devices can move at least the same volume of air over a unit of time (such as measured by cubic feet per minute, CFM) and/or generate at least the same amount of thrust (such as by measured by pound force) while having acoustic noise levels lower than those previously known, which allows them to operate quieter and more efficiently than those previously used in the arts. Certain blisks disclosed herein are designed to provide anywhere from 1 N to over 2000 N while achieving noise levels in the range of approximately 30-70 A-weighted decibels dB (A) at distance of at 50 feet.

With respect to acoustic (noise) levels, noise levels may be determined by the Specific Pressure Level (SPL) at a set distance. According to one test protocol, the bladed apparatus can be provided on a test stand. Those skilled in the art will appreciate that test stands may take many different forms, however, in one embodiment the bladed apparatus was placed on a six-foot tall steel test stand located at the center of an area on a flat surface in which the bladed apparatus is located on the upper surface or mounting structure of the test stand. If the test is conducted indoors, care should be taken to ensure the moved air is not recirculated. One or more noise measuring devices may be placed in a semi-circular arrangement around the bladed apparatus. Specifically, in one embodiment, seven (7) Josephson C550H instrumentation microphones (commercially available from Josephson, Santa Cruz, California) were utilized in one testing situation, however, a different quantity and/or microphone having the same sensitivity may be used. The microphones were arranged in semi-circle at a slant distance of 10 meters from the fan face in this testing protocol, with the microphones located at the ground plane to eliminate null frequencies created by acoustic reflections from the ground. In this example, a first microphone was placed at 0 degrees and the rest were spaced equidistantly at 30 degrees from the nearest microphone. (thus, microphones were placed at 0, 30, 60, 90, 120, 150, and 180 degrees with respect to the front of the air moving device in which the front is the location of air intake). In one embodiment, values obtained from the microphone located at about 90 degrees from the front of the air moving device were utilized for sound pressure level (SPL). Yet in other embodiments, a weighted average may be utilized.

The test stand or other devices may be equipped with further sensors, such as those configured to aid in the measurement of thrust or air movement of the bladed apparatus and/or ambient conditions. For example, such sensors may include pressure transducers which are used to measure the differential pressure between static pressure ports on the inner diameter of a bladed apparatus's bell-mouth inlet and ambient pressure, and a set of ambient pressure, temperature, and humidity sensors which are used to record the ambient conditions of each test allowing for the correction of all test data to a common standard day reference condition, such as a temperature of 288.15 K and 101.325 kPa pressure as set forth in ANSI Sea Level Standard (SLS).

A speed controller (such as an APD HV Pro speed controller, commercially available from Advanced Power Drive, Castle Hill, NSW 2154, Australia) was used to control and measure the rotational speed of the bladed apparatus, although any other speed controller may be utilized per the operator's discretion.

As indicated above, the sound/noise may be measured at a set distance (or distances) from the actual air moving device. For example, a plurality of microphones may be distributed at certain locations and/or distances from the air moving device. In one embodiment, measurements may be taken at 50 feet. Yet in another embodiment, measurements may be taken at 100 feet. Distances between 30-100 feet are generally chosen to ensure that observations were made at sufficient distance from the source that it may be considered as a point source while not too distant to introduce inaccuracies. Applying spherical divergence or inverse square law to the obtained SPL is applicable when there are no reflecting surfaces that can alter the sound field. Generally speaking, doubling of the distance from the source will result in a 6 dB decrease.

Those skilled in the art will appreciate that air moving devices may be used to create thrust for debris removal and/or movement of a vehicle. As known to those skilled in the art, different energy sources may have different efficiencies, thus measuring input power may factor in known or measured efficiency metrics. For example, transmitting power from a battery through resistive wire and materials as well as electronic speed controllers or other electronics reduces the overall power available to the resultant motor that rotates the blades. Thus, input power may be measured in terms of input shaft power, which would measure a power value of a shaft or similar drive structure emanating from an electric motor, combustion engine, hydrogen powered apparatus, or steam system, amongst other known systems that is directly provided to rotate the blades. An input shaft, for example, maybe a shaft of an axial fan mounted onto it and configured for moving air/generating thrust.

One novel air moving device according to the teachings herein configured as a debris removal device (e.g., was provided in a handheld device, as opposed to mounted on a vehicle) exhibited an SPL at 50 feet to be measured/calculated at 52 dB (A) and produced about 8.4 pound-force (lbf) (37.4 N) of thrust. These results were achieved by implementing the sound test procedures for bystander noise set forth in Annex A of ANSI/OPEI B175.2-2012. The thrust is measured in accordance with the same standard. It is noted that many debris removal devices appear to be advertised with a thrust that is about 30% higher than what would be achieved with this standard. Not to be bound by any hypothesis, it is believed that many in the debris removal field measure a Theoretical Maximum Blowing Force, which is expressed in Newtons and is the maximum flow rate (kg/s)×the maximum speed (m/s). The figures entered into the calculations appear to be the highest achievable number for these two parameters, when in reality a device that increases one is generally doing so at the expense of the other.

Under the same ANSI/OPEI standard, a second example novel device produced 43 dB (A) while providing 5.8 lbf (25.8 N) of thrust. This embodiment used less than 1070 Watts to produce the thrust. A novel apparatus exhibited an SPL at 50 feet to be measured/calculated at 52 dB (A) while producing about 8.4 lbf (37.4 N) of thrust when the sound was measured according to via a second protocol in which a Josephson C550H instrumentation microphone (commercially available from Josephson, Santa Cruz, California) was utilized a slant distance of 10 meters from the fan face in this testing protocol, it was located at 90 degrees with respect to the fan face or inlet) with the microphone located at the ground plane to eliminate null frequencies created by acoustic reflections from the ground.

It should also be appreciated that a blisk may be designed for applications that may dictate larger form factors. As described herein, for example, blisks may be used in aircraft (e.g., drones) that involve flight and hovering operations. As such, dimensions of blisks as described herein may include blisk diameters in the range of about 1 foot (0.3048 m) to about 6 feet (1.8288 m) or even larger.

Certain aspects of this disclosure relate to air-moving outdoor tools, such as for example, leaf blowers. Leaf blowers or other outdoor tools described herein may be designed for both professional (commercial) use and consumer (residential) use. The operational output of various offerings may differ. As a non-limiting example, the volumetric airflow for professional-grade leaf blower may be in the range of about 500-1,100 cfm whereas the volumetric airflow for consumer-grade leaf blowers may be in the range of about 300-700 cfm. As another example, the air velocity for professional-grade leaf blowers may be in the range of about 200-210 mph whereas the air velocity of consumer-grade leaf blowers may be in the range of about 150-190 mph. Handling features also may differ between professional-grade and commercial-grade leaf blowers. As described below, leaf blowers novel blisks and/or operational characteristics as described herein may include electric motors powered by one or more batteries. In some examples, professional-grade leaf blowers may include relatively larger and/or multiple batteries to accommodate relatively longer operation durations. To account for the relatively heavier weight that results from such batteries, professional-grade leaf blowers may include, for example, a backpack that houses the batteries to allow the full weight of the battery to be supported on the user's back. Consumer-grade leaf blowers, on the other hand, may include a single battery that is relatively smaller and thus lighter. Consumer-grade leaf blowers, therefore, may be handheld and include a handle as seen in the example leaf blowers 1500 and 1600 respectively shown in FIGS. 15A-1-15A-5 and FIGS. 16A-E. In some examples, a leaf blower also may include an arm mount.

The exhaust area may impact the range of volumetric air flow and air velocity for a leaf blower. For example, expected volumetric air flow and the air velocity produced by a leaf blower may depend on the diameter of the leaf blower nozzle (e.g., nozzle 1514 in FIGS. 15A-1-A-5 and FIG. 15B). Relatively larger nozzle diameters may yield relatively higher thrust output and volumetric air flow, but a relatively lower air velocity while relatively smaller nozzle diameters may yield relatively higher air velocities, but relatively lower thrust output and volumetric air flow. As such, the diameter of the leaf blower nozzle may involve a tradeoff between higher thrust output and volumetric air flow at the expense of air velocity or higher air velocity at the expense of thrust output and volumetric air flow. As an example, assuming a maximum flow power of 1,500 Watts (W) for a leaf blower, a first example leaf blower having a 5.6 inch diameter nozzle may yield a thrust output of about 42 N, a volumetric air flow of about 1,200-1,800 cfm, and an air velocity of about 80-120 mph; a second example leaf blower having a 4.0 inch diameter nozzle may yield a thrust output of about 38 N, a volumetric air flow of about 770-1,160 cfm, and an air velocity of about 100-150 mph; and a third example leaf blower having a 3.0 inch diameter nozzle may yield a thrust output of about 28 N, a volumetric air flow of about 530-800 cfm, and an air velocity of about 120-180 mph. Leaf blowers having a novel blisk as described herein may operate at lower flow power (e.g., in the range of about 500-1,000 W).

In some examples, the nozzle of an air-moving tool may be configured to change the airflow output during operation. Changing the airflow may include changing the volume, velocity, or direction (e.g., rotation, angle) of the airflow. As described above, volumetric air flow and air velocity may depend on the diameter of the nozzle. In some examples, an air-moving tool, such as a leaf blower, may be configured to exchange different nozzle attachments that, when attached to a nozzle of a tool, change the air flow (e.g., volume and/or velocity) output by the tool. One or more attachments may change the diameter (e.g., increase or decrease) and/or shape of the end of the nozzle. In certain embodiments, a plurality of attachments may be configured for simultaneous use. In one embodiment, a plurality of attachments may be configured to be placed in a telescoping arrangement such that at least two attachments are configured for simultaneous use during operation of the tool. In some examples, a tool, such as a leaf, blower may be configured to receive a stator insert that, when inserted in a nozzle of a leaf blower, change the air flow (e.g., direction) output by the leaf blower. The stator (or other element) may be selectable, such as to allow an operator to selectively adjust the airflow in a range of directions and/or to one or more directions amongst a plurality of possible directions.

Figure 18A:
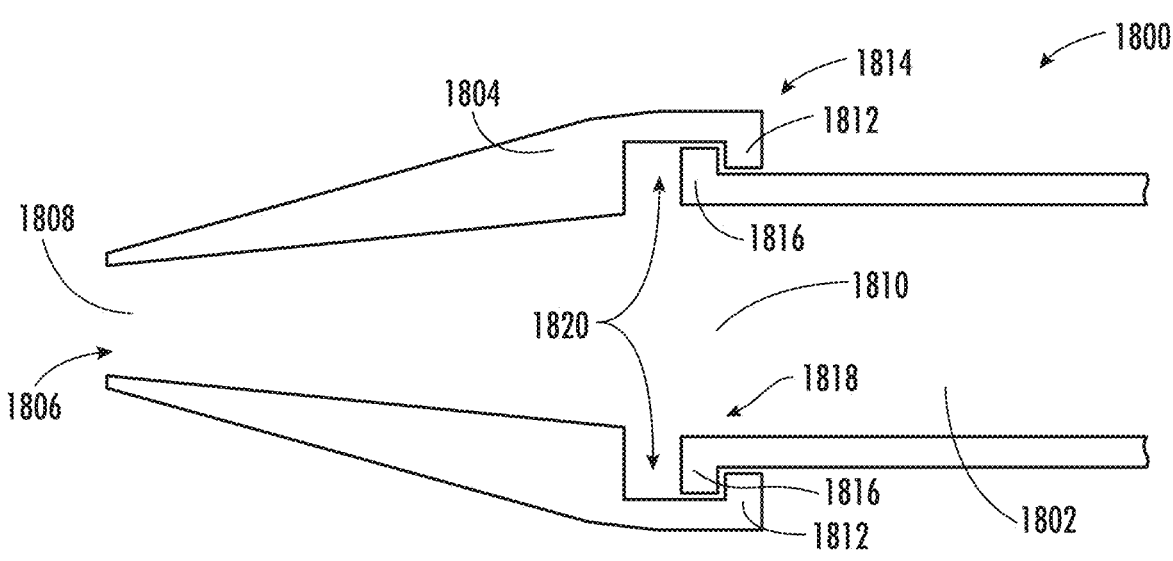
FIG. 18A depicts a side cross-sectional view of an example of a leaf blower barrel in accordance with aspects of the present disclosure.

FIG. 18A depicts a side-cross sectional view of an example housing 1800, which may be a leaf blower barrel in certain embodiments. The example housing/leaf blower barrel 1800, in this example, includes an elongated channel 1802 that guide the air flow propelled from the leaf blower. The leaf blower barrel 1800, in this example, is configured to receive a nozzle 1804. In certain embodiments, a nozzle, such as nozzle 1804 may be integrally formed with barrel 1800 and/or another element of a tool. As seen in FIG. 18A, the nozzle 1804, in this example, has a tapered profile that reduces the exhaust area 1806 of the leaf blower barrel 1800 by providing an outlet (exit aperture) 1808 having a diameter that is smaller than the diameter of the outlet (exit aperture) 1810 of the elongated channel 1802. In other examples, a nozzle may enlarge the exhaust area of a leaf blower barrel by providing an outlet having a diameter that is larger than the diameter of the outlet of the elongated channel. As described herein, nozzles having relatively smaller outlet diameters may be used to increase the air velocity from the leaf blower, and nozzles having relatively larger outlet diameters may be used to increase volumetric air flow from the leaf blower. The nozzle outlets may have different shapes, e.g., circular, oblong, and the like. More generally, an outlet of a leaf blower barrel may define a first exhaust area of a leaf blower, and an outlet of a nozzle configured to detachably attach to the leaf blower barrel may define a second exhaust area that is different than the first exhaust area (e.g., in terms of size, shape, etc.). A nozzle may include one or more outlets. A nozzle having multiple outlets may provide different rotations for the airflow exiting the leaf blower barrel. A nozzle having dual outlets, for example, may rotate the airflow from the respective outlets in different directions (e.g., clockwise from one outlet and counterclockwise from the other outlet). In some examples, a tip of the nozzle may include features that mix the airflow from the leaf blower barrel with the ambient air, which may decrease noise from the nozzle. A nozzle tip may include, for example, chevrons, a serrated sawtooth pattern, and the like, to facilitate mixing of the ambient air with the airflow propelled from the leaf blower barrel.

A nozzle may be configured to attach to and detach from a leaf blower barrel. The nozzle 1804, in this example, may detachably attach to the leaf blower barrel 1800 via an "L"-shaped flange 1812 that circumscribes the inner perimeter of an attachment end 1814 of the nozzle and engages with a similar "L"-shaped flange 1816 that circumscribes the outer perimeter of the outlet 1810 of the elongated channel 1802 at an attachment end 1818 of the leaf blower barrel 1800. The "L"-shaped flange 1812 of the nozzle 1804 may be defined via a recessed channel 1820 formed in the inner surface of the nozzle at (near) the attachment end 1814. The nozzle 1804 may attach to the leaf blower barrel 1800 via, for example, a press fit whereby the recessed channel 1820 of the nozzle 1804 receives the "L"-shaped flange 1816 at the attachment end 1818 of the leaf blower barrel 1800, which engages with the "L"-shaped flange 1812 of the nozzle 1804 to prevent travel or movement away from the elongated barrel. Additional and alternative means may be employed to attach a nozzle attachment to a nozzle of a leaf blower, for example, friction fit, threads (e.g., threads formed on an inner surface of a nozzle attachment that engage with threads form on an outer surface of the elongated barrel), tabs, clips, clasps, and the like including combinations of different types of attachment mechanisms.

Figure 18B:
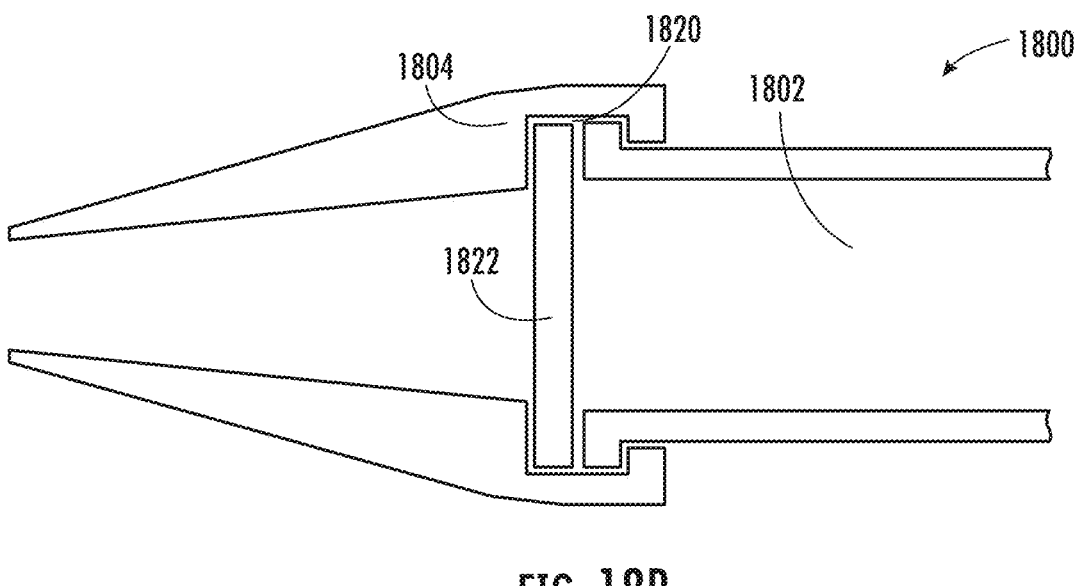
FIG. 18B depicts

FIG. 18B depicts a side-cross sectional view of the leaf blower barrel 1800 of FIG. 18A with a stator insert 1822 inserted into the recessed channel 1820 of the nozzle 1804. The stator insert 1822 is positioned downstream of the airflow that is propelled from the leaf blower (downstream of the blisk). The stator insert 1822 is retained within the recessed channel 1820 while the nozzle 1804 is attached to the leaf blower barrel 1800. The stator insert 1822 may be removable (e.g., swapped out for other stator inserts). The stator insert 1822 may be configured to alter the flow path of the airflow propelled from the leaf blower barrel 1800. Altering the flow path may include causing the airflow to swirl, which may facilitate lifting of debris. Swirling of the airflow may depend on the configuration of the vanes of a stator insert (e.g., the incidence of the vanes). Altering the airflow may include causing the airflow to oscillate (e.g., side-to-side, up-and-down), which may facilitate unsticking of debris (e.g., leaves) without the user moving the entire leaf blower. Oscillating the airflow may be achieved via flapper valves (e.g., mass-balanced flapper valves) that are actuated by the airflow propelled from the leaf blower and impart an oscillating pattern to the airflow via such actuation. A user therefore may be able to alter the swirling and/or oscillation of the airflow by swapping stator inserts having different configurations in a nozzle attached to a leaf blower barrel.

Figure 18C:
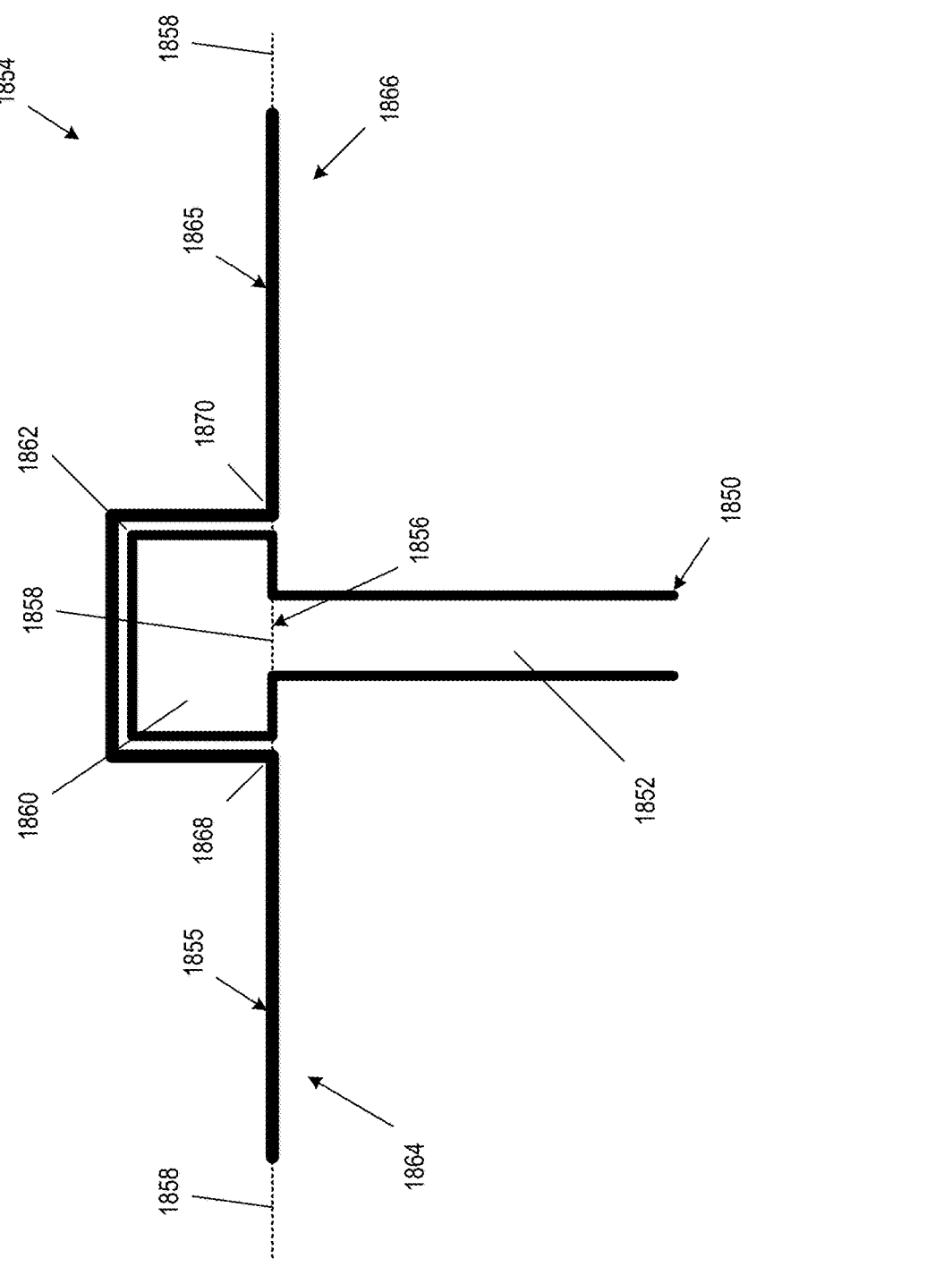
FIG. 18C a side cross-sectional view of an aerodynamic rotor within a housing or duct of an air-moving device in accordance with aspects of the present disclosure.

FIG. 18C depicts a side cross-sectional view of an example aerodynamic rotor 1850 (e.g., a blisk) within a housing or duct of an air-moving device (e.g., a leaf blower). As seen in FIG. 18C, a distal end of a blade 1852 of the aerodynamic rotor 1850 terminates no sooner than when positioned perpendicular to the proximate wet surface of the duct 1854 that serves as the primary flow path for the air moving through the air-moving device. More specifically, as seen in FIG. 18C, the terminal end 1856 of the blade 1852, in this example, is aligned with the "wetted" surface of the duct 1854 that is in contact with the air moving through the air-moving device and that serves as the primary flow path for the air. In other words, the example terminal end 1856 of the blade 1852, in this example, is coplanar with the interior surface of the duct 1854 as shown using the dotted line 1858, which indicates the alignment of the terminal end with the interior surface of the duct. As also seen in FIG. 18C, the shroud 1860, in this example, extends into a channel 1862 of the duct 1854 (e.g., a circumferential channel extending around the interior surface of the duct) to permit the terminal end 1856 of the blade 1852 to align with the interior surface of the duct 1854. In this regard, the terminal end 1856 of the blade 1852 also serves as a proximate surface of the shroud 1860 defined by the inner diameter (ID) of the shroud. As such, the ID of shroud 1860, in this example, is congruent with the "wetted" surface of the primary air flow path of the duct 1854.

With respect to the primary air flow path, the duct 1854 may be divided into two portions: a first portion 1855 which may be an inlet duct (e.g. inlet duct 1864), and a second portion 1865, which may be a housing duct or exhaust duct 1866. As seen in FIG. 18C, the terminal end 1856 of the blade 1852 (which also corresponds with a proximate surface of the shroud 1860 in this example) is shown as aligning and being coplanar with the most proximate location 1868 of the first portion 1855 and the most proximate location 1870 of the second portion 1865 of the duct 1854.

The size, features, scale and proportions of blade the 1852, the shroud 1860, and the channel 1862 shown in FIG. 18C are for descriptive purposes and should not be construed as a requirement. In this regard, the shroud 1860, in this example, is displayed as having a greater width than the blade 1852, and extending both forward and aft of the blade with respect to airflow, however, it may not extend in one or both directions in some examples.

Figure 19A:
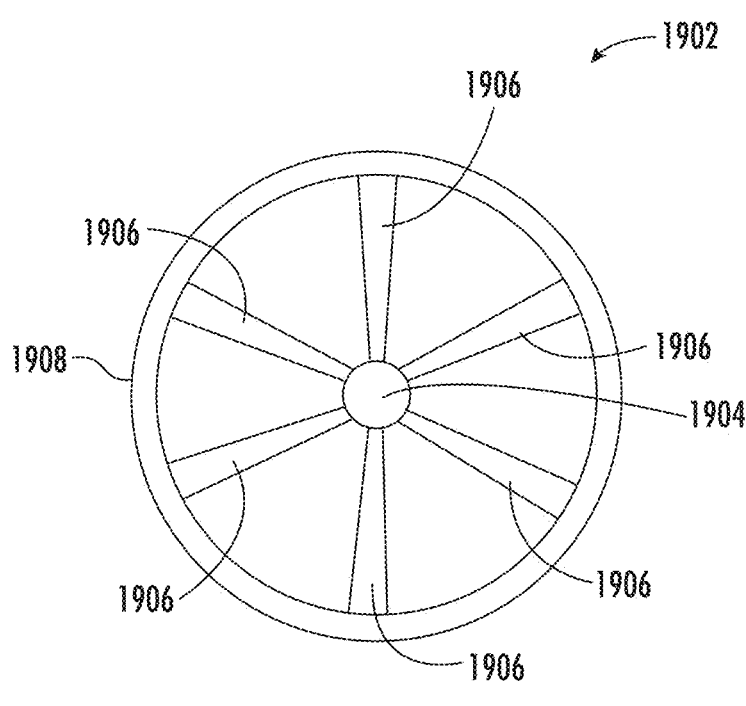
FIGS. 19A-B depict respective front views of two examples of stator inserts for a leaf blower in accordance with aspects of the present disclosure.
Figure 19B:
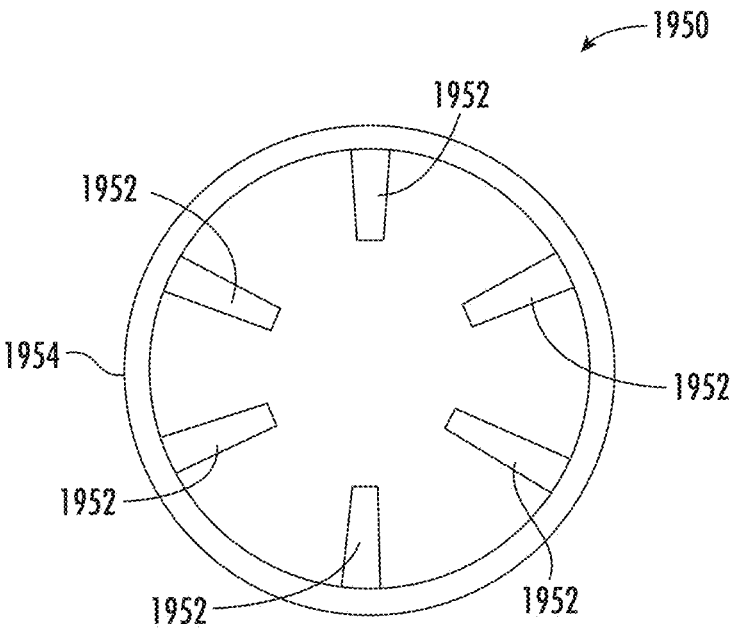

FIGS. 19A-B respectively depict two example stator inserts. The first example stator insert 1902 includes a hub 1904, multiple stator vanes 1906, and a shroud 1908. The shroud 1908 circumscribed stator vanes 1906. The stator vanes 1906, in this example, are extend between and are connected to both the hub 1904 and the shroud 1908. The second example stator insert 1954 similarly includes multiple stator vanes 1952 and a shroud 1954 but omits a hub. The shroud 1954, in this example, likewise circumscribes the stator vanes 1952, which are connected to and extend away from the shroud toward the center of stator insert. Other example stator inserts may have different configurations than those shown in FIGS. 19A-B. For example, other stator inserts may include more or fewer stator vanes, differently shaped stator vanes, differently angled stator vanes, stator vans having different dimensions (e.g., larger or smaller axial widths, radial lengths, etc.). Other example stator inserts may include additional or alternative features and/or geometries that alter the airflow propelled from a leaf blower (e.g., apertures, paneling, valves, etc.).

In some examples, a leaf blower having a blisk, such as a single-part blisk, as described herein may be configured to alter the direction of the airflow propelled from the leaf blower based on user input received via an actuator of the leaf blower. Users, therefore, may be able to control (steer) the direction of the airflow propelled from the leaf blower during operation by providing user input to the leaf blower via the actuator. The ability to control the direction of the airflow via an actuator may facilitate less overall movement of the leaf blower during operation thereby reducing the physical effort from the user and may provide better control over the movement of debris during operation. Directional control of the airflow may be achieved via a variety of different actuators, which may include mechanical, electro-mechanical, and/or electronic actuators (e.g., switches, levers, sensors, etc.). A leaf blower may be configured to alter the direction of the propelled airflow via controlling the speed of the rotor of the leaf blower, stators (e.g., fixed stators, movable stators, user-adjustable stators), one or more diverters, gimbaling (e.g., a gimbaled nozzle), and the like.

Figures 20A, 20B:
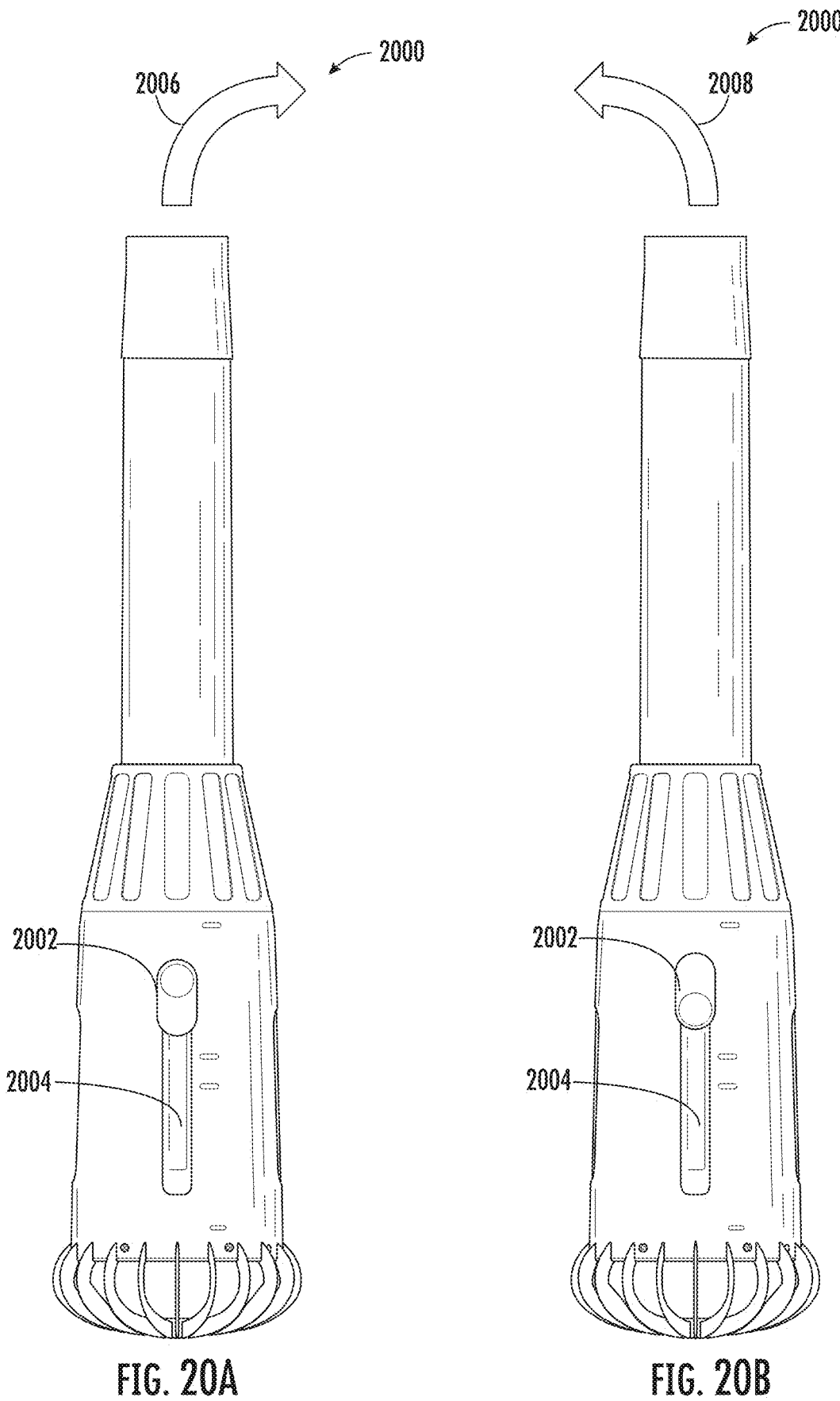
FIGS. 20A-B depict respective top views of an example of a leaf blower with a directional switch in accordance with aspects of the present disclosure.

FIGS. 20A-B depict an example leaf blower 2000 having a directional switch 2002 configured to alter the direction of the airflow propelled from the leaf blower. The direction switch 2002, in this example, is located on the handle 2004 of the leaf blower 2000. In FIG. 20A, the directional switch 2002 is toggled to a first position that causes the leaf blower 2000 to direct the airflow 2006 in a first direction (e.g., in a rightward direction). In FIG. 20B, the directional switch 2002 is toggled to a second position that causes the leaf blower 2000 to direct the airflow 2008 in a second direction different from the first direction (e.g., a leftward direction). In some examples, alternative types of user input mechanisms may be used to control the direction of the airflow. As one example, a leaf blower may include a lever that controls the direction of the airflow based on the position of the lever. In other words, the airflow may deviate more or less from its flow path when exiting the leaf blower based on more or less actuation of the lever in a particular direction (e.g., to one side, forward, or backward). As another example, a leaf blower may include a tilt sensor (inclinometer) that controls the direction of the airflow based on the orientation of the leaf blower along one or more axes. A user may rotate the leaf blower around one or more axes (e.g., up-and-down about an axis substantially perpendicular to the airflow path, side-to-side about an axis substantially parallel with the airflow path), and one or more signals from the tilt sensor may cause the leaf blower to direct the airflow in a direction corresponding to the rotation (e.g., in a leftward direction based on a counterclockwise rotation of the leaf blower, in a rightward direction based on a clockwise rotation of the leaf blower).

Leaf blowers having a blisk as described herein may also be characterized by the amount of thrust they produce. While the below examples are described in reference to a single part blisk, those skilled in the art will appreciate that other blisks may be utilized in certain embodiments. For example, leaf blowers may produce thrust in the range of about 10-50 Newtons (N). In some examples, leaf blowers having a single-part blisk may produce thrust of about 20 N (e.g., consumer-grade leaf blowers). In some examples, leaf blowers having a single-part blisk may produce thrust as high as 50 N (e.g., professional-grade leaf blowers). An example of a leaf blower falling within the design parameters, operational parameters, and operational output disclosed herein, therefore, may have a single-part blisk with a diameter of less than about 127 mm (less than about 5 in.), may operate at a BPF of about 12 kHz, and, during operation, may produce a thrust of about 30 N or more, may generate an air velocity of about 125 mph or more, and may produce a volumetric air flow of about 1,000 cfm or more with a noise level of about 45 dBA or lower. More generally, the diameter of a single-part blisk included in certain example leaf blowers as described herein may be in the range of about 50-127 mm (about 2-5 inches). Another example of a leaf blower falling within the design parameters, operational parameters, and operational output disclosed herein may, during operation, generate an air velocity of about 150 mph or more and produce a volumetric air flow of about 700 cfm or more with a noise level of less than 50 dBA, less than 45 dBa, less than 40 dBA, and about or less than 35 dBA.

FIGS. 16A-E depict respective front, rear, top, bottom, and side views of another example of a leaf blower 1600 that may incorporate a single-part blisk as described herein.

FIG. 17 depicts a side cross-sectional view of an example of a sub-assembly 1700 of an air-moving device in accordance with aspects of this disclosure. Aspects of the sub-assembly 1700 may be incorporated into (e.g., housed within, contained in a housing of) any air-moving device, such as those described herein for example, to improve air movement, improve efficiency, and reduce noise levels relative to conventional air-moving devices. The sub-assembly 1700, in this example, includes an inlet guard (1), an inlet duct (2), a nose cone (3), a collet (4), a rotor (5), a stator (6), a motor (7), an aft duct (8), and a tail cone (9). The inlet guard (1), inlet duct (2), nose cone (3), rotor (5), stator (6), aft duct (8), and tail cone (9) may belong to the wetted geometry of the sub-assembly 1700 and, as a result, their respective designs may impact the aerodynamics and acoustics of the sub-assembly 1700. The respective designs of these components, therefore, may be configured (e.g., optimized) to minimize losses and minimize noise generated by the movement of air past and through these components. The rotor (5) may be implemented as a singular, unitary, monolithic bladed disk as described herein. The nose cone (3) may be integrally formed with the rotor (5) as described herein such that the nose cone (3) and rotor (5) form a singular, unitary, monolithic unit. The collet (4) may be used to connect the nose cone (3), rotor (5), and motor (7). The collet may be designed to permit quick swapping of the rotor (5) (e.g., for installation, removal, repair). The stator (6) also may have a singular, unitary, monolithic construction. The motor (7) may be an electric motor. The motor (7) may be powered by one or more batteries (e.g., one or more rechargeable batteries). The batteries may be removable (e.g., swappable) in the air-moving device. The tail cone (9) may be combined with (e.g., connected to, integrated with) the housing of the motor (7) and contain any connections (e.g., wires) that may result in unwanted noise or negatively impact performance if positioned in the flow of the air path. A propulsor fan may include aspects of the sub-assembly 1700, for example and without limitation, the rotor (5) (e.g., a single-part blisk) and motor (7). A propulsor fan may be incorporated into various types of air-moving devices (e.g., housed within a housing of a leaf blower).

The single-part blisks described herein may be used for a variety of air-moving applications. A variety of air-moving devices, therefore, may include, for example, a fan that employs a single-part blisk as described herein. In one example, a single-part blisk as described herein may be incorporated into a leaf blower as shown in FIGS. 15A-1-

15A-5, Figures B-D, FIGS. 16A-E, and FIG. 17. Other types of air-moving devices that may include one or more single-part blisks as described herein may include, for example, stove-top fans, bathroom fans, computer fans (e.g., server fans, laptop fans, desktop fans), cooling fans, ventilation fans, HVAC fans, blower fans (e.g., carpet dryers, race track dryers, car wash dryers), hair dryers, air purifiers, humidifiers, ice-making devices, snow-making devices, snow blowers, aircraft propulsors (e.g., drone propulsors), aircraft fans (e.g., drone fans), and other types of air-moving devices configured to move air using an axial fan.

It should also be appreciated that the single-part blisk may be designed for applications that may dictate larger form factors. As described herein, for example, single-part blisks may be used in aircraft (e.g., drones) that involve flight and hovering operations. As such, dimensions of single-part blisks as described herein may include blisk diameters in the range of about 1 foot (0.3048 m) to about 6 feet (1.8288 m) or even larger.

Figure 21:
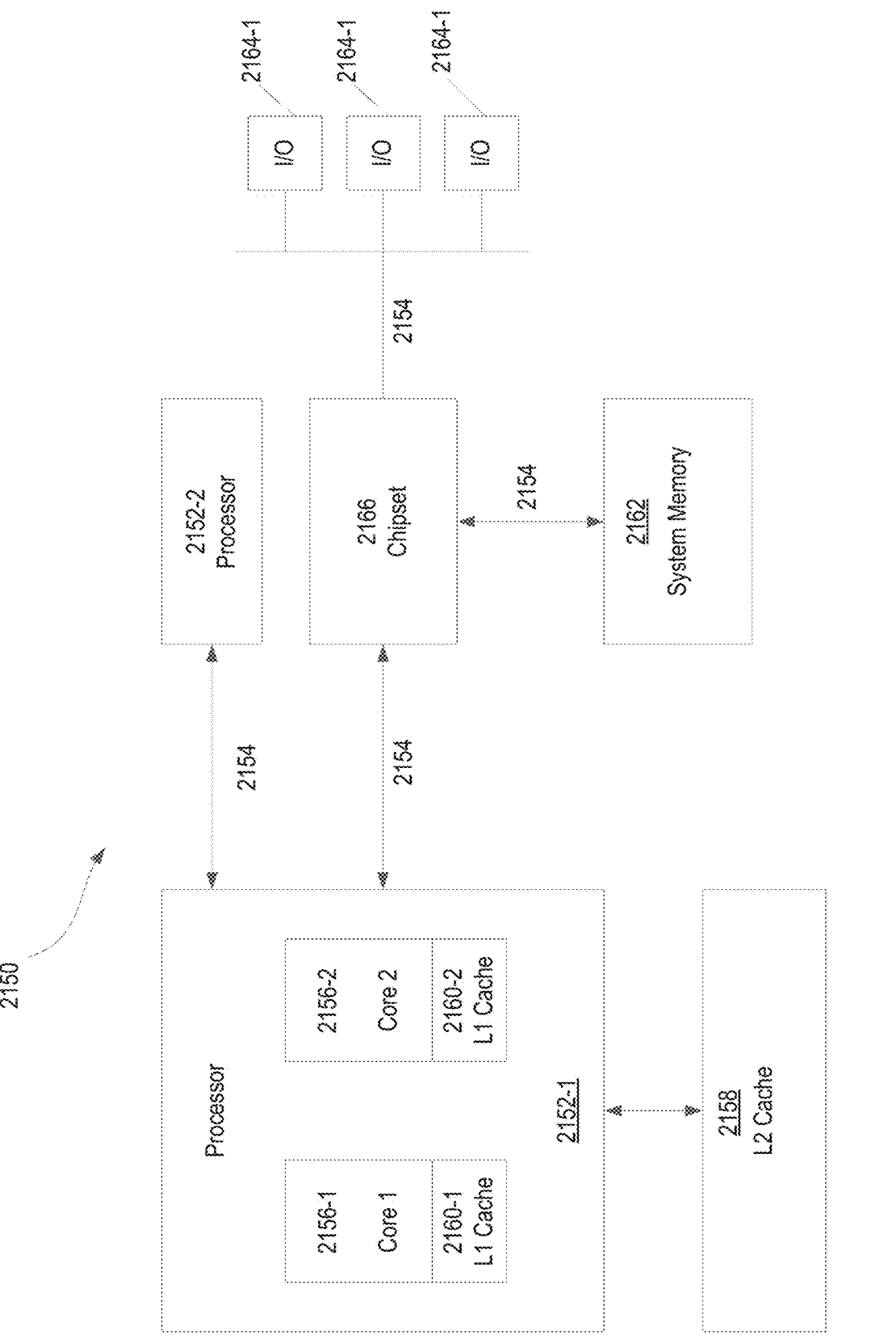
FIG. 21 depicts a block diagram of example components of a control computer that may be part of or in communication with an air-moving device in accordance with aspects of the present disclosure.

Aspects of this disclosure further relate to one or more non-transitory computer-readable mediums that comprise computer-readable instructions that, when executed by a processor, cause the processor to perform at least one or more functions as disclosed herein, such as, but not limited to, controlling operation of one or more fans and/or fan systems of an air-moving device, and/or other functions. FIG. 21, for example, depicts a block diagram of example components of a control computer that may be part of or in communication with an air-moving device in accordance with aspects of the present disclosure. FIG. 21 depicts one non-limiting example of a computer-readable medium according to some examples. Specifically, FIG. 21 illustrates a block diagram of control computer 2100 for an air-moving device (e.g., a leaf blower). Those skilled in the art will appreciate that the disclosures associated with FIG. 21 may be applicable to any system, air-moving device, or air-moving device control system disclosed herein and/or combinations thereof. Control computer 2100 may include one or more processors, such as processor 2102-1 and 2102-2 (generally referred to herein as "processors 2102" or "processor 2102"). Processors 2102 may communicate with each other or other components via an interconnection network or bus 2104. Processor 2102 may include one or more processing cores, such as cores 2106-1 and 2106-2 (referred to herein as "cores 2106" or more generally as "core 2106"), which may be implemented on a single integrated circuit (IC) chip. Although the computer 2100 is shown on a single drawing, those of ordinary skill in the art with the benefit of this disclosure will appreciate that one or more components may be "remote" with respect to another component. For example, in one example, one or more components may be in a separate housing from one or more other components. In some examples, one or more components of the computer 2100 may only be in wireless communication with other components of the computer 2100. In some examples, one or more components of computer 2100 may be located on or within a portion of an air-moving device, and yet other components may be located remote with respect to the air-moving device.

The articles "a" and "an" are used herein to refer to one or to more than one (i.e., to at least one) of the grammatical object of the article. By way of example, "an element" means one element or more than one element. Furthermore, "about" as used herein when referring to a measurable value such as an amount, a temporal duration, and the like, is meant to encompass variations, as such variations are appropriate according to the understanding of one of ordinary skill in the art. Throughout this disclosure, various aspects are presented in as numerical range. It should be understood that any description in describing a range is provided for convenience and brevity and should not be construed as an inflexible limitation. Where appropriate according to the understanding of one or ordinary skill in the art, the description of a range should be considered to have specifically disclosed all the possible subranges as well as individual numerical values within that range. For example, description of a range such as from 1 to 5 (1-5) should be considered to have specifically disclosed subranges such as from 1 to 3 (1-3), from 1 to 4 (1-4), from 2 to 4 (2-4), from 2 to 5 (2-5), from 3 to 5 (3-5), etc., as well as individual numbers within that range, for example, 1, 2, 2.3, 3.03, 4.0, 4.75, 4.875, and 5.00 with an appropriate quantity of significant digits according to the understanding of one of ordinary skill in the art. This applies regardless of the breadth of the range.

While aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

What is claimed is:

1. An apparatus configured to move air through an air-moving device,
    a rotor configured to be axially rotated within a duct, the rotor comprising:
        a central hub;
        a quantity of blades between 12-100 blades, wherein each blade has a proximate end that is contiguously formed with the hub of the rotor and radially extends away from the hub to terminate at a terminal end, and wherein each blade has a blade aspect ratio between 1 and 10; and
        a shroud contiguously formed with and circumscribing the terminal ends of the blades;
        wherein the rotor is configured to rotate with a blade passage frequency (BPF) in a range of 8-16 kilohertz (kHz) to create thrust.

2. The apparatus of claim 1, wherein the blade aspect ratio of each blade is between 2 and 10.

3. The apparatus of claim 1, wherein the quantity of the blades is between 20-50 blades.

4. The apparatus of claim 1, wherein the rotor has a circumferential blade spacing in a range of 17-1 mm.

5. The apparatus of claim 1, wherein an outer most diameter of the rotor is in a range of 78-150 mm.

6. The apparatus of claim 1, wherein the apparatus is configured such that a noise level from the apparatus does not exceed, during rotation of the rotor, 30-70 A-weighted decibels dB (A) at a distance of at 50 feet.

7. The apparatus of claim 1, wherein the apparatus is configured such that a noise level from the apparatus does not exceed, during rotation of the rotor, 30-60 A-weighted decibels dB (A) at a distance of at 50 feet.

8. The apparatus of claim 1, wherein the apparatus is configured such that a noise level from the apparatus does not exceed, during rotation of the rotor, 30-55 A-weighted decibels dB (A) at a distance of at 50 feet.

9. The apparatus of claim 1, wherein the BPF is in a range of 10-13 kHz.

10. The apparatus of claim 1, wherein the quantity of the blades is between 16-45 blades.

11. An apparatus configured to move air through an air-moving device,
    a rotor comprising:
        a central hub configured to be axially rotated;
        a quantity of blades between 12-100 blades, wherein each blade has a proximate end that is contiguously formed with the hub of the rotor and radially extends away from the hub to terminate at a terminal end, and wherein each blade has a blade aspect ratio between 1 and 10; and
        a shroud contiguously formed with and circumscribing the terminal ends of the blades;
        a housing that defines a primary airpath between an inlet end and an outlet end;
        wherein the rotor is configured to be axially rotated within the housing at a blade passage frequency (BPF) in a range of 8-16 kilohertz (kHz) and at a fan pressure ratio within a range of 1.01-1.2 to create thrust.

12. The apparatus of claim 11, wherein the apparatus is configured such that upon the rotor being axially rotated, the terminal end of the blades are congruent with an adjacent outer perimeter of the primary air path defined by the housing.

13. The apparatus of claim 12, wherein the apparatus is configured such that a noise level from the apparatus does not exceed, during rotation of the rotor, 30-70 A-weighted decibels dB (A) at a distance of at 50 feet.

14. The apparatus of claim 13, wherein the fan pressure ratio is within a range of 1.01-1.1.

15. The apparatus of claim 14, wherein the rotation causes the air-moving device to generate an exit jet velocity in a range of 90-290 miles per hour.

16. The apparatus of claim 15, wherein the rotation causes the air-moving device to generate a volumetric air flow in a range of 500-1,100 cubic feet per minute (cfm).

17. The apparatus of claim 11, wherein the blade aspect ratio of each blade is between 2 and 10.

18. The apparatus of claim 11, wherein an outer most diameter of the rotor is in a range of 78-150 mm.

19. The apparatus of claim 11, wherein the BPF is in a range of 10-13 kHz.

20. The apparatus of claim 11, wherein the rotor has a circumferential blade spacing in a range of 17-1 mm.

21. The apparatus of claim 11, wherein the quantity of the blades is of between 20-50 blades.

22. The apparatus of claim 11, wherein the apparatus is configured such that a noise level from the apparatus does not exceed, during rotation of the rotor, 30-70 A-weighted decibels dB (A) at a distance of at 50 feet.

23. The apparatus of claim 11, wherein the apparatus is configured such that a noise level from the apparatus does not exceed, during rotation of the rotor, 30-60 A-weighted decibels dB (A) at a distance of at 50 feet.

24. The apparatus of claim 11, wherein the apparatus is configured such that a noise level from the apparatus does not exceed, during rotation of the rotor, 30-55 A-weighted decibels dB (A) at a distance of at 50 feet.

25. The apparatus of claim 11, wherein the quantity of the blades is between 16-45 blades.

* * * * *